(12) United States Patent
Sternberg et al.

(10) Patent No.: US 8,019,118 B2
(45) Date of Patent: Sep. 13, 2011

(54) DIGITAL MEDIA RECOGNITION APPARATUS AND METHODS

(75) Inventors: Stanley Sternberg, Ann Arbor, MI (US); William Dargel, Ann Arbor, MI (US); John W. Lennington, Ann Arbor, MI (US); Thomas Voiles, Ann Arbor, MI (US)

(73) Assignee: Pixel Velocity, Inc., Ann Arbor, MI (US)

( * ) Notice: Subject to any disclaimer, the term of this patent is extended or adjusted under 35 U.S.C. 154(b) by 0 days.

(21) Appl. No.: 12/782,593

(22) Filed: May 18, 2010

(65) Prior Publication Data
US 2010/0278439 A1 Nov. 4, 2010

Related U.S. Application Data

(63) Continuation of application No. 12/276,901, filed on Dec. 9, 2008, now Pat. No. 7,756,291, which is a continuation of application No. 10/416,560, filed as application No. PCT/US01/48020 on Nov. 13, 2001, now Pat. No. 7,474,759.

(51) Int. Cl.
*G06K 9/00* (2006.01)

(52) U.S. Cl. ........................................ 382/100; 382/181

(58) Field of Classification Search .................. 382/100, 382/181, 293, 294, 295, 275, 276, 209; 358/3.28; 704/231; 705/64, 71; 713/176; 283/113
See application file for complete search history.

(56) References Cited

U.S. PATENT DOCUMENTS

| | | | |
|---|---|---|---|
| 5,893,095 A | * | 4/1999 | Jain et al. .............................. 1/1 |
| 6,763,148 B1 | * | 7/2004 | Sternberg et al. ............. 382/293 |
| 7,474,759 B2 | * | 1/2009 | Sternberg et al. ............. 382/100 |
| 7,756,291 B2 | * | 7/2010 | Lennington et al. .......... 382/100 |

\* cited by examiner

*Primary Examiner* — Yon Couso
(74) *Attorney, Agent, or Firm* — Jeffrey Schox

(57) ABSTRACT

One of the embodiments of the invention includes a method of identifying illegal uses of copyright material. The steps of the method preferably include the steps of: (a) providing a primary digital media object, (b) associating an auxiliary construct with the object, (c) transforming the construct using at least one of the attributes of the object to generate a unique key representative of the primary object, (d) receiving a plurality of secondary digital media objects, (e) performing steps (b) and (c) on the secondary objects to generate unique keys representative of the secondary objects, (f) comparing the keys of the secondary objects with the key of the primary object to identify if any of the secondary objects are substantially similar to the primary object.

1 Claim, 51 Drawing Sheets

Warp Rate 0.1    Warp Rate 0.5

*[Figure 29 intentionally left blank]*

```
      1   2   3   4   5   6   7    8   9  10  11  12  13
6201  8   9  10  11  12  13  14   15  16  17  18  19  20
     15  16  17  18  19  20  21   22  23  24  25  26  27
     22  23  24  25  26  27  28   29  30  31  32  33  34
     29  30  31  32  33  34  35   36  37  38  39  40  41
     36  37  38  39  40  41  42   43  44  45  46  47  48
     43  44  45  46  47  48  49   50  51  52  53  54  55
     50  51  52  53  54  55  56   57  58  59  60  61  62
     57  58  59  60  61  62  63    1   2   3   4   5   6
```

```
      1   2   3   4   5   6   7   8    9  10  11  12  13
6202  8   9  10  11  12  13  14  15   16  17  18  19  20
     15  16  17  18  19  20  21  22   23  24  25  26  27
     22  23  24  25  26  27  28  29   30  31  32  33  34
     29  30  31  32  33  34  35  36   37  38  39  40  41
     36  37  38  39  40  41  42  43   44  45  46  47  48
     43  44  45  46  47  48  49  50   51  52  53  54  55
     50  51  52  53  54  55  56  57   58  59  60  61  62
     57  58  59  60  61  62  63   1    2   3   4   5   6
```

6203

| 1 | 2 | 3 | 4 | 5 | 6 | 7 | 8 | 9 | 10 | 11 | 12 | 13 |
|---|---|---|---|---|---|---|---|---|----|----|----|----|
| 8 | 9 | 10 | 11 | 12 | 13 | 14 | 15 | 16 | 17 | 18 | 19 | 20 |
| 15 | 16 | 17 | 18 | 19 | 20 | 21 | 22 | 23 | 24 | 25 | 26 | 27 |
| 22 | 23 | 24 | 25 | 26 | 27 | 28 | 29 | 30 | 31 | 32 | 33 | 34 |
| 29 | 30 | 31 | 32 | 33 | 34 | 35 | 36 | 37 | 38 | 39 | 40 | 41 |
| 36 | 37 | 38 | 39 | 40 | 41 | 42 | 43 | 44 | 45 | 46 | 47 | 48 |
| 43 | 44 | 45 | 46 | 47 | 48 | 49 | 50 | 51 | 52 | 53 | 54 | 55 |
| 50 | 51 | 52 | 53 | 54 | 55 | 56 | 57 | 58 | 59 | 60 | 61 | 62 |
| 57 | 58 | 59 | 60 | 61 | 62 | 63 | 1 | 2 | 3 | 4 | 5 | 6 |

| 1 | 2 | 3 | 4 | 5 | 6 | 7 | 8 | 9 | 10 | 11 | 12 | 13 |
|---|---|---|---|---|---|---|---|---|----|----|----|----|
| 8 | 9 | 10 | 11 | 12 | 13 | 14 | 15 | 16 | 17 | 18 | 19 | 20 |
| 15 | 16 | 17 | 18 | 19 | 20 | 21 | 22 | 23 | 24 | 25 | 26 | 27 |
| 22 | 23 | 24 | 25 | 26 | 27 | 28 | 29 | 30 | 31 | 32 | 33 | 34 |
| 29 | 30 | 31 | 32 | 33 | 34 | 35 | 36 | 37 | 38 | 39 | 40 | 41 |
| 36 | 37 | 38 | 39 | 40 | 41 | 42 | 43 | 44 | 45 | 46 | 47 | 48 |
| 43 | 44 | 45 | 46 | 47 | 48 | 49 | 50 | 51 | 52 | 53 | 54 | 55 |
| 50 | 51 | 52 | 53 | 54 | 55 | 56 | 57 | 58 | 59 | 60 | 61 | 62 |
| 57 | 58 | 59 | 60 | 61 | 62 | 63 | 1 | 2 | 3 | 4 | 5 | 6 |
| 1 | 2 | 3 | 4 | 5 | 6 | 7 | 8 | 9 | 10 | 11 | 12 | 13 |

Figure 62(e)

DIGITAL MEDIA RECOGNITION APPARATUS AND METHODS

CROSS-REFERENCE TO RELATED APPLICATIONS

This application is a continuation of U.S. Ser. No. 12/276,901, filed Dec. 9, 2008, now U.S. Pat. No. 7,756,291 which is a continuation of U.S. Ser. No. 10/416,560 filed May 12, 2003 (issued as U.S. Pat. No. 7,474,759), which is a national stage filing of International Application Serial No. PCT/US01/48020, filed Nov. 13, 2001 which claims priority to U.S. Ser. No. 09/711,493 (issued as U.S. Pat. No. 6,763,148).

FIELD OF THE INVENTION

This invention relates generally to digital media processing and, in particular, to methods whereby still or moving images, audio, text and other objects may be transformed into more compact forms for comparison and other purposes.

BACKGROUND OF THE INVENTION

There are many systems in common use today whose function is automatic object identification. Many make use of cameras or scanners to capture images of objects, and employ computers to analyze the images. Examples are bill changing machines, optical character readers, blood cell analyzers, robotic welders, electronic circuit inspectors, to name a few. Each application is highly specialized, and the detailed design and implementation of each system is finely engineered to the specific requirements of the particular application, most notably the visual characteristics of the objects to be recognized. A device that is highly accurate in recognizing a dollar bill would be worthless in recognizing a white blood cell.

The more general problem of identifying an image (or any object through the medium of an image) based solely upon the pictorial content of the image has not been satisfactorily addressed. Considering that the premier model for a generalized identification system is the one which we all carry upon our shoulders, i.e., the human brain, it is not surprising that the general system does not yet exist. Any child can identify a broad range of pictures better than can any machine, but our understanding of the processes involved are so rudimentary as to be of no help in solving the problem.

As a result, the means that have been employed amount to the shrewd applications of heuristic methods. Such methods generally are derived from the requirements of a particular problem. Current technology often uses such an approach to successfully solve specific problems, but the solution to the general image identification problem has remained remote.

The landscape of the patent literature referring to image identification is broad, but very shallow. The following is a summary of two selected patents a three commercial systems which are considered to represent the current state-of-the-art.

U.S. Pat. No. 5,893,095 to Jain et al presents a detailed framework for a pictorial content based image retrieval system and even presents this framework in representative hardware. Flowcharts are given describing the operation of the framework system. The system depends for identification upon the matching of visual features derived from the image pictorial content. Examples of these visual features are hue, saturation and intensity histograms; edge density; randomness; periodicity; algebraic moments of shapes; etc. Some of these features are computed over the entire image and some are computed over a small region of the image. Jain does not reveal the methods through which such visual features are discerned. These visual features are expressed in Jain's system as "primitives", which appear to be constructed from the visual features at the discretion of a human-operator.

A set of primitives and primitive weightings appropriate to each image is selected by the operator and stored in a database. When an unknown image is presented for identification it can either be processed autonomously to create primitives or the user can specify properties and/or areas of interest to be used for identification. A match is determined by comparing the vector of weighted primitive features obtained for the query image against the all the weighted primitive feature vectors for the images in the database.

Given the information provided by Jain, one skilled in the art could not construct a viable image identification system because the performance of the system is dependent upon the skill of the operator at selecting primitives, primitive weightings, and areas of interest. Assuming that Jain ever constructed a functioning system, it is not at all clear that the system described could perform the desired function. Jain does not provide any enlightenment concerning realizable system performance.

U.S. Pat. No. 5,852,823 to De Bonet teach an image recognition system that is essentially autonomous. Image feature information is extracted through application of particular suitable algorithms, independent of human control. The feature information thus derived is stored in a database, which can then be searched by conventional means. De Bonet's invention offers essentially autonomous operation (he suggests that textual information might be associated with collections of images grouped by subject, date, etc. to thereby subdivide the database) and the use of features derived from the whole of the image. Another point of commonality is the so-called "query by example" paradigm, wherein the information upon which a search of the image database is predicated upon information extracted exclusively from the pictorial content of the unknown image.

De Bonet takes some pains to distinguish his technology from that developed by IBM and Illustra Information Technologies, which are described later in this section. He is quite critical of those technologies, declaring that they can address only a small range of image identification and retrieval functions.

De Bonet refers to the features that he extracts from images as the image's signature. The signature for a given image is computed according to the following sequence of operation: (1) The image is split into three images corresponding to the three color bands. Each of these three images is convolved with each of 25 pre-determined and invariant kernels. (2) The 75 resulting images are each summed over the image's range of pixels, and the 75 sums become part of the image's signature. (3) Each of the 75 convolved images is again convolved with the same set of 25 kernels. Each of the resulting 1875 images is summed over its range of pixels, and the 1875 sums become part of the image's signature. (4) Each of the 1875 convolved images it convolved a third time with the same set of 25 kernels. The resulting 46,875 images are each summed over the image's range of pixels, and the 46,875 sums become part of the original image's signature.

In the simplest case, then, the 48,825 sums (46,875+1875+75) serving as the signature are stored in an image database, along with ancillary information concerning the image. It should be noted that this description was obtained from DeBonet's invention summary. Later, he uses just the 46,875 elements obtained from the third convolution. An unknown image is put through the same procedure. The signature of the unknown image is then compared to the signatures stored in the database one at a time, and the best signature matches are reported. The corresponding images are retrieved from an image library for further examination by the system user.

In a somewhat more complex scenario, it is posited that the system user has a group of images that are related in some way (all are images of oak trees; all are images of sailboats; etc.). With the signatures of each member of the group already calculated, the means and variances of each element of their signatures (all 48,825) are computed, thereby creating a composite signature representing all member images of the group, along with a parallel array of variances. When a signature in the database is compared to a given signature, the difference between each corresponding element of the signatures is inversely weighted by the variance associated with that element. The implicit assumption upon which the weighting process is based is that elements exhibiting the least variance would be the best descriptors for that group. In principle, the system would return images representative of the common theme of the group.

Additionally, such composite signatures can be stored in the image database. Then, when a signature matching a composite signature is found, the system returns a group of images which bear a relation to the image upon which the search was based.

The system is obviously very computation-intensive. De Bonet used a 200 Mz computer based upon the Intel Pro processor to generate some system performance data. He reports that a signature can be computed in 1.5 minutes. Using a database of 1500 signatures, image retrieval took about 20 seconds. The retrieval time should be a linear function of data base size.

In terms of commercial products, Cognex, Inc. offers an image recognition system under the trademarked name "Patmax" intended for industrial applications concerning the gauging, identification and quality assessment of manufactured components.

The system is trained on a comprehensive set of parts to be inspected, extracting key features (mostly geometrical) and storing it in a file associated with that particular part. Thereafter, the system is able to recognize that part under a variety of conditions. It is also able to identify independent of object scale and to infer part orientation.

In the early to mid 1990's, IBM (Almaden Research Center) developed a general-purpose image identification/retrieval system. Reduced to software that runs under the OS/2 operating system, it has been offered for sale as Ultimedia Manager 1.0 and 1.1, successively.

The system identifies an image principally according to four kinds of information:
1. Average color, calculated by simply adding all of the RGB color values in each pixel.
2. Color histogram, in which the color space is divided into 64 segments. A heuristic method is used to compare one histogram to another.
3. Texture, defined in terms of coarseness, contrast and direction. These features are extracted from gray-level representations of the images.
4. Shape, defined in terms of circularity, eccentricity, major axis direction, algebraic moments, etc.

In addition to the distinguishing information noted above, which can be extracted from a given image automatically, the IBM system is said to have means through which a user can supplement the information extracted automatically by manually adding information such as user-defined shapes, particular areas of interest within the image, etc.

The system does not rank the stored images in terms of the quality of match to an unknown, but rather selects 20-50 good candidates, which must then be manually examined by a human. Thus, it can barely be called an image identification system.

Illustra developed a body of technology to be used for image identification and retrieval. Informix acquired Illustra in 1996.

The technology employed is the familiar one of extracting the attributes related to color, composition, structure and texture. These attributes are translated into a standard language, which fits into a file structure. Unknown images are decomposed by the same methods into terms that can be used to search the file structure. The output is said to return possible matches, ordered from the most to the least probable. The information extracted from the unknown image can be supplemented or replaced by input data supplied by the user.

Aside from the general purpose of image identification and retrieval (by Informix's Excalibur System), this technology has been applied to the archiving and retrieval of video images (by Virage, Inc. and Techmath).

Management of information is one of the greatest problems confronting our society. As the sheer volume of generated information increases dramatically every year, effective and efficient access to stored information becomes a particular concern.

While information in its physical embodiment was once stored in file cabinets, libraries archives and the like, to be accessed through arcane means such as the Dewey Decimal System; current needs dictate that information must be stored as digital data in electronic media. Database management systems have been developed to identify and access information that can be simply and uniquely described through their alphanumeric keywords. A document entitled "New Varieties of Wheat" appearing in the Journal of Agronomy, series 10, volume 3, Jan. 4, 1999 is easy to digitize, store and retrieve. The search mechanism, given all of the identifications above, can be swift, efficient and foolproof. Similarly, cross-referencing according to field of interest, subject matter, etc. works rather well.

Currently, however, much of the information with which we are confronted is presented in pictorial form. Though we can create arbitrarily accurate representations of objects in pictorial form, such as digital images, and can readily store such images, the accessing and retrieving of this information often presents difficulties. For the sake of the present discussion, the term "digital image" is defined as a facsimile of a pictorial object wherein the geometrical and chromatic characteristics are represented in digital form.

Many such images can be stored and retrieved efficiently and accurately through associated alphanumeric keywords, i.e., meta-data. The associated information Claude Monet-Poppies-1892 might allow the unique identification and retrieval of a famous painting. Graphics used for advertising might be identified by the associated information of the date of creation, the subject matter and the creating advertisement agency. But if one considers the cases of an unattributed painting or undocumented pictorial advertising copy, i.e., no meta-data, such identifications become more problematic.

There are innumerable instances in which one has only the digital image on hand (one can always generate a digital image from a physical object if need be) and it is desired to access information in a database concerning its identification, its original nature, etc. In such cases, the seeker has no information with which to search an appropriate database, other than the information of the image itself.

Consider some examples of the cases noted above.
(1.) Let us postulate that a person had a swatch of fabric having a particular pattern of colors, shapes, textures, etc.

Further, let us assume that the swatch has no identifying labels. The person wishes to identify the textile. Assuming that a catalog of all fabrics existed, the person might be able to narrow the search through observation of the type of fabric and the like, but, in general, the person would have no choice but to visually compare his sample fabric to all the other fabrics, one at a time.

(2.) It is desired to identify an unknown person in a photograph, when the person is not otherwise identified, but is thought to be pictorially represented in a database, for example, a database of all passport pictures. Except for the obvious partitions according to sex of subject, age of subject, and other meta-data sortings, there exists no effective way to identify the person in the photograph other then through direct comparison by humans with all the pictures in the database.

(3.) A person possesses a porcelain dinner plate of unknown origin, which is believed to be valuable due to the observable characteristics of the object. The person wishes to ascertain the history of and the approximate value of the plate. In this case, the pictorial database exists mostly in reference books and in the minds of experts. Assuming the first case, the person must compare the object to images stored in the appropriate books, image by image. In the second case, the person must identify an appropriate expert, present the expert with the object or pictorial representations of the object, and hope that the expert can locate the proper reference in the database or provide the required information from memory.

In all the examples presented above, the problem solution rests upon humans visually comparing objects, or images of objects, to images in a database. As current and future electronic media generate, store and transmit an ever-increasing torrent of images, for a multitude of purposes, it is certain that a great many of these images will be of sufficient importance that it will be imperative for the images themselves to serve as their own descriptors, i.e., no meta-data. The problems of manually associating keyword descriptions, i.e., meta-data to every digitally stored image to permit rapid retrieval from image databases very quickly becomes unmanageable as the number of pertinent images grows.

Assuming, then, that an image's composition itself must somehow serve as an image's description in image databases, we immediately are faced with the problem that the compositions of pictorial images are presented in a language that we neither speak nor understand. Images are composed of shapes, colors, textures, etc., rather than of words or numbers.

At a most basic level, a digitized image can be completely described in terms hue, saturation and intensity at each pixel location. There is no more information to be had from the image. Furthermore, this definition of an image is the one definition currently existing which is universal and is presented in a language which all can understand. Viewed from this perspective, it is worth investigating further.

The naive approach to identifying an unknown image by associating it with a stored image found within a given database of digitized images would be to compare a digitized facsimile of the unknown image to each image in the database on a pixel by pixel basis. When each pixel of a stored image is found to match each pixel of the unknown image, a match between that particular stored image and the unknown image can be said to have occurred. The unknown image can now be said to be known, to the extent that the ancillary information attached to the stored image can now be associated with the unknown image.

When considered superficially, the intuitive procedure given above seems to offer a universal solution to the problem of managing image databases. Practical implementation of such an approach presents a plethora of problems. The process does not provide any obvious means for subdividing the database into smaller segments, one of which can be known a priori to contain the unknown image. Thus, the computer performing the comparisons must do what a human would have to do: compare each database image to the unknown image one at a time on a pixel-by-pixel basis. Even for a high-speed computer, this is a very time consuming process.

In many cases, the database images and the unknown image are not geometrically registered to each other. That is, because of relative rotation and/or translation between the database image and the unknown image, a pixel in the first image will not correspond to a pixel in the second. If the degree of relative rotation/translation between the two images is unknown or cannot be extracted by some means, identification of an unknown image, by this method becomes essentially impossible for a computer to accomplish. Because a pixel-by-pixel comparison, commonly referred to as template matching, seems to be such an intuitively obvious answer to the problem, it has been analyzed and tested extensively and has been found to be impractical for any but the simplest applications of image matching, such as coin or currency recognition.

All other image recognition schemes with which we are familiar are based upon the extraction of distinctive features from an unknown image and correlation of such features with a database of like features, with each feature set having been similarly extracted from and related to each stored image. The term pattern recognition has come to represent all such methods. Examples of such feature sets, which can be extracted and used, might be line segments, defined, perhaps, by the locations of the endpoints, by their orientation, by their curvature, etc. The reduction of images to feature sets is always an attempt to translate image composition, for which, there is no language, into a restrictive dictionary of image features.

The selection of feature sets and their application to image matching have been investigated intensely. The feature sets used have been largely based upon the intuition of the process designer. Some systems of feature matching have performed quite well in image matching problems of limited scope (such as identifying a particular manufactured part as being of a pre-defined class of similar parts; distinguishing between a military tank and a military truck, etc.). However no system has yet solved the general problem of matching an unknown image to its counterpart in an image database.

SUMMARY OF THE INVENTION

The methods and apparatus of this invention present an effective means for addressing the general problem of image and digital media recognition described above. The invention does not depend upon feature extraction, and is not related to any other image- or content-matching system.

The method derives from the study of certain stochastic processes, commonly referred to as chaos theory, in particular, the study of strange attractors. In this method, an auxiliary construct, a chaotic system, is associated with an "image," which should be taken to include any object or representation to which the invention is applicable, including image sequences and motion video, audio and other waveforms, including speech, and text.

The auxiliary construct is a dynamic system whose behavior is described by a system of linear differential equations whose coefficients are dynamically derived from the values of the pixels in the digital image. As the dynamic system is successively iterated, it is observed that the system converges towards an attractor state, that is, random behavior becomes predictable and the system reaches an equilibrium configuration. The equilibrium configuration uniquely represents the digital image upon which it has been constructed.

The form of the auxiliary construct that has been commonly used during the development of this invention is a rectangular, orthogonal grid, though the invention does not depend upon any particular grid form. It is assumed hereafter that a rectangular auxiliary grid is used, and it will hereafter be referred to as the warp grid. The warp grid is assigned a particular mesh scale and location relative to the original image. The locations of all grid intersections are noted and stored.

A series of transformations is then imposed upon the warp grid. Each transformation is governed by a given set of transformation rules which use the current state of the warp grid and the information contained in the invariant underlying original image. The grid intersections will generally translate about the warp grid space as the result of each transformation. However, the identity of each intersection is maintained. At each iteration of the warp grid, the image is sampled at the warp grid points. The number of warp grid points is many orders of magnitude smaller than the number of pixels in the digital image, and the number of iterations is on the order of a hundred. The total number of computational steps is well within the capabilities of ordinary personal computers to implement very rapidly. After a given number of transformations have been performed upon the warp grid, the final position of each of the grid intersections is noted. For each grid point; a vector is formed between its original position and its final position. The set of all such vectors, corresponding to all of the original grid points, constitutes a unique representation of the underlying original image, called a Visual Key.

This resultant set of vectors represents a coherent language through which we can compare and identify distinct images. In the preferred embodiment, the problem of matching an unknown image to an image in a database, we could use the following procedure. First we would apply a given warp grid iterative process to each original image. From each such procedure we would obtain a vector set associated with that image, and the vector set would be stored in a database. An unknown image that had a correspondent in the database could be processed in the same way and identified through matching the resultant vector set to one of the vector sets contained in the database. Of course, auxiliary information commonly used for database searching, such as keywords, could also be used in conjunction with the present invention to augment the search process.

The size of the vector set is small compared to the information contained in the image. The vector set is typically on the order of a few kilobytes. Thus, even if the database were to be searched exhaustively to find a match to an unknown image's vector set, the search process will be, fairly rapid even for database containing a significant number of vector sets. Of greater importance is the fact that the database used for identification of unknown images need not contain the images themselves, but only the vector sets and enough information to link each vector set to an actual image. The images themselves could be stored elsewhere, perhaps on a large, remote, centrally located storage medium. Thus, a personal computer system, which could not store a million images, could store the corresponding million information sets (vector sets plus identification information), each of a few kilobytes in size. As has been mentioned, the personal computer would be more than adequate to apply the image transformation operations to an unknown image in a timely manner. The personal computer could compute the Vector set for the unknown image and then could access the remote storage medium to retrieve the desired image identification information.

In practice, however, the matching of vector components can be too slow to allow a very large database of many millions of images to be searched in a timely manner. As noted in the following, there may not be a perfect match between a vector set derived from an unknown image and a vector set stored in the database. A unique search method dealing with this uncertainty, which is also very fast and efficient, will be described herein.

The unknown image and the corresponding database image will generally have been made either with two different imaging devices, by the same imaging device at different times, or under different conditions with different settings. In all cases, any imaging device is subject to uncertainties caused by internal system noise. As a result, the unknown image and the corresponding image in the database will generally differ. Because the images differ, the vector sets associated with each will generally differ slightly. Thus, as noted above, a given vector set derived from the unknown image may not have an exact correspondent in the database of vector sets. A different aspect of the invention addresses this problem and simultaneously increases the efficiency of the search process.

The search process employed by this invention for finding a corresponding image in a database is called squorging, a newly coined term derived from the root words sequential and originating. The method sequentially examines candidate database images for their closeness of match in a sequential order determined by their a priori match probability. Thus, the most likely match candidate is examined first, the next most likely second, and so forth. The process terminates when a match of sufficient closeness is found, or a match of sufficient closeness has not been found in the maximum allowable number of search iterations.

The squorging method depends upon an index being prefixed to each image vector set in the database. A pre-selected group of j warp grid points is used to construct the index. Each x and y component of the pre-selected group of warp grid vectors is quantized into two intervals, represented by the digits 0 and 1. In effect, each vector set has been recast as a set of 2*j lock tumblers, with each tumbler having 2 positions. Associated with each vector set in the database, then, is a set of 2*j tumblers, each of which is set to one of 2 values. The particular value of each tumbler is determined by which interval the vector component magnitude is quantized into.

At this point in the process, every entry in the database is associated with a set of 2*j tumblers, with each tumbler position determined by the underlying vector set components. These tumbler sets are referred to as index keys. Note that there is not necessarily a one-to-one relationship between vector sets and index keys in the database. A single index key can be related to several vector sets.

Returning to the unknown image, selected elements of its vector set are similarly recast into an index key. However, in the case of the unknown, statistics which are known a priori are used to calculate the most probable index key associated with the unknown image, the next most probable, and so on. The index keys are calculated on demand in order of decreasing probability of the unknown index key being the correct one.

These index keys are checked sequentially against the index keys in the database until one is calculated having an exact correspondent in the database of index keys. Note that not all of the index keys in the list necessarily have exact matches in the database of index keys. If the first index key on the list matches an index key in the database, all vector sets associated with that index key are examined to determine the closest match to the vector set associated with the unknown image. Then the corresponding database image is said to most probably be the unknown image. Likewise, the second, third, etc. most probable matches can be identified.

If a match is not found within the scope of the first index key, the first index key calculated is discarded, and the next most probable index key is calculated. The squorging operation determines which tumblers in the index key to change to yield the next most probable index key. The process is repeated until a satisfactory match between the Visual Key Vector associated with the unknown image and a Visual Key Vector in the database is found.

The squorging method does not perform very well when the individual picture objects are individual frames of a movie or video stream. The high degree of frame-to-frame correlation necessary to convey the illusion of subject motion means that individual warp grid vectors are likely to be significantly correlated. This results in an undesirably sparse distribution of index keys with some of the index keys being duplicated very many times. Therefore, in order to extend the present invention to the recognition of streams, additional algorithms referred to as "Holotropic Stream Recognition" are presented.

Holotropic Stream Recognition (HSR) employs the warp grid algorithm on each frame of the picture object stream, but rather than analyzing the warp grid vectors themselves to generate index keys, HSR analyzes the statistics of the spatial distribution of warp grid points in order to generate index keys. Furthermore, rather than employing fixed threshold levels to define individual tumbler probabilities, the HSR methodology constructs a dynamic decision tree whose threshold levels are individually adjusted each time an individual tumbler probability is generated. Finally, the method of squorging itself is replaced by a statistical inference methodology, which is effective precisely because the individual frames of a picture object stream are highly correlated.

Extensions of the technology are also disclosed to achieve a uniform distribution of objects over the database search, a consideration which is central to scalability. In particular, a generalized method has been developed based on reticle projection, which greatly enhances the uniformity of object distributions in the collected data. Thus, whereas statistical criteria are used with respect to particular embodiments in transforming a construct associated with an image, audio, text or other representation, a reticle projection may alternatively be used in attribute transformation according to alternative embodiments of the invention.

With specific regard to digital audio, the invention may be used to create large databases representing popular music which can be successfully queried by 1-2 second (or longer) excerpts of such digital material. As to digital text, the method presented herein offers true fuzzy search capability. A query phrase can deviate substantially from the corresponding database phrase and a correct match will still be achieved. Within rather loose limits, words within a phrase can be misspelled, words can be deleted and/or added, and words can be transposed without preventing a correct match. It is anticipated that application of the text-matching methodology will make text search engines much more useful. Also, because of its unique capabilities, this methodology is expected to foster new applications which current technology has not allowed.

BRIEF DESCRIPTION OF THE DRAWINGS

FIG. 28A shows a Squorger combining two lists, with three connections made thus far;

FIG. 28B details the step of finding the fourth connection. The next candidate connections are shown in the box on the right;

FIG. 28C shows the Squorger with nine connections made. At this point, the first element in listA has been combined with every element of listB;

FIG. 30A illustrates collecting the statistics;

FIG. 30B illustrates constructing the decision tree;

FIG. 30C illustrates constructing the reference bins;

FIGS. 62A-62E illustrate the specific example of a 7-by-9 reticle implemented as an optical reticle mask. The numbers in the figures represent individual pixels of the reticle, and weight transmitted light rays by +1 or −1.

LIST OF DEFINITIONS

Figure 1:
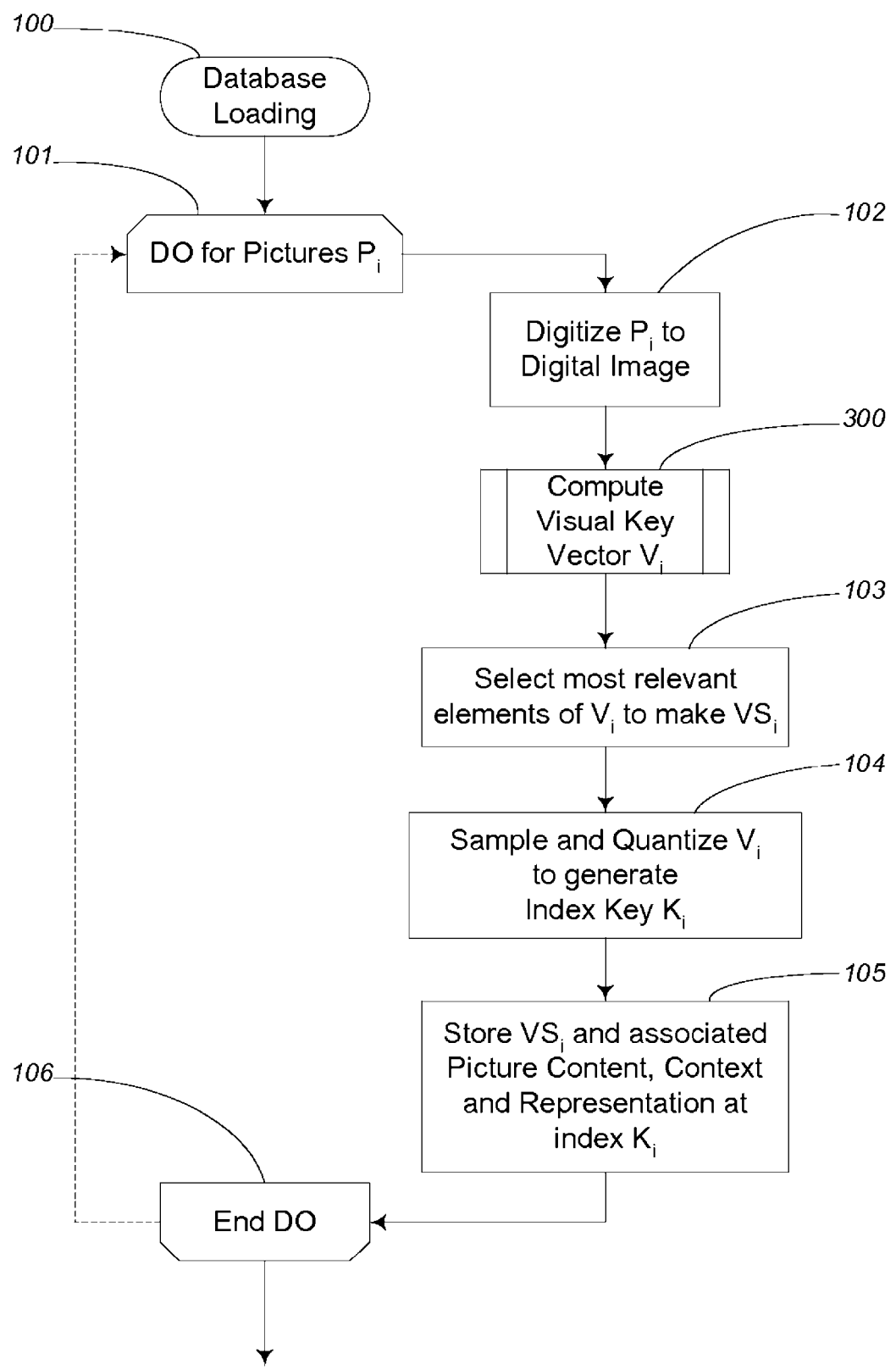
FIG. 1 is a flowchart of the process of loading the Visual Key Database.

Composition
 A specific spatial relationship among various composited primitive visual elements including color, shape, dots, arcs, symbols, shading, texture, patterns, etc.

Connectivity Pattern
 The definition of the set of Warp Grid points that directly affect the movement of a given point.

Decision Tree
 A construct for converting Visual Key Statistics into Index Keys, explicitly constructed from the Reference. Stream Statistics File. The Decision Tree maps individual media frames into Index Keys.

Digital Image
 An image which exists as an ordered set of digital information. A digital image could be created entirely within the digital domain or could be created by converting an existing picture into a digital counterpart consisting of ordered digital data. An appropriate viewing device is required to produce a representation of the image.

Displacement Vectors
 Measurements derived by adapting the points on a Warp Grid over a Digital Image of a Picture. Each Displacement Vector represents the distance moved by an individual point in the Warp Grid after a given number of iterations.

Equilibrium Warp Grid
 The deterministic outcome resulting from the indefinitely continued application of geometric modifications to a Warp Grid referred to as adapting steps. The Equilibrium Warp Grid is a configuration of Warp Grid points that either does not change with additional adaptation iterations or changes very little. The Equilibrium Warp Grid in the form of a Visual Key Vector represents the picture that it was adapted to in the Visual Key database.

Holotropic
 The term used to describe the process of recognizing a Stream based on Reference Stream Statistics. A word formed by conjoining holo (meaning "whole") and tropic (meaning "turning towards").

Index Key
 An Index Key is an alphanumeric string that is derived from a Visual Key Vector, used for indexing a large database of Visual Key Vectors.

Initial Warp Grid
 A Warp Grid as it is first configured, before the Warp Algorithm has adapted its points.

Match Score
 A measure of the degree to which a particular entry in the database matches the Query Picture. In the Preferred Embodiment, a perfect match corresponds to a match score of 100, while the worst possible match corresponds to a score of 0.

Neighborhood Points
 The set of points (defined by the Connectivity Pattern) that directly affect the movement of a given point.

Neighborhood Radius
   A Connectivity Pattern defined by the points in a Warp Grid that are directly adjacent and completely surrounding a given Warp Grid point.
Picture
   A composition of visual elements to which the observer attaches meaning.
Picture Content
   The meaning an observer attaches to a Picture's composition. Examples are the Picture's subject, setting and depicted activity.
Picture Context
   The circumstances of a picture's existence, such as the creator, the date of creation and the current owner.
Picture Object
   A container which holds information that completely describes the composition of a Picture. Picture Objects can be visible, as in a photograph, or virtual, as in a stored Digital Image.
Picture Object Collection
   A specific set of Picture Objects.
Picture Representation
   A facsimile of the Picture used to designate the Picture visually.
Picture Stream
   A specific sequence of pictures which, when presented to an observer by an appropriate apparatus at an appropriate rate, will appear to the observer as depicting continuous motion.
Query Picture
   An image presented to the Visual Key database system for identification.
Query Stream
   A stream presented to the Visual Key database system for identification.
Reference Bins
   Holders for Reference Stream frame numbers, sorted according to their assigned Index Keys. These are used, with the Decision Tree, in the process of Holotropic Stream Query Recognition.
Reference Stream
   A stream compsited of individual learned streams, forming the basic data used for recognizing a Query Stream.
Squorger
   A computer software component that combines two input lists, delivering their joined elements in order of decreasing probability.
Squorger Tree
   A logical tree structure using Tumbler values and associated Tumbler Probabilities as inputs, while the single output delivers Index Keys in order of decreasing probability that the output Index Key is the correct one.
Squorging Algorithm
   A deterministic set of operations applied to the squorging tree which guarantees that the desired sequence of Index Keys will appear at the tree output when a request is submitted for the next most probable Index Key.
Streaming Images
   Using an auxiliary device to generate/transmit/display an ordered sequence of images. Examples are the use of a movie projector to stream films or a DVD player to stream recorded video.
Tropic
   A graphical line segment indicating the trajectory and duration of a Stream. A Query Tropic is produced when the frames of a Query Stream are sequentially matched and plotted against the Reference Stream.
Visual Key Collection
   A collection of Visual Key Vectors within the Visual Key Database.
Visual Key Database
   A database containing Visual Keys and, optionally, other objects such as Contents, and Contexts. In addition, the database optionally may contain Representations and/or Picture Stream Objects.
   A Visual Key Database automatically connects a Picture with its Content, Context and Representation.
Visual Key Vector
   A set of measurements analyzed from the Digital Image of a Picture, including the Warp Grid Vector.
Warp Algorithm
   A deterministic process through which the initial Warp Grid is modified geometrically according to the composition of an associated picture. The process is referred to as adapting, and the final state of the Warp Grid is referred to as the adapted Warp Grid.
Warp Grid
   A geometrical arrangement of points superimposed on the Digital Image of a Picture for purposes of analysis.
Warp Parameters
   These are the operating parameters for the Warp Algorithm. This set of parameters includes such quantities as the initial grid configuration, the Warp Rate and the Connectivity Pattern.
Warp Rate (WR)
   Constant governing the speed of displacement of the Warp Grid points.
Warp Grid Vector
   The collection of all Displacement Vectors derived from adapting a Warp Grid to a Digital Image of a Picture.
Bin
   Container for lists of frame identification numbers. Each bin corresponds to a particular codon in a gene. During recognition, to form the recognition histogram, a 1 is added to the histogram box corresponding to each frame identification number that appears in a given list. This is done for all of the codons from the gene created from the query frame.
Codon
   A fixed, specified partitioning of a gene into equal length segments. In the audio application illustrated in FIG. 50, a gene is divided up into 10 codons, each codon of 9 bits.
Digital Key
   General term for the encoded representation of a media object that is used for automatic recognition. Analogous to a bar code, but derived directly from the media content.
Frame
   An individual image in a video sequence, or a short fixed duration increment of an audio wave file, or a single line of text in a paragraph. Also, a single still image is a frame.
Full Projection
   Output of the reticle before it is thresholded, sampled, shuffled and turned into a gene.
Gene
   Quantized and shuffled reticle projections, uniformly segmented into codons. In the audio example of FIG. 50, a gene of 90 bits is segmented into 10 codons of 9 bits each.
List
   The partitioning of a bin corresponding to a particular codon into individual ordered collections called lists, there being as many of these collections as there are possible states of a codon. In the audio example of FIG. 50, there are 512 possible states of a 9-bit codon, hence each of the 10 bins corresponding to the 10 codons in the gene has 512 possible states or 512 lists Match
  The reference (learned) frame (any media) that has the most codons in common with the query. The match is determined from the recognition histogram where the match is that reference frame has the most intact codons.
Media Catalog
  The database of genes that indexes some collection of media files by frame numbers.
Nucleotide
  One bit of a codon.
Reticle
  A maximal length shift register sequence used to weight the Transformed input frames. Used in various analytical techniques to create a spectrum of pure white noise.
Sampled Projection
  A pre-determined subset of the thresholded full projection.
Shift Register
  Mathematical construct or electronic device used to produce the reticle sequence. The shift register with appropriate feedback taps and logic provides a means of generating a pseudo-random sequence of the greatest possible length for any length of shift register.
Taps
  Positions of the shift register that are sampled and logically combined to form the feedback bit that is used to build the maximal length shift register sequence.
Thresholded Projection
  A full projection is changed from a series of floats to a series of bits, by using a pre-determined threshold, commonly set at 0.
Tropic
  A frame number that repeatedly appears in the lists specified by query codons as to make itself evident in a recognition histogram.
List of Variables

| | |
|---|---|
| B, b | Number of Bins |
| C | Set of points which constitute a Connectivity Pattern |
| c | "Correct" (stored) value of a Warp Grid Vector element |
| CP | Current Points (check Compute Warp Grid Vector flowchart) |
| CProb | Conditional probability on a continuously varying value. |
| FM | First moment |
| i, j | Local integer variables |
| g | A tumbler in a set of Tumblers |
| G | Set of Tumblers |
| K | Index Key |
| L | Function of image sampled at xy (e.g. level) |
| M, N | Dimensions of Warp Grid |
| m, n | Indices of the Warp Grid points |
| NP | Neighborhood points |
| P | Picture |
| p | Point |
| Prob | Probability |
| q | A corresponding point in the Warp Grid following some number of iterations of the Warp Algorithm. |
| Q | Query |
| s | Sampled value |
| S | Stored value |
| T | Tumbler |
| TP | Tumbler Probability |
| u, v | Coordinate system of a Warp Grid. |
| V | Vector |
| VS | Stored Visual Key Vector |
| WR | Warp Rate |
| x, y | Cartesian coordinates (check Compute Warp Grid Vector flowchart) |
| ZM | Zero$^{th}$ moment |

Discussion of Pictures
  A picture is a composition of visual elements which may include colors, shapes, lines, dots, arcs, symbols, shadings, textures and patterns to which an observer attaches meaning. A picture's content is the meaning an observer attaches to a picture's composition. A picture's meaning is determined by the observer's visual comprehension of the picture composition and his understanding of its visually comprehensible elements picture content can include the Picture's subject(s), subject name(s), subject type, subject activity, subject relationships, subject descriptors, props, keywords, location and setting.
  A Picture's Composition may include another Picture in addition to other visual elements. For example, a page from an art catalog can have many individual Pictures on it, and the page itself is also a Picture.
  Pictures can contain words, or be composed of only words. Although it is not the intention of the present invention to recognize individual characters, words or phrases, it is capable of matching a Picture composed of words when the arrangement, font, style and color of the letters and words in the picture are distinctive and characteristic of the Picture.
  A Picture's Context describes the circumstances of a Picture's existence. Picture Context can include the date, title, owner, artist, copyright, rating, producer, session, roll, frame, material, media, storage location, size, proportions, condition or other information describing a Picture's origin, history, creator, ownership, status, etc.
  Both a Picture's Content and a Picture's Context are described in words, phrases, numbers or symbols, i.e., in a natural language.
  A Picture's Representation is a facsimile of the Picture used to designate the Picture visually. A Web based thumbnail image is a good example of a Picture Representation. It acts as an icon that can be clicked to access a larger scale Picture. Illustrated catalogs of paintings and drawings, which accompany many art exhibits, contain Representations of the items in the exhibit. A Picture Representation is intended to be a visually identifiable icon for a Picture; it is not generally intended to be a Reproduction of a Picture. It is frequently smaller than the Picture it represents, and generally has less detail. A picture's Representation may be in a different medium than the Picture it represents. For example, the Picture Representation in Picture Example 1 below is a jpeg file while the Picture Object is a frame of 8 mm film.
Examples of Pictures
  Picture Examples 1-4 show pictures that might be included in a Visual Key Database. These examples show some (but certainly not all) of the variety of the kinds of Pictures that can be effectively stored and retrieved in a Visual Key Database. In each case, the Representation is followed by the Context and Content.
Discussion of Picture Objects
  A Picture Object holds information completely describing the composition of a Picture. Examples of Picture Objects include a photographic negative, a photographic print, a 35 mm slide, a halftone magazine illustration, an oil painting, a baseball card, a comic book cover, a clip art file, a bitmapped digital image, a jpeg or gif file, or a hologram. A Picture Object may also hold information in addition to Picture Composition information, for example, a 35 mm photographic negative displays its frame number, while the back of a baseball card generally gives player statistics for the player pictured on the front side.
  A Picture Object may be as simple as a black and white photograph, which records its data as the spatially varying optical density of an emulsion affixed to the surface of a paper backing, requiring only sufficient ambient visible light for its display. Or a Picture's data may be stored as the overlapping regular patterns of transparent colored dots in the four color halftone printing process, requiring the observer's eyes and brain to merge the dots into visual meaning. A single 35 mm slide is a Picture Object that holds a visible Picture, which can be properly displayed by projecting it on a screen with a slide projector. A Picture's data may reside as electrical charges distributed on the surface of a semiconductor imaging chip, requiring a sophisticated string of processes to buffer, decrypt, decompress, decode, convert and raster it before it can be observed on a computer display.

From the preceding discussion, it may be properly concluded that there are two types of Picture Objects, Visible Picture Objects that record a Picture's data as a directly viewable image, and Virtual Picture Objects that require a special device for creating an image of the recorded Picture.

Visible Picture Objects usually have relatively flat reflecting, transmitting or emanating surfaces displaying a Composition. Examples include photographs, slides, drawings, paintings, etchings, engravings and halftones: Visible Picture Objects are usually rectangular in format, although not necessarily. They are frequently very thin. We commonly call these Picture Objects "Pictures". One characteristic of Visible Picture Objects is that they store their Picture's information as varying analog levels of an optically dense or reflecting medium spatially distributed across an opaque or transparent supporting material.

A Virtual Picture Object can only be observed when its information is converted for display on a suitable display device. A FAX is a Virtual Picture Object that requires a FAX machine to create a viewable paper copy. A clip art file is a Virtual Picture Object that requires a computer equipped with a graphics card and monitor for display.

Picture Streams

Picture Objects can be streamed to create the illusion of the subject(s) of the Picture being in motion, hence the term "motion picture". To achieve the motion illusion, the individual Picture Objects in the Stream contain highly spatially correlated Picture Compositions. In viewing a rapid succession of such streamed Picture Compositions, the viewer's eye and brain fuse the individual Picture Compositions into a single Dynamic Composition, which the viewer's brain interprets as subject motion.

A reel of movie film is a Picture Stream (noun) consisting of a sequence of individual frames. To stream (verb) the film's Picture Objects we use a movie projector. A VHS tape player streams VHS Tape Cassettes, a DVD player streams DVD's or CD's, and desktop computers stream an ever growing variety of Picture Object Stream formats. An Internet Streaming Video is a Picture Stream that can only be viewed when its information is processed by a computer before being displayed on a monitor.

VHS video tape stores Sequence of Pictures whose information is linearly distributed as analog magnetic density levels distributed piecewise linearly along a Mylar tape. When scanned by a magnetic pickup and converted to amplified electrical signals, a sequence of video frames can be displayed on a cathode ray tube for viewing.

The Preferred Embodiments

Broad Overview

The Visual' Key Database in this embodiment is preferably software that executes on a general-purpose computer and performs the operations as described herein (the program). Pictures are entered into the program in digital form if they are not originally in digital form. Picture digitization may be performed by any suitable camera, scanning device or digital converter. In general, color scanning is employed throughout this disclosure, but the present invention should not be construed to be limited to the identification of images made in the visible color spectrum. Indeed, the present invention is operative when the images obtained are derived from infrared, thermal, x-ray, ultrasound, and various other sources.

Nor should the present invention be construed to be limited to static pictures. By rapidly sequencing multiple Pictures, motion pictures and video technologies produce the illusion of motion even though individual frames of the sequence are static. The present invention, by its very nature, has immediate application in identifying the movie or video source of a single frame or a brief snippet of the frame sequence from a database containing a multitude of movies and videos.

Although the invention is presented here as applied to Pictures that are two-dimensional in nature, there is nothing in the presentation which would not allow it to be extended into lower or higher dimensions as required for applications such as Audio Analysis, Computer Assisted Tomography (CAT Scanned images), Ultrasonic Tomography (Ultrasound Scanned images), Positron Emission Tomograph (PET Scanned images) and Magnetic Resonance Imaging (MRI Scanned images).

The operation of the Visual Key Database consists of two phases, a learning phase and a query phase. Learning a new Picture is a multi-step process. The submitted Picture is converted into a Digital Image and entered into the program. The program creates new database objects for the new Picture and places them in the appropriate database collections. The new database objects are linked together and collectively represent the newly submitted Picture. The program analyses the Digital Image and places measurements obtained from the analysis into one of the newly created database objects called a Visual Key Vector. It then computes a special binary code called an Index Key from the analysis results and records it in the Visual Key Database object. Finally, the program places all of the Picture's other relevant data into the other appropriate new objects.

The database can be queried if it contains at least one picture. Pictures are selected from the database by matching the selection criteria specified in the query to objects in the database. When a query contains a Digital Image amongst its query arguments, the program analyzes the Digital Image and constructs a Visual Key and an Index Key. It then locates a matching Index Key if it is present and determines how well the Visual Keys match. If a matching Index Key is not found, or if the Visual Keys do not match sufficiently well, the program constructs another Index Key statistically closest to the first and tries again. Visual Keys of Pictures in the database that match the Query Picture's Visual Key sufficiently well are then further selected by the other specified selection criteria in the query.

A very important feature of the present invention is that the Digital Image of the Picture submitted in the query need not be identical to the Digital Image of the Picture that was learned in order for them to be matched. The only requirement is that both the learned Digital Image and the query Digital Image be of the same Picture, or a very close facsimile thereof.

The learned and query Digital Images can differ in many respects, including image file size, spatial resolution, color resolution (bits per pixel), number of colors, focus, blur, sharpness, color equalization, color correction, coloration, distortion, format (bitmap, jpeg, gif, etc.), degree of image compression (for jpeg and mpeg images), additive noise, spatial distortion and image cropping. The degree to which a query Digital Image and a learned Digital Image can differ and still be matched by the methods described in this invention is largely a function of how many Pictures are in the Visual Key Database and the degree of similarity of the Pictures with each other. The greater the differences between the individual Pictures represented in the database, the greater will be the tolerance for Digital Image differences in the matching process.

A Visual Key Vector derived from a query Digital image will not always perfectly match the Visual Key Vector in the database for other reasons generally connected to differences among devices which are used to acquire and digitize the images. Considering the device issue, differences will exist between images of the same picture if they are acquired by, respectively, a flatbed scanner and a digital video camera. It is also true that differences generally will exist between two images of the same picture taken at different times, due to imager system noise, variations in picture illumination, etc. Differences often exist between images of the same picture acquired from different representations of the picture (the original Mona Lisa vs. a copy; images of a given page of a magazine acquired from different copies of the magazine, etc.).

Visual Key Database

A primary purpose of this invention is to automatically connect a Picture with its Content, Context and Representation. We call this Automatic Picture Identification.

Another purpose of this invention is to enable a database containing Picture Contents, Contexts and Representations to be searched by Queries constructed not only of words, numbers, dates, dollars, etc., but also by Pictures.

A principle objective of this invention is to achieve its purposes without requiring the database to store a copy of a Picture's Representation. Although the database may contain Representations of all or some of its Pictures, the Representations are not employed in achieving the invention's purpose. Rather, the Representation is employed primarily as a means of visually confirming that a Picture has been correctly identified.

The invention presuppoes that a given Picture may multiply appear in the database. Therefore another purpose of the database is to permit a query to retrieve all the Contents and Contexts of a given Picture.

A primary application of this invention is to automatically associate a Picture with a Picture Object Stream. Another primary application of this invention is to automatically associate a short sequence of streamed Pictures with its parent Picture Object Stream We call the database described above a Visual Key Database.

Visual Key Database Description

A Visual Key Database usually contains four Collections of objects: Visual Key Vectors, Contents, Contexts and Representations. Additionally, a Visual Key Database may contain a fifth Collection of Picture Stream Objects. A Visual Key Database uses its Visual Key Vectors to identify Pictures and make their Contents, Contexts, Representations and parent Picture Streams available. A Visual Key Database programmatically selects a Visual Key Vector from its Collection of Visual Key Vectors by analyzing a Picture submitted to it as a Digital Image. The selected Visual Key Vector then identifies the appropriate Content, Context and Representation for the submitted Picture.

A Content Object includes the details of a Picture's Content as data. A Content Object also includes methods to store and retrieve either individual data items or predefined Content descriptors that combine individual data items. Similarly, a Context Object includes the details of a Picture's Context as data, and methods to store and retrieve individual data items and Context descriptors combining individual data items. Picture Stream Objects include an Ordered Collection of Picture Objects, which constitute the elements of the Picture Stream. Picture Stream Objects include the details describing a Picture Stream which are not included in the Content and Context Objects of the individual Picture Objects in the Stream.

An Index Key is an alphanumeric string that identifies a Visual Key Vector for purposes of locating and retrieving it from the database. An Index Key is often, but not necessarily, unique. A Visual Key Vector is a set of measurements analyzed from the Digital Image of a Picture.

Objects in the database can be linked to each other in many ways, eliminating the need for duplication of identical objects. For example, a single Picture may have many different Contexts if it has been published in many different venues. Several Pictures Objects, each being a different version of the same underlying Picture, may have the same Content, but different Contexts.

Visual Key Database Operation

Pictures are entered into a Visual Key Database by:
1. Entering a Digital Image of the Picture,
2. Computing a Visual Key Vector and an Index Key for the Digital Image,
3. Entering the Picture's Content data in a new Content Object,
4. Entering the Picture's Context data in a new Context Object,
5. Entering the Picture's Representation in a new Representation Object,
6. Linking the new Visual Key Vector, Content, Context and Representation,
7. Adding the new Visual Key Vector, Content, Context and Representation to the Visual Key Database.

Entering a Picture's Content, Context and Representation can be done manually by the user, automatically by an application supplied by the user, or a combination of the two. For example, the user may employ an Image Understanding program, such as one marketed by Virage, Inc., to automatically generate Content data which may then be stored in the Visual Key Database Content Object. The user may employ a Content or Context description from another database. Some Context data may be directly obtainable from the Picture Object, such as file headers for digital image files or SMPTV codes on individual video frames. Picture Representations may be supplied by the user or extracted directly from the Picture's Digital Image.

Once Pictures are entered into a Visual Key Database, it can be queried. The Visual Key Database is Queried with a Picture by:
1. Entering the Digital Image of a Picture,
2. Computing a Visual Key Vector for the Digital Image,
3. Entering a Minimum Acceptable Match Score,
4. Computing the most probable Index Key,
5. Locating the Index Key in the Collection of Visual Key Vectors, and, if absent, returning to Step 3,
6. Computing a Match Score comparing the Visual Key Vector (from Step 2) to the Visual Key Vector contained in the Visual Key identified by the Index Key,
7. Returning to Step 3 if the Match Score from Step 6 is less than the Minimum Allowable Match Score, and
8. Answering the Content, Context and Representation linked by the Visual Key identified by the Index Key.

It should be noted that the computing of the most probable Index Key at Step 4 will necessarily yield an Index Key that has not been previously computed, unless the database contains another copy of the previous Index Key, in which case Step 4 will return the previous Index Key.

The Match Score is a number between 0 and 100 that indicates how good a Visual Key Vector match is, 100 being a perfect match. Also note that each iteration begins with step 3 rather then step 4, allowing the Minimum Acceptable Match Score to be increased as the Visual Key Database is searched deeper and deeper for an acceptable match.

Entering Picture Objects into a Visual Key Database

The following paragraphs are an elaboration of the steps previously outlined, detailing the construction of a Visual Key Database. This section follows the flowchart in FIG. 1, which illustrates the steps involved in entering new Pictures into the Visual Key Database 100.

The first step in the process is to establish a DO loop to run through all of the pictures to be loaded 101. If the Picture is not already in digital form, it is digitized at 102. The Picture Object may be a paper photograph or a single video frame recorded on a VHS tape cassette. Many techniques exist for converting the Picture Object's Picture data into a Digital Image. Many more techniques exist for manipulating the Digital Image after the picture has been digitized. A primary purpose of the present invention is to be capable of matching the learned Picture even after its image information has undergone multiple levels of copying, reformatting, compression, encrypting and image manipulation. If the Picture is originally in digital form, this step is skipped.

Figure 3:
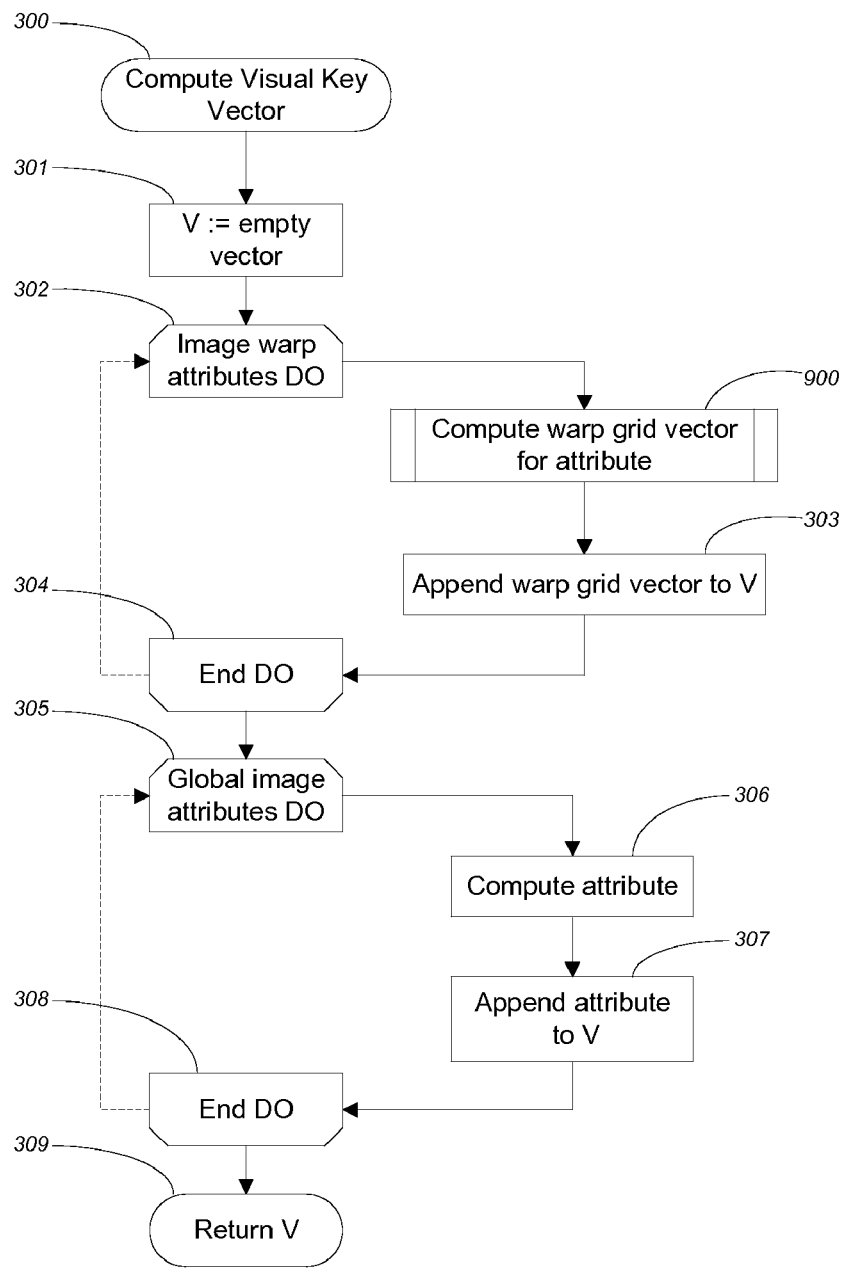
FIG. 3 is a flowchart of the process of computing a Visual Key Vector.

The next' step generates a Visual Key Vector from the Picture's Digital Image 300. A Visual Key Vector is an ordered sequence of computer bytes created by a Visual Key Algorithm with pixel data sampled from the Digital Image. Some of the bytes of a Visual Key Vector are functions of particular regions of the Digital Image. Other bytes of the Visual Key Vector may be based on global image characteristics of the Digital Image. The steps involved in performing the Visual Key Algorithm are illustrated in FIG. 3. The next step (in FIG. 1) involves the selection of the most relevant elements of the Visual Key Vector (V) for storage (as VS) 103. Criteria for selection might be element magnitude (to optimize signal-to-noise ratio) or location of vector origins relative to the image (to maximize independence of vectors or to assure uniform distribution of origins over image space).

Next, an Index Key (K) must be generated 104. This is accomplished by sampling and quantizing V. The process of computing the Index Key from the Visual Key Vector is explained in the section entitled The Index Key below.

Once an Index Key has been generated, all of the related pieces can be stored at this index (K) in the database 105. This includes the Stored Visual Key Vector (VS) and its associated Picture Content, Context and Representation. This step really combines several related operations, as follows:
  a) Optionally entering the Picture's Content data in a new Content Object. As previously described, the Picture's Content data may include subject, subject name, subject type, subject activity, subject relationships, subject descriptors, keywords, location and setting. Additional user defined Content descriptors can be supplied.
  b) Optionally entering the Picture's Context data in a new Context Object. As previously described, the Picture's Context data may include date, title, owner, artist, copyright, rating, producer, session, roll, frame, material, media, storage location, size, proportions and condition. Additional user defined Context descriptors can be supplied.
  c) Optionally entering the Picture's Representation in a new Representation Object. As previously described, the Picture's Representation is a visually identifiable icon for a Picture.
  d) Linking the new Visual Key Vector, Content, Context and Representation Objects.
  e) Adding the new Visual Key Vector, Content, Context and Representation to the Visual Key Database at its Index Key. The database is then preferably ordered in ascending order of the index keys:

Once this process of loading has been completed for the Pictures at hand, the DO loop is ended 106. Of course, additional Pictures added to the Visual Key Database at any time by repeating these steps as necessary.

Querying the Visual Key Database

This section goes into greater detail on the process of Querying the Visual Key Database; it is an elaboration of the steps previously outlined.

Once Pictures have been learned, the Visual Key Database can be searched by presenting a query in terms of a Picture and/or auxiliary information related to that Picture. As with other databases, selection criteria may include matching text values, selecting non-negative numerical values or finding a range of dates. In addition, the present invention adds the feature that selection criteria may include choosing all Picture Objects whose Pictures match the Query Picture. The techniques for database querying for all data types other than Pictures are well known and will not be discussed here. Rather, we will focus on the activity of selecting records from a Visual Key Database by presenting Queries that include Digital Images.

Examples of Visual Key Database Queries include:

Select all-black and white photographs that match the Query Picture with a certainty of 90%.

Select the Picture Object that best matches the Query Picture.

Select all magazine advertisements from the period 1950 to 1960 that match the Query Picture with a certainty of 70%.

Select the frame from the movie "Gone With The Wind" that best matches the Query Picture.

Obviously, the above list could be extended indefinitely. The important point is that the present invention permits database querying to be expanded to data types that make searches possible that previously were impossible.

Figure 2:
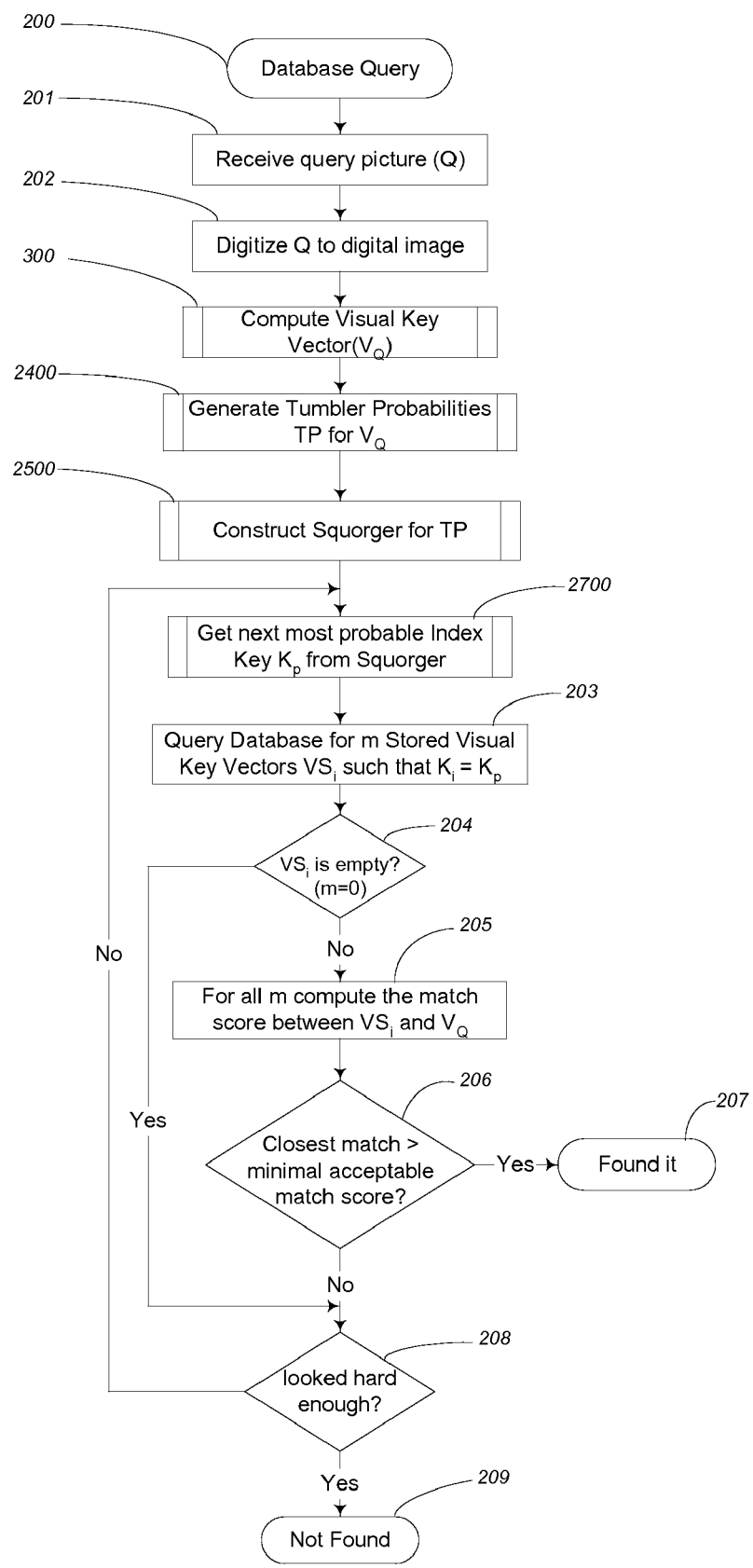
FIG. 2 is a flowchart of the process of querying the Visual Key Database.

The flowchart in FIG. 2 illustrates the steps involved in selecting Picture Objects from a Visual Key Database using a Picture as the Query 200. First, the Picture is received as a query (Q) 201 by digitizing it to a Digital Image 202. This step is skipped if the Picture is already in the form of a Digital Image.

Next, a Visual Key Vector, $V_Q$, is generated for the Digital Image of the Query Picture 300. This process is illustrated in FIG. 3. Up through this point, the steps are the same as in the process of loading Pictures into the database.

Figure 24:
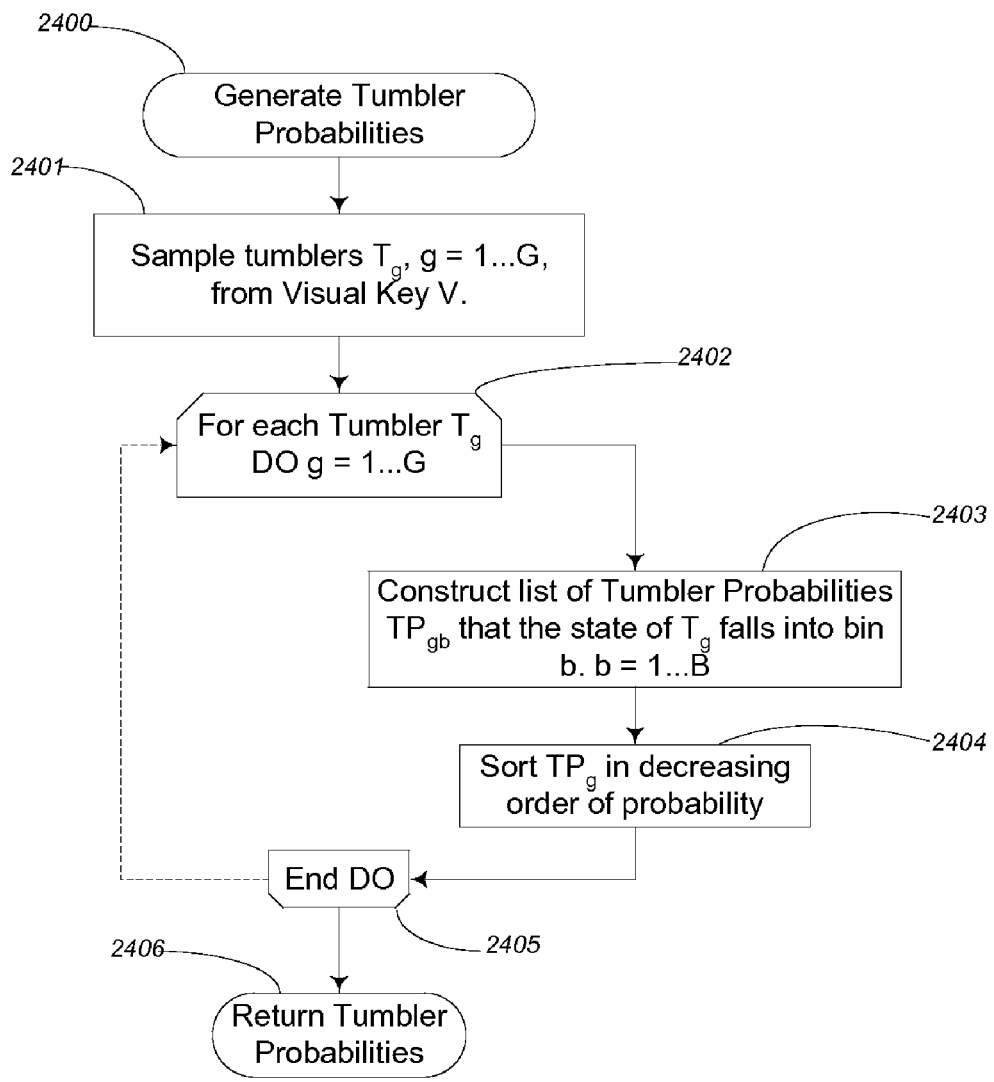
FIG. 24 is a flowchart of the process of generating Tumbler Probabilities.

In preparation for finding the best match to the Query Picture in the database, we must construct the Query Picture's Tumbler Probabilities 2400. This is identical to the Index Key produced when loading the database, and will be used to compare with the Index Keys in the database to narrow the search. This process is illustrated in FIG. 24.

Figure 25:
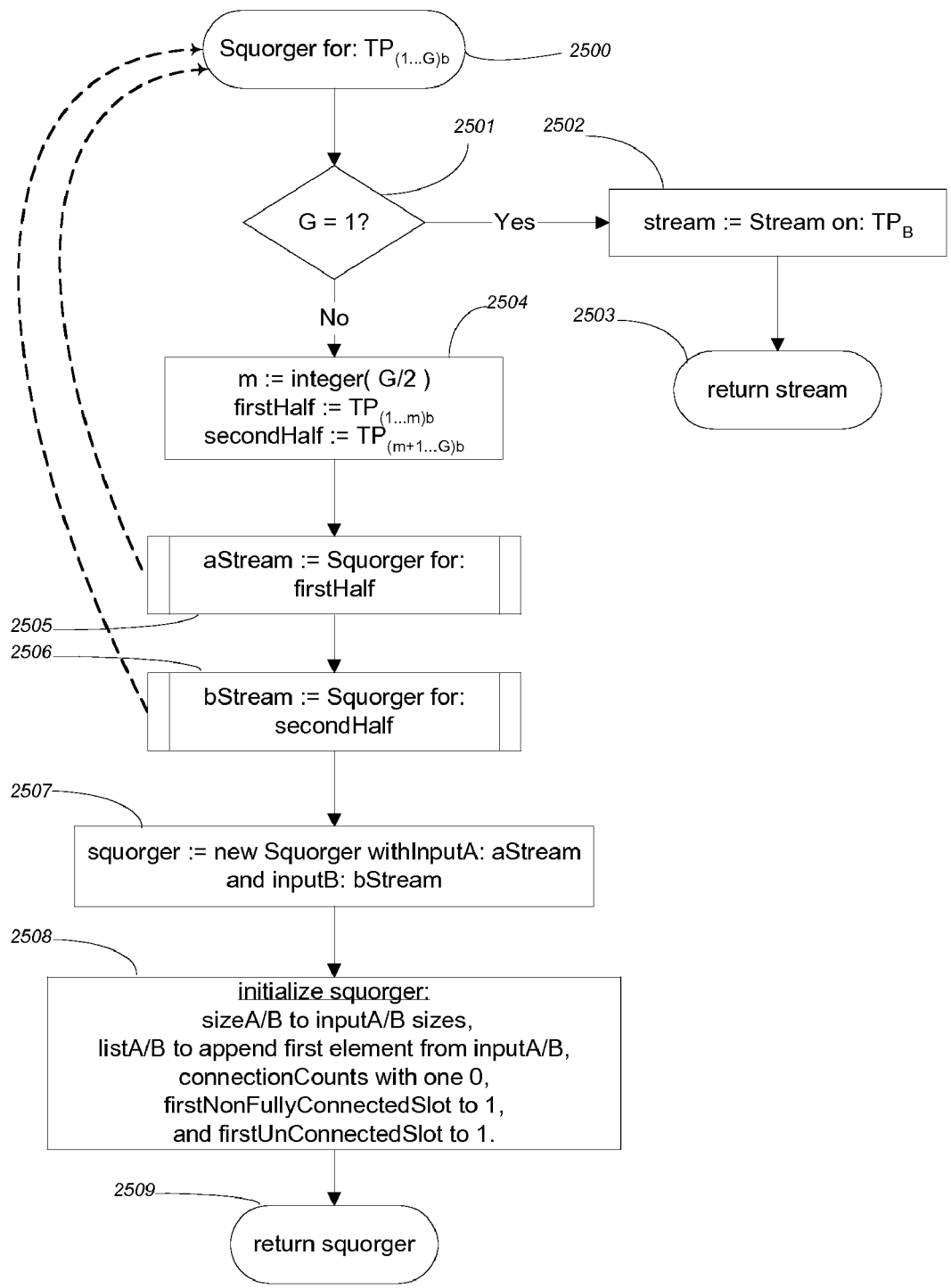
FIG. 25 is a flowchart of the process of Recursive Squorging.

In order to decide which Index Keys should be searched, a Squorger tree is constructed 2500. The Squorger methodology, which will be described in detail later, provides a mechanism through which Index Keys can be extracted in order of statistical proximity to the Query Picture's Index Key. The first Index Key to be searched is the one that is identical to the Query Picture's Tumbler Probabilities, which obviously provides a perfect match to itself. The process of constructing the Squorger tree is illustrated in FIG. 25, and is discussed in the section entitled Recursion flowchart below.

Figure 27:
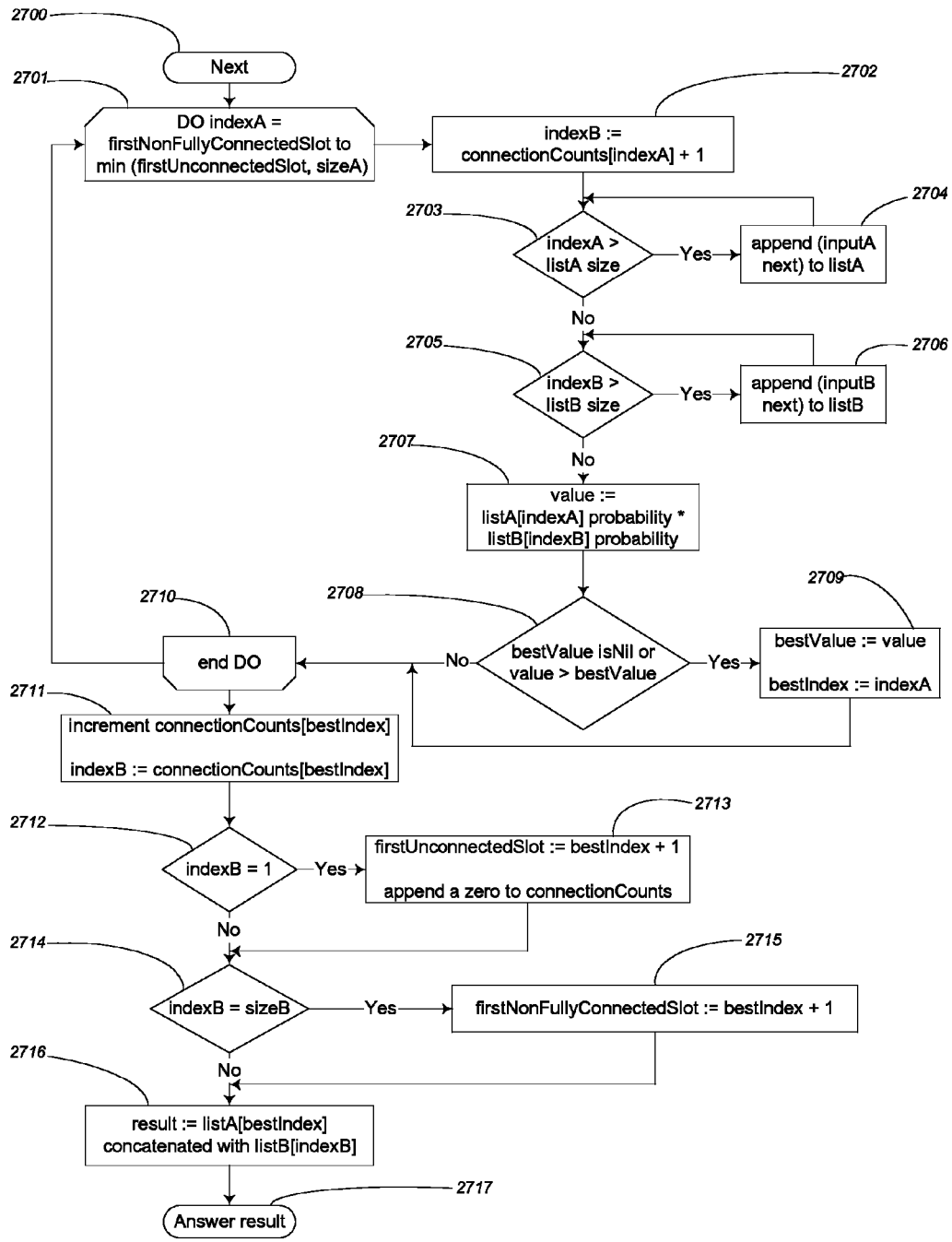
FIG. 27 is a flowchart of the Squorger next method. This is the method that is used to request the Squorger to fetch the next most likely Index Key from among the possible combinations.

At each probe of the database, it extracts the next candidate Index Key ($K_p$) from the Squorger 2700. The very first Index Key extracted will match the Query Picture's Tumbler Probabilities exactly. As subsequent probes are made, the Index Key extracted may be farther and farther from the Query Picture's Tumbler Probabilities. This process is illustrated in FIG. 27, and is discussed in the section entitled Detail of Squorger next Method.

Next, the database is queried to determine whether it contains an Index Key that matches the current Index Key ($K_p$) pulled from the Squorger 203. If no match is found 204, a new Index Key is pulled from the squorger and another comparison is made (provided we have not decided that we've looked far enough 208). If a match to $K_p$ is found, all of the Visual Key Vectors at that Index Key must be compared against the Query Picture's Visual Key Vector to produce a match score 205.

If the closest of these matches is greater than the minimal acceptable match score, then we've found the best match to the Query Picture from the Visual Key Database 207. If not, we have to decide whether we have looked sufficiently to be satisfied that it is not contained within the database 208. If not, we'll ask the Squorger for the next most likely Index Key and repeat the process 2700. If we have searched enough to be satisfied, we report that it was not found 209. This cycle is repeated until a match is found, in which case we proceed to the next step in the algorithm.

Although the algorithm is shown to be specific in the criteria for a match, an infinite variety of acceptance criteria could be incorporated into the algorithm (Find the three best matches; find the first five matches all of which have a match score less than x; etc.).

Visual Key Generation Algorithm

If the Digital Image of the Query Picture were always identical to the Digital Image of the Matching Picture, then the process of picture matching would be reduced to Digital Image pixel matching, or, as it is, called in image processing, template matching. However, in all practical circumstances, pixel matching fails because Digital Images which are very similar in appearance can have very different corresponding pixel values. Local variations in the Digital Image due to artifacts of decompression, additive noise, image distortion, image scaling, focus, color depth, etc. can render template matching completely useless, even though, to an observer, the Digital Images clearly are of the same Picture.

For this reason and for reasons to be explained, the concept of a Visual Key Vector of a Digital Image of a Picture is introduced. A Visual Key Vector of a Digital Image typically contains two kinds of information, global information and local information. Global information can consist of classical image measures like color histograms and discrete cosine transform coefficients. Local information is contained in the results of applying a Warp Algorithm, to the Digital Image. In practice, satisfactory performance of the Visual Key Database system can be realized by computing the Warp Grid Vector 300 alone without the global attributes 305. The decision as to whether to add the global attributes is left to the user to be based upon the level of performance desired. This Warp Grid Vector portion of the Visual Key Vector characterizes the Digital Image in a unique way that is not directly tied to specific pixel values. Instead, it uses the relationships between the Pixel values across the whole Digital Image to recognize its general visual structure. This then becomes a "signature" or "fingerprint" of the Picture, which survives most variations due to processing artifacts and causes previously mentioned.

Figure 9:
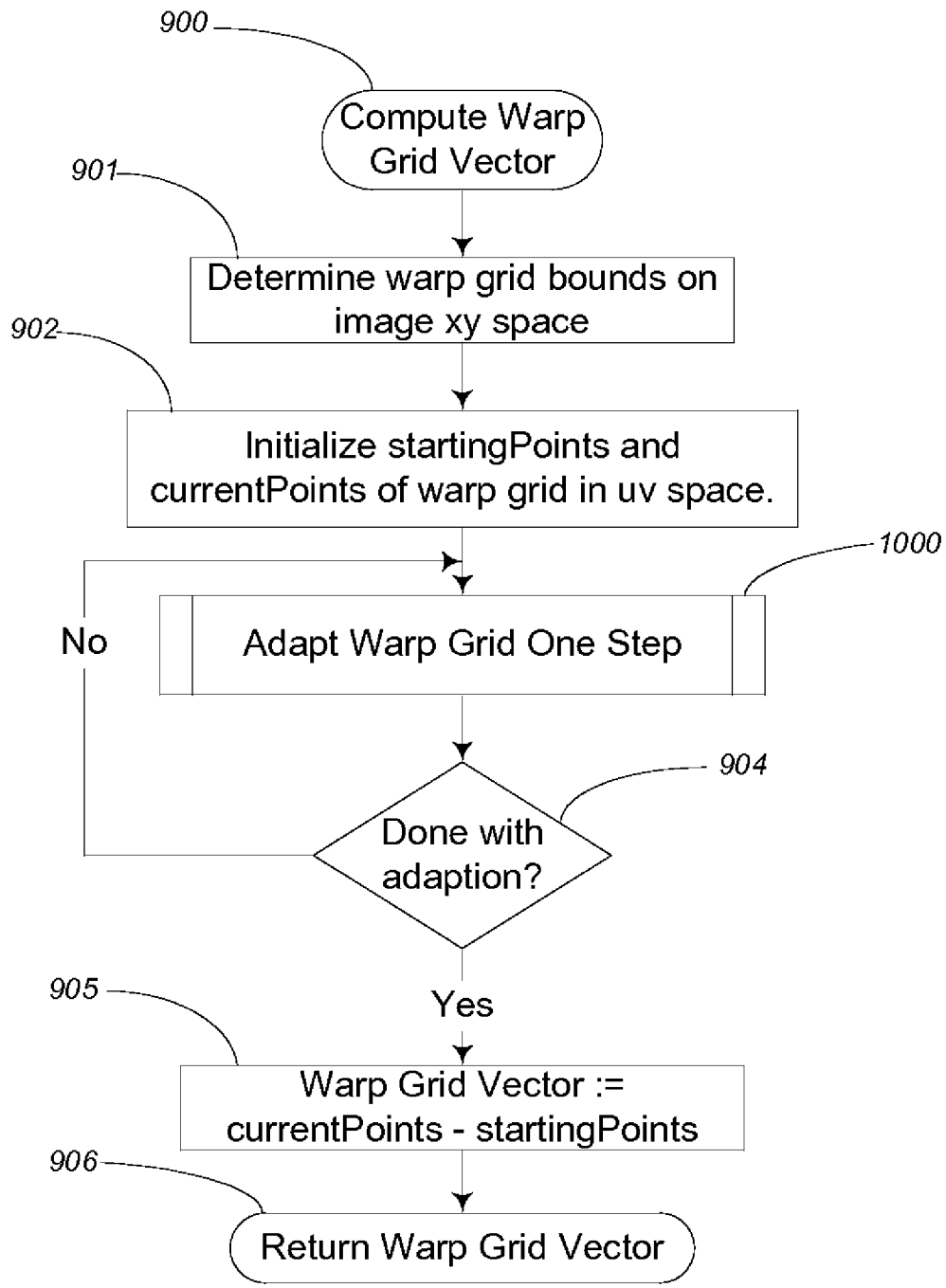
FIG. 9 is a flowchart of the process of computing a Warp Grid Vector.

Constructing the Visual Key Vector, then, consists of combining the global values to be used with the local values (Warp Grid Vectors) all into a single vector. Here we'll go through the flowchart of this process, shown in FIG. 3. To compute the Visual Key Vector 300, we start with an empty vector (V) 301. A DO loop is set up to go through each of the attributes for which we will generate a Warp Grid Vector 302. The process of computing a Warp Grid Vector for a given attribute 900 is illustrated in FIG. 9 and explained in the section entitled Computing the Warp Grid Vector, found on page 73 of this document. This Warp Grid Vector is then appended to V 303, until all of the Warp Grid Vectors are included 304 in the new vector (V).

Next we must append the global attributes to V. A DO loop is set up to go through each of the global attributes to be included 305. For each of these attributes, we'll do whatever is required to compute the attribute 306. As mentioned previously, these could be any overall attributes of the Digital Image, including classical image measures like color histograms and discrete cosine transform coefficients. The vector thus produced is then appended to V 307, until all of global image attribute vectors are included in the new vector (V) 308, which is then returned as the Visual Key Vector 309.

Warp Grid Adaptation Examples

During the following explanations of the Warp Grid Algorithm we will make use of examples based on the Picture on the front of a 1985 Topps Mark McGwire Rookie Baseball Card. This Picture example is chosen because the Picture Object has recently enjoyed a substantial rise in its value, and there is a peaked interest in recognizing it from thousands of other cards.

Figure 4:
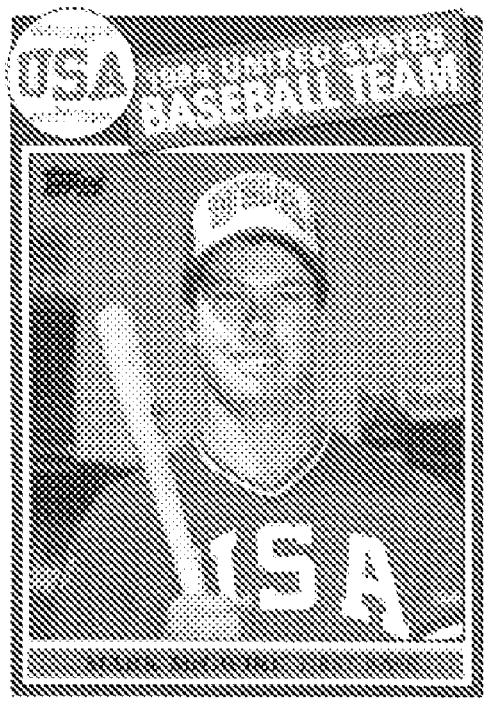
FIG. 4 is an example Picture from the front of a 1985 Topps Mark McGwire Rookie Baseball Card. This picture is used throughout the illustrations of the Warp Grid adaptation process.

FIG. 4 is a black and white representation of the Picture on the card's front side. The Representation is a black and white version of a full color Digital Image, which is 354-by-512 pixels and 24 bits in color depth. The card borders are white, hence they do not contrast against the white, paper background of the card illustration.

Figure 5:
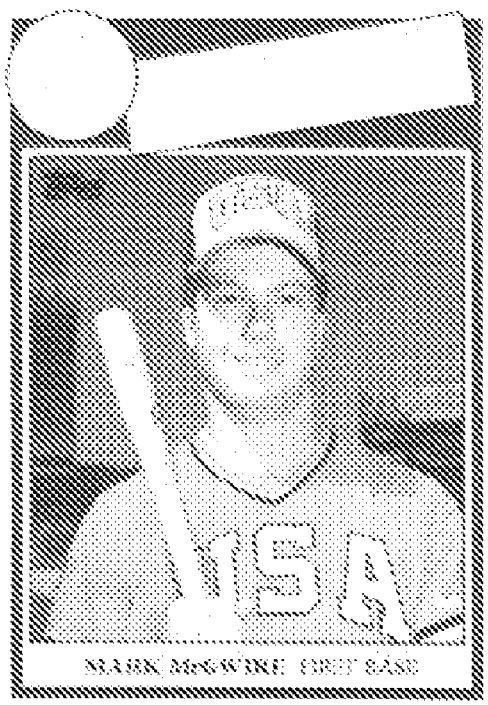
FIG. 5 is the same Picture as FIG. 4, showing only the red channel of the Digital Image.

FIG. 5 is a black and white representation of the red channel only of the Digital Image represented in FIG. 4. Red pixel brightness values range from 0 to 255, represented here as grey values ranging from black to white respectively.

The Warp Algorithm

Rather than analyzing the Digital Image in terms of specific pixel values, the Warp Algorithm recognizes broader patterns of color, shape and texture, much as the human eye perceives the Picture itself. Now we'll look in detail at how the Warp Grid Vector is derived by applying the Warp Algorithm to a Digital Image. The reason it is called a Warp Algorithm will soon become apparent. Note that the Digital Image itself is never changed in the process of applying the Warp Algorithm to the Digital Image.

An Initialized Warp Grid is an M row-by-N column grid of points contained within a rectangle 1 unit on a side centered at and oriented to a Cartesian Coordinate System, with coordinates u and v. The grid points of an Initialized Warp Grid are preferably evenly spaced over its bounding rectangle. This Initialized Warp Grid is superimposed upon the Digital Image, in preparation for adapting it to the pictorial content of the Digital Image.

Figure 6:
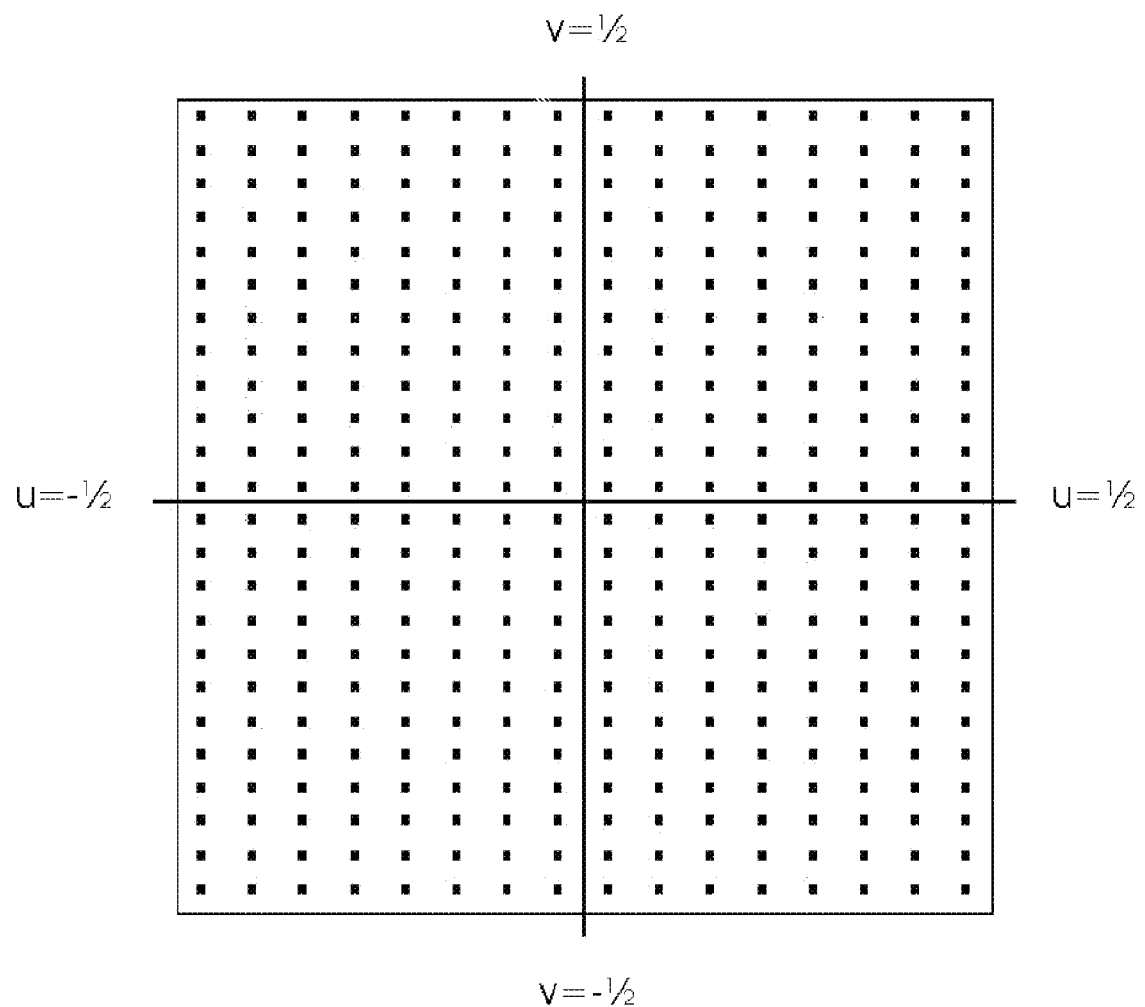
FIG. 6 shows a 16-by-24 Warp Grid plotted in the UV Coordinate System.

FIG. 6 illustrates a 16-by-24 Warp Grid plotted in the UV Coordinate System. All Grid Points are uniformly spaced and centered within a 1-by-1 rectangle, illustrated here by the solid border around the grid. Although the Grid Points are represented here by rectangular arrays of black' pixels, the actual Grid Point is a pair of floating point numbers, (u,v).

Figure 7:
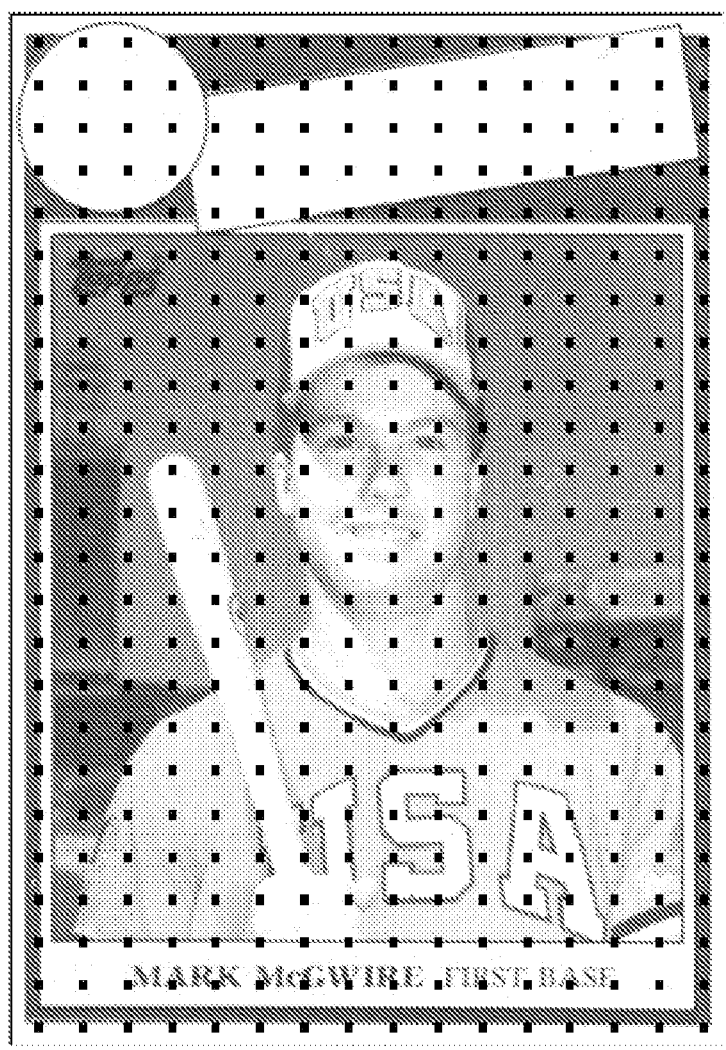
FIG. 7 shows an Initialized Warp Grid (16×24) superimposed on a Digital Image.

FIG. 7 represents the initialized 16-by-24 Warp Grid of FIG. 6 superimposed on the red channel of the Digital Image.

In this case, the Warp Grid is superimposed on the Digital Image by matching their borders. The points of the Warp Grid are illustrated by rectangular black dots, enlarged to 4-by-5 pixels for easy visibility. Note that the border at the top and left edges of the card are an artifact of the process used to capture the image for publication.

Computing the Warp Grid Vector

Figure 8:
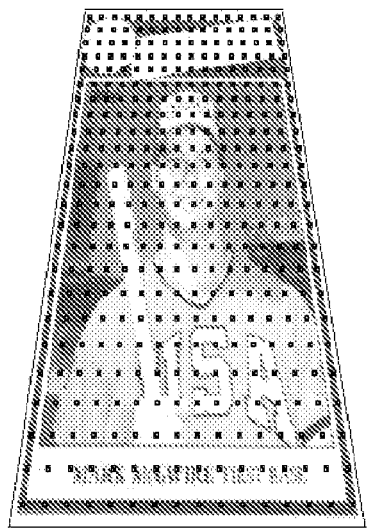
FIG. 8 shows a quadrilateral superimposition of a rectangular Warp Grid on a perspective-distorted Digital Image.

Referring to FIG. 9, we go through the process of computing the Warp Grid Vector 900. First we must determine the Warp Grid bounds on the image in terms of xy space 901. Commonly this will be a rectangle that corresponds to the bounds of the Digital Image itself; however, the Initialized Warp Grid need not be uniformly spread over the Digital Image. It may occupy just a portion of the image, or the points in the Initialized Warp Grid may be non-uniformly spaced. The rectangular shape of the Warp Grid may be distorted in the process of superimposing it on the Digital Image. Extending the permissible geometries of the regions in the Digital Image to which the Warp Grid is applied to include any bounding quadrilateral, not just rectangles, allows the Warp Grid to be much more flexible. This feature is particularly useful when the Digital Image of a rectangular Picture Object like a picture post card is obtained from a camera that is not positioned on a perpendicular centered on the Picture Object, thus yielding a perspective distorted rectangle. The image of the perspective distorted Post Card is in general a quadrilateral contained in the Digital Image. Given the positions of the four corners of the quadrilateral, the rectangular Warp Grid can be rotated and stretched to fit the Post Card imaged geometry. A quadrilateral superimposition of a rectangular Warp Grid is illustrated in FIG. 8.

Additionally, grid lattice geometries other than the rectangular grid may be used, such as hexagonal, spiral, radial, etc. This disclosure will focus exclusively on the rectangular grid, but it will be apparent to one skilled in the art that equivalent results can be obtained with grids of points generated in other geometries.

In general, the number of points in the Warp Grid is considerably less than the number of pixels in the Digital Image. Each Warp Grid Point specifies the location of a single pixel memory access of the digital image at each iteration of the Warp Grid Algorithm. Therefore, the total number of pixel memory accesses performed in the Warp Algorithm is typically less than the total number of pixels in a digital image, and frequently much less.

Warp Grids of more or fewer points may be employed as determined by the desired performance and size of the Visual Key Database implementation. In general, the greater the number of Warp Grid points, the greater will be the sensitivity of the Visual Key Database to the details of the Composition of the Pictures it contains.

The next step is to initialize the points on the Warp Grid 902. Points in the Warp Grid (Grid Points) are indexed as the $m^{th}$ column and $n^{th}$ row, starting with 0 at the upper left-hand corner of the grid. This index represents the identity of each Grid Point, and does not change no matter how much the location may change. Each Grid Point keeps track of its location by recording its u and v coordinates. Each Grid Point also records its level, which will be discussed shortly. Upon initialization of the Warp Grid, startingPoints and currentPoints are both set to the initial collection of Grid Points 902. startingPoints remains unaltered, and represents the record of the original location of the Grid Points. currentPoints is the set of Grid Points that is actually adapted with each iteration of the Warp Algorithm.

Figure 10:
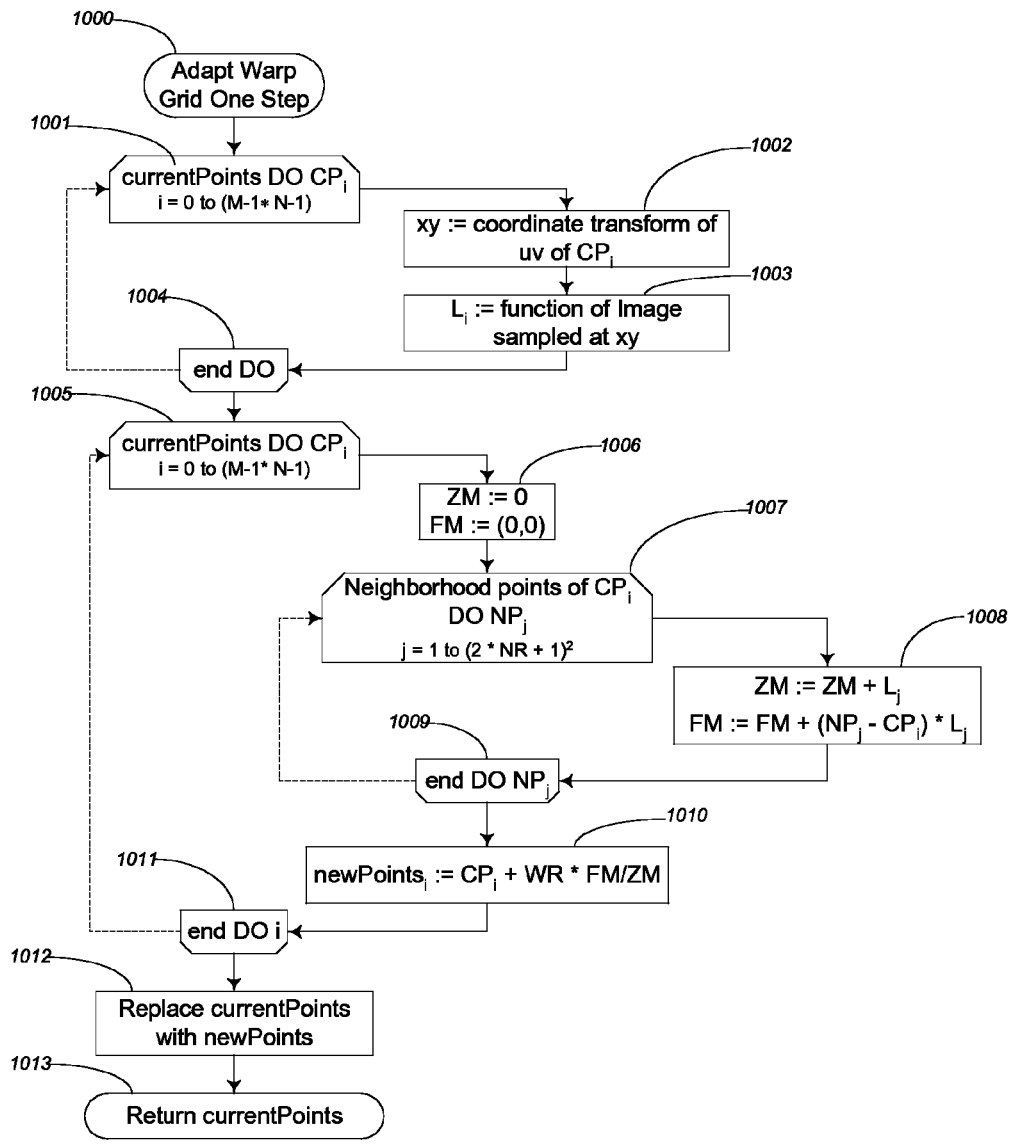
FIG. 10 is a flowchart of the process of adapting the Warp Grid a single step.

With the Warp Grid fully initialized, we begin the iterative process of adapting it to the Digital Image. Each iteration moves each of the currentPoints to a new location based on the sampled values at its current location as well as the motion of its neighbors 1000. This process is illustrated in FIG. 10 and is explained in the section Adapting the Warp Grid.

After each iteration of the process, we must decide whether the Warp Grid has been adapted sufficiently to fully characterize the Picture 904. If not, we must adapt it another step. If it has been adapted sufficiently, we have enough information to create the Warp Grid Vector, simply by taking the difference between each of the currentPoints and their corresponding startingPoints 905. Each of these values (typically a floating point number) becomes one element of the Warp Grid Vector, which is then returned 906.

How do we decide when the Warp Grid is fully adapted to the Digital Image? This can be done in a couple of ways. We can decide on a fixed number of iterations, decrement a counter each time the Warp Grid is adapted, then simply stop when the counter has been decremented to 0. The number of iterations used would be chosen based on experiments with large numbers of representative images. We, can also make use of the behavior of the Warp Grid points themselves. In order to do that, we must take a closer look at the behavior of Warp Grids and the factors that alter that behavior.

The overall process of sampling the Digital Image and offsetting the currentPoints in the direction of the center-of-gravity of each grid point's Connectivity Pattern deforms the Warp Grid at each iteration. This is why the process is called a "Warp" Algorithm. In general, each successive iteration of the Warp Algorithm deforms the grid further and further until a near equilibrium is reached, after which the points move very little or very slowly or not at all.

In other words, the Warp Algorithm does not deform the Warp Grid indefinitely. After a suitably large number of iterations, typically fewer thin 100, an equilibrium condition occurs where the grid points will displace no further with additional Warp Algorithm iterations. Many grid points sit perfectly still, but some points will irregularly oscillate with relatively small movement around an equilibrium position. Grid Points in equilibrium self organize spatially over a Digital Image. A Grid Point finds itself in equilibrium when the tensions exerted by all its connecting Grid Points balance and cancel each other out. A Warp Grid achieves equilibrium when all its Grid Points have achieved equilibrium.

The equilibrium configuration does not depend on individual pixel values in a Digital Image. Rather, it depends only on the patterns of color, shape, texture, etc. that comprise the Composition of the Picture and its Digital Image. As the Warp Grid adapts to a Digital Image, each Grid Point walks a path determined by the n points in its Connectivity Pattern, guided like a blind man by n hungry seeing eye dogs, leashed and pulling him in n directions, until finally their pulls balance and he is held stationary. As the Warp Grid adapts, the footprint of the n grid points composing a given Connection Pattern adapts itself from its initial pattern to a new freeform configuration, which conforms to the Composition of the Digital Image in a particular region.

If two different Digital Images are prepared from the same Picture, perhaps differing in resolution and image artifacts, introduced by the method of compression, e.g. gif or jpeg, the equilibrium configuration of the adapted Warp Grid for each Digital Image will be the same or very nearly so.

The Equilibrium Configuration of a given Warp Grid is primarily determined by the Composition of the Picture represented in the Digital Image. However, it can also be affected by the Neighborhood Radius (NR), a constant that are used in the Warp Algorithm. Another such constant, Warp Rate (WR) does not have a significant effect on the Equilibrium Configuration (see FIG. 14).

WR globally alters how far each of the currentPoints moves at each iteration; NR determines which of its immediate neighbors exert a direct influence on its motion. Both of these concepts will be explored in depth later, but it is important to note that there are settings of these constants that will cause the Warp Grid never to reach a stable equilibrium. For example, if WR is too high, points may jump past their point of equilibrium in one step, and jump back past it in the next, i.e., they will oscillate. In general, values of WR<1 will permit an equilibrium configuration to be reached.

The WR can be changed at each iteration of the Warp Algorithm. Reducing the WR as equilibrium is reached produces a more stable and repeatable equilibrium configuration. This process is termed "Synthetic Annealing" in some image processing texts.

Rather than depending upon a fixed number of iterations, the test for determining when to end the adaptation process could be based on how close the warp grid has come to its equilibrium configuration. One possible measure for determining how far towards equilibrium the adaptation has come is simply the total of all the individual grid point offset magnitudes in a single iteration. As equilibrium is approached, the total offset magnitude at each iteration approached zero.

Figure 11:
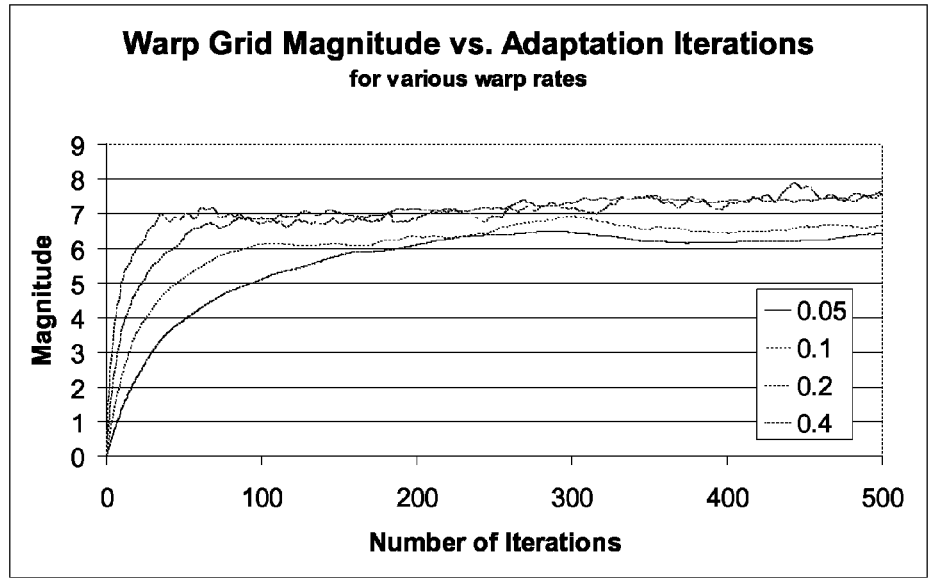
FIG. 11 is a graph showing the relationship between the magnitude of Warp Grid Vectors and the number of iterations of the Warp Algorithm. This illustrates the tendency of Warp Grid Vectors to come to a state of equilibrium.

The graph in FIG. 11 illustrates the number of adaptation process steps to reach equilibrium for different Warp Rates. Magnitude is the magnitude of the Warp Grid Vector, the vector whose elements are the individual Warp Grid Displacement Vectors. It increases monotonically until equilibrium is reached, thereafter fluctuating around an equilibrium value. As can be seen from the graph, 250 iterations are sufficient to reach equilibrium for all of the cases illustrated.

Warp Grids characterize digital images in an extremely efficient manner, both in their construction and their storage. Warp Grids are adapted by sampling the digital image, and, in general, the number of samples required to adapt a Warp Grid is significantly less than the total number of pixels in the digital image. Warp Grids characterize digital images only insofar as to allow them to be distinguished from one another. Digital images cannot be recovered from Warp Grid data, i.e., Warp Grids are not a form of digital image compression.

Adapting the Warp Grid

Connectivity Patterns

In order to understand the process of adapting the Warp Grid to the Digital Image, we must understand the concept of a Connectivity Pattern. A Warp Grid Connectivity Pattern determines how Warp Grid points connect to each other and how the movement of their neighbors affects their individual movements. Each given point in the Warp Grid is directly connected to a finite set of other points in the grid, known as the Connectivity Pattern. An Initialized Warp Grid is completely characterized by the locations of all its points and its Connectivity Pattern.

Figure 12:
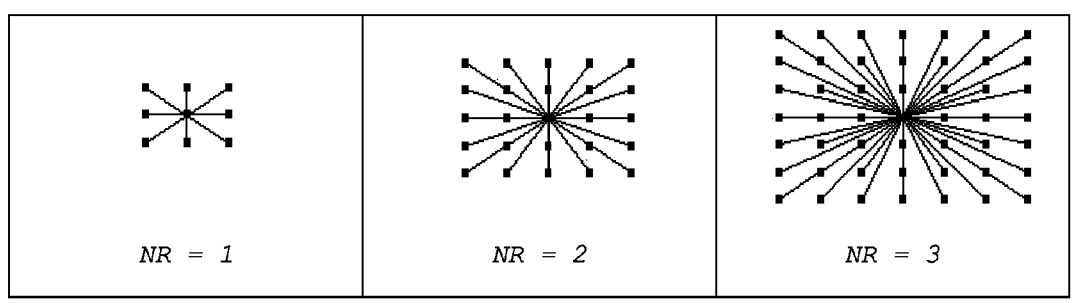
FIG. 12 illustrates three possible Connectivity Patterns for an Initialized Warp Grid, showing a Neighborhood Radius of 1, 2 and 3, respectively.

FIG. 12 illustrates three possible Connectivity Patterns for the Initialized Warp Grid illustrated in FIG. 6. The Connectivity Patterns represented here are called Neighborhood Configurations. The Neighborhood. Configuration consists of a central point surrounded by square layers of surrounding points. A Neighborhood Configuration is defined by its Neighborhood Radius (NR), which is the number of layers surrounding the central point. The lines connecting the central point to its surrounding points symbolize the dependency of the central point on its neighbors.

At each iteration of the Warp Algorithm, the positions of all the Warp Grid points are modified based on sampled, pixel values in the Digital Image. Although Warp Grid points move, their Connectivity Pattern never changes. Points in the Warp Grid remain connected to the points in their respective Connectivity Pattern regardless of the positions of those points in the u,v space.

The Connectivity Pattern is homogenous over the entire Warp Grid. Every point has the same configuration of connections, even though it may lie at or near an edge of the Warp Grid. Points that lie along the edges of the grid are connected to grid points on the opposite side of the grid, i.e., points along the top of the grid connect to points along the bottom of the grid, points along the left edge of the grid connect to points along the right edge of the grid. In terms of the Warp Grid point indices m and n, the indices are computed as m mod M and n mod N, where M and N are the dimensions of the Warp Grid.

In general, both the Digital Image and the Warp Grid are treated as if they were totally wrapped around a toroidal surface with opposite edges joined and the surfaces made seamless and homogeneous. Toroidally wrapping the Digital Image and the Warp Grid in this manner eliminates the concerns of edge effects in the calculation of the Warp Grid.

Figure 13:
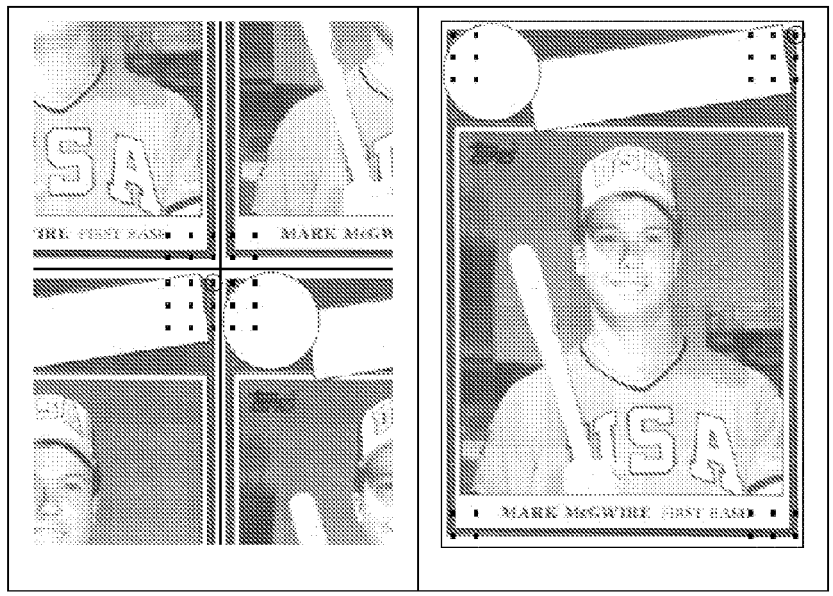
FIG. 13 shows two different representations of the concept of Toroidal Wrapping of the Neighborhood Points. The center of a given Neighborhood Connectivity Pattern is treated as if it is in the very center of an image that fully wraps around (edgeless)

Two representations of the toroidal wrapping of the Neighborhood Points are illustrated in FIG. 13. The Grid Point whose neighborhood is displayed is circled in both figures. Although this Grid Point is located in the upper right corner of the Picture, it is directly connected to Grid Points on all four corners. This Grid Point is treated as though is in the center of the Picture in terms of its relationship with all other Grid Points on the Picture.

Figure 15:
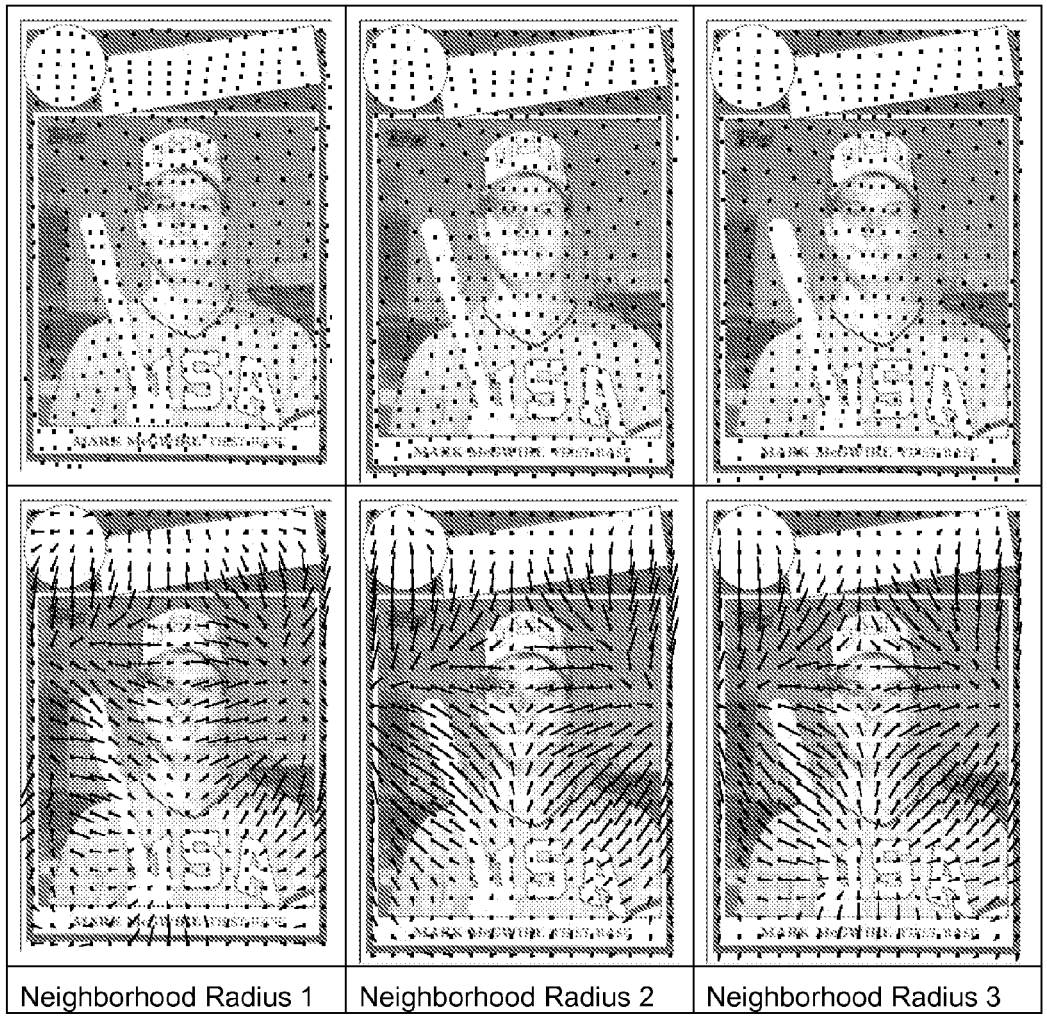
FIG. 15 shows Warp Grid results using 3 different Connectivity Patterns. Although the effect is not drastic, the larger the Connectivity Pattern, the greater the influence of the large, bright regions in the picture.

Although the Equilibrium Configuration is relatively independent of the Warp Rate, it is definitely affected by the Connectivity Pattern. FIG. 15 illustrates the effect of the Connectivity Pattern on the resulting Equilibrium Configuration, showing three different Equilibrium Configurations arising from three different Connectivity Patterns. Although the effect is not drastic, the larger the Connectivity Pattern, the greater the influence of the large, bright regions in the picture. This is best seen in this illustration by examining the head of the bat in the picture. As the Neighborhood Radius increases, the number of Warp Grid points attracted to the bat decreases, as they are drawn further towards the face and neck of the player.

Sampling the Digital Image

The Warp Grid rectangle is superimposed on the bounding rectangle of the Digital Image. Each superimposed Warp Grid point falls within the local boundaries of a unique pixel in the Digital Image. The Warp Grid Point samples the pixel, that is, it takes its level instance variable from the sampled pixel. The sampled level may, in general, be any single valued function of one or more variables measurable in a pixel in the Digital Image. For example, if the Digital Image is a grayscale Digital Image, then the sampled level can be the gray level of the pixel that the grid point falls in. If the Digital Image is a full color Digital Image, then the sampled value could be the level of the red component of the pixel containing the sampling point, the green or blue component, or a combination of one or more color components such as the hue, saturation or lightness of the pixel containing the sampling point. The sampled levels of all points in the Warp Grid are determined prior to the next step in a Warp Grid iteration.

Although the quantity sampled at a sampling point in a Digital Image is typically the level of a color attribute of a pixel, the present invention should not be restrictively viewed as only pertaining to color. For example, pixel values could represent temperature, emissivity, density or other quantities or combination of quantities, any of which could be arranged spatially in a Digital Image format. Though they may be color coded for enhanced visualization, they are not in any way directly connected to color values.

Adapting the Warp Grid a Single Step

The Warp Grid is spatially adapted to the Digital Image. Each given point of the grid is displaced in the u,v Coordinate System from its current position by an offset vector determined from the sampled values and positions of all grid points that belong to the Connection Pattern of the given grid point. Every point in the Warp Grid is simultaneously displaced in accordance with the offset calculation described in the following paragraphs.

In the most basic of the methods for computing the offset vector to be applied to a given Grid Point in the Warp Algorithm spatial adaptation step, the offset vector is calculated from the positions and sampled values of all the Grid Points in the Connection Pattern of the given Grid Point. In particular, the offset vector for the given Grid Point is calculated as a scaling of the position of the center-of-gravity of all of the points in the Connection Pattern of the given point relative to the position of the given point. In the center-of-gravity calculation, the individual Connection Pattern Grid Points are weighted by their level obtained from the previous step of sampling the Digital Image at all Grid Point positions.

Mathematically, if $p_0$ denotes the position of a given point in a Warp Grid measured in the u,v coordinate system and $\{C_0\}$ denotes a set of C points which constitute the Connectivity Pattern of $p_0$, including $p_0$ itself, then the center of gravity of the Connectivity Pattern $p_{\{C0\}}{}^{CG}$ is given by:

$$p_{\{c_0\}}{}^{CG} = \frac{\sum_{p\{c_0\}}[L(p) \; p]}{\sum_{p\{c_0\}}[L(p)]}$$

where $L(p)$ is the sampled level of the Digital Image at the point p.

The offset to be applied in displacing the point $p_0$ is calculated from the center-of-gravity $p_{\{C0\}}{}^{CG}$ as $$p_0{}^{offset} = WR(p_{\{c_0\}}{}^{CG} p_0)$$

A corresponding new point, $p_0{}^{new}$ in the succeeding iteration is calculated from the preceding point $p_0$ and the center of gravity $p_{\{C0\}}{}^{CG}$. The displacement coefficient (Warp Rate) WR is a number generally less than one that is held constant over all points in the Warp Grid at a given iteration of the adaptation step. In particular, the new point $p_0{}^{new}$ is calculated as:

$$p_0{}^{new} = p_0 + p_0{}^{offset}$$

For a value of WR equals 1, at each iteration of the Warp Grid Algorithm, each Warp Grid Point is displaced to the position of the center-of-gravity of its Connection Pattern, where the connecting points are weighted by their values taken from the Digital Image. For values of WR less than 1, the grid points are adapted in the direction of the center-of-gravity a distance proportional to WR. A connecting point thus influences the repositioning of a given grid point in proportion to the product of its level and its distance from the given grid point.

Figure 14:
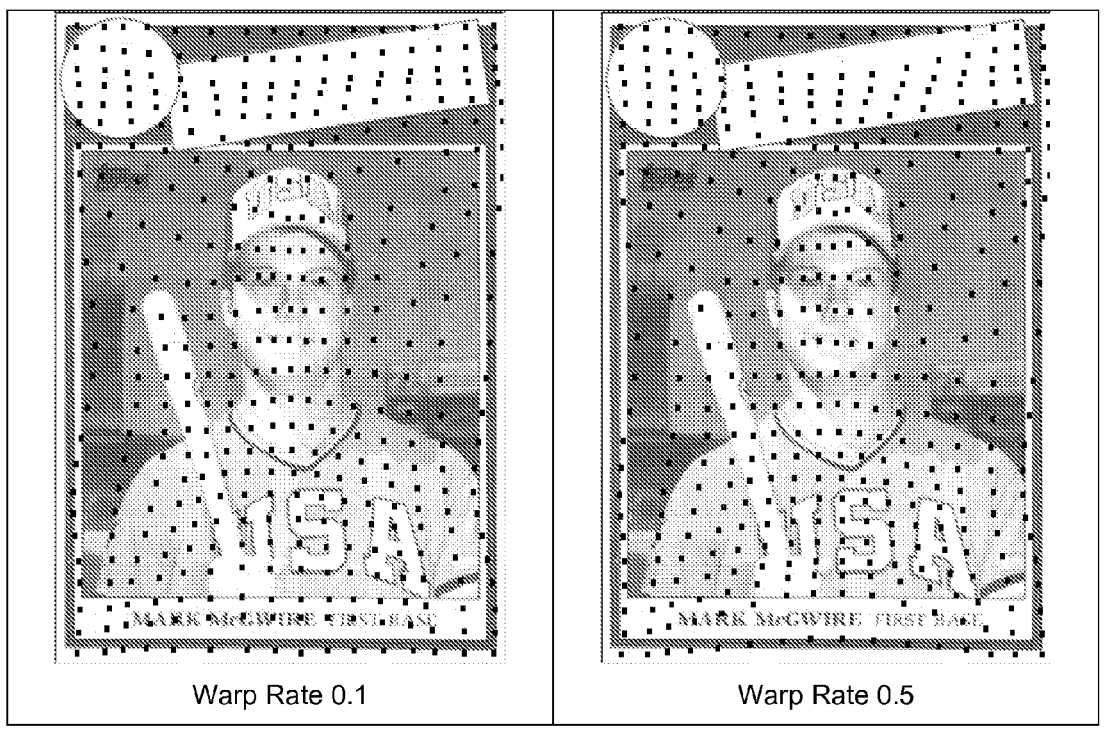
FIG. 14 compares the results of 2 different Warp Rates (WR), illustrating that the WR does not have a significant impact on the resulting Equilibrium Configuration.

Interestingly, the WR does not necessarily have a large effect on the final Warp Grid, provided it has gone through enough iterations to reach its equilibrium point. In FIG. 14, we see examples of two different WR settings (0.1 and 0.5) on the same Warp Grid after 250 iterations.

The WR can be used very effectively to accelerate the process of bringing the Warp Grid to its Equilibrium Point and improve the stability of that equilibrium. This is accomplished by reducing the WR as the Grid Points approach their Equilibrium Point. As the change in position between steps decreases, the WR is also reduced. Thus we can use a large WR at first to advance the Grid Points boldly, then reduce it to settle in on the Equilibrium Point without overshooting or oscillating.

As previously discussed, the level taken by a given Grid Point is derived as a function of the attributes of the Digital Image pixel sampled at the given Grid Point position. The usual pixel attributes are the intensities of the Digital Image's three color channels. The value of a Grid Point is generally a floating point number in the range 0 to 1 and may represent any function of its sampled pixel attributes. If, for example, the value is selected to be the normalized intensity r of the red channel in the Digital Image (normalized to the interval 0 to 1), then the Warp Grid points will be seen to be attracted to the red areas of the Digital Image in the Warp process, the brightest red areas having the most attraction. If, on the other hand, the value is chosen to be 1−r, then the points of the grid will be attracted to those areas of the Digital Image where red is at a minimum.

In computing the position of the center-of-gravity of the Connectivity Pattern of a given Grid Point $p_0$, either the actual levels of all the Grid Points in the Connectivity Pattern may be used or the values may be taken relative to the level of the given Grid Point. For example, if $L(p)$ denotes the level of a Grid Point, then a relative level for the Grid Point p in the Connectivity Pattern of $p_0$ could be the absolute difference between the level at p and the level at $p_0$, i.e., $|L(p)-L(p_0)|$. In this case, supposing that the $L(p)$ are proportional to the red channel intensities, the Warp Grid will be seen to deflect locally in the direction of the strongest red channel contrast, that is, an area of the Digital Image containing an edge or other abrupt change in the red component of the Picture. On the other hand, if the Connectivity Pattern Grid Point levels are computed as $1-|L(p)-L(p_0)|$, then the Warp Grid will seen to be displacing locally in the direction of uniformly red colored areas.

If the center-of-gravity of the Grid Point weightings are computed as $L(p)-L(p_0)$, then only positive contrasts will attract Grid Points, while negative contrasts will repel them. Here, positive contrast is defined as an increasing level $L(p)$ in the direction of positive u and v.

Figure 16:
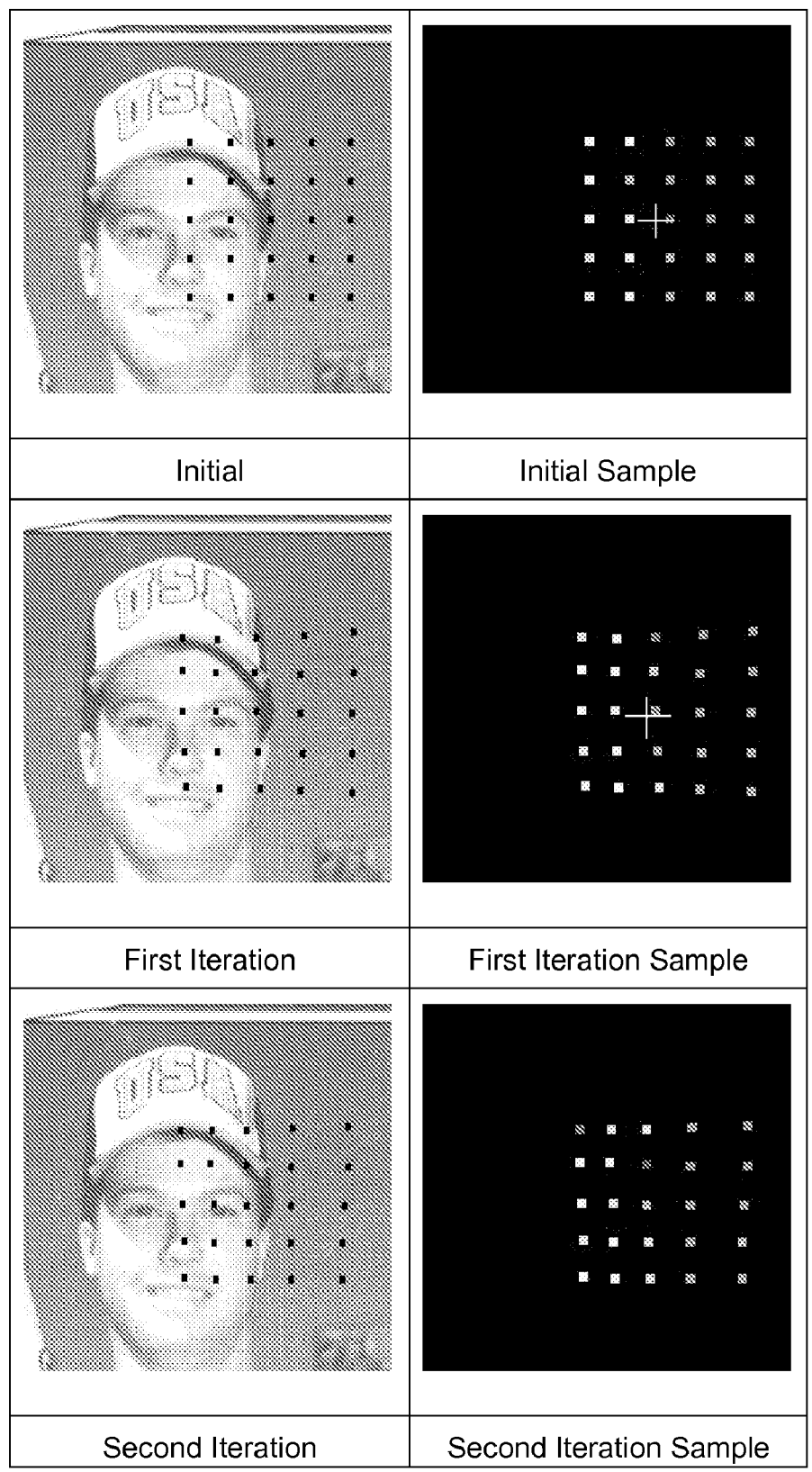
FIG. 16 illustrates the initial configuration and the first two iterations of the Warp Algorithm. The cross hairs on the first two pictures represent the calculated Center-of-gravity of the Neighborhood Configuration, toward which all of the points will be adjusted.

FIG. 16 illustrates the initial configuration and the first two iterations of the Warp Algorithm as applied to the Neighborhood centered at row 9, column 10 of the initialized Warp Grid shown in FIG. 7. The left column of the figure illustrates the neighborhood superimposed on a portion of the Digital Image, while the column on the right illustrates the levels of the Digital Image sampled at the positions of the Neighborhood Points. At each iteration of the adaptation algorithm, the center-of-gravity of the neighborhood points, which are weighted by their sampled levels, is computed. The computed center-of-gravity for the configurations in the column on the right are shown by the cross hairs. The Warp Rate in this illustration has been set to 1 so that new grid points are displaced to the position of the center-of-gravity of their Connection Pattern.

Although in the discussion of the steps of the Warp Algorithm the example of the center-of-gravity of the Connectivity Pattern is used throughout, any function of the Connectivity Pattern Grid Point positions and levels can be used for computing the offsets in the adaptation step of the Warp Algorithm. For example, rather than the center-of-gravity, the offset vectors could be computed as being proportional to the vector drawn from a given Grid Point to the Grid Point in its Connectivity Pattern with the highest level. But not all functions will yield an equilibrium configuration of the Warp Grid.

In the preceding discussions, the Digital Image, Warp Grid and Connectivity Pattern are all taken as being two-dimensional. However, nothing in the preceding discussion would preclude the methods described from being applied in one dimension or in three or higher dimensions. Indeed, the methods described herein would be extremely useful in the analysis of three-dimensional Digital Images, which occur as the computed output of certain medical imaging systems.

Now we'll go through the flowchart in FIG. 10, which illustrates the process of adapting the Warp Grid a single iteration 1000.

First we set up a DO loop on currentPoints 1001. For each point $CP_i$, we do a coordinate transform to translate its u,v location into x,y 1002. Then we store the sampled level at that x,y location on the Digital Image in $L_i$ 1003.

When all the points have had their levels $L_i$ sampled and stored, the DO loop is ended 1004 and we move on to adapting the currentPoints a single step. It should be noted that L at each point could be sampled as part of the following loop, in which the positions of the points are actually adjusted 1008. The reason for not doing this is one of optimization. By storing the levels for each point for the duration of each iteration, we only have to sample each point one time (for a total of M×N sampling steps). Thus we avoid having to resample these points each time they are accessed as part of evaluating the Neighborhood Points' effect on each point (for a total of $M*N*(2*NR+1)^2$ sampling steps).

With the L of each of the currentPoints stored, we once again sweep through all of the currentPoints with a DO loop 1005. First we set the variables ZM and FM to their initial empty values 1006. ZM (Zero$^{th}$ Moment) will be the sum of the levels of the Neighborhood Points; FM (First Moment) will be the sum of the levels of individual neighborhood points weighted by their distance from the given point, $CP_i$.

Next we set up a DO loop on the Neighborhood Points ($NP_j$) of the current point $CP_i$ 1007. The points that comprise $NP_j$ are a function of the Warp Grid's Connectivity Pattern, here described in terms of the Neighborhood Radius (as discussed in the section Connectivity Patterns).

For each of the points $NP_j$, its level $L_j$ is added to the Zero$^{th}$ Moment ZM, while its First Moment, defined as $L_j$ scaled by the difference between the points $NP_j$ and $CP_i$ 1008, is summed in FM. When all the Neighborhood Points have been processed, the DO loop is ended and a newPoint can be calculated 1009. The newPoint is defined as the center-of-gravity of the Neighborhood Points (FM/ZM) scaled by the Warp Rate (WR) 1010. The newPoint is added to the collection newPoints, and the loop is repeated for the next $CP_i$, until all of the currentPoints have been processed and the DO loop is ended 1011. The newPoints then replace the currentPoints 1012 and the currentPoints are returned 1013.

Warp Grid Adaptation Examples

Figure 17:
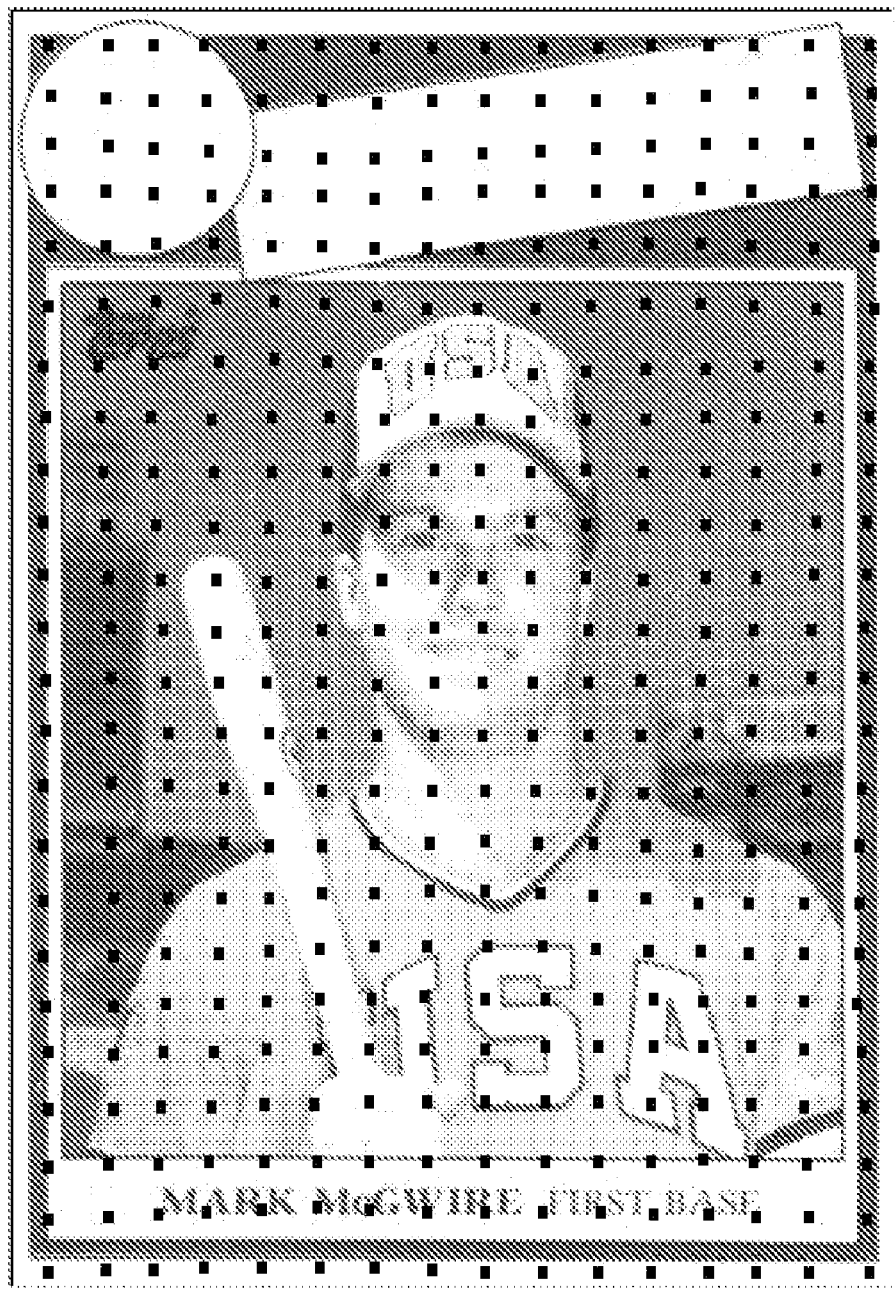
FIG. 17 shows a Warp Grid Adaptation after a single step.

FIG. 17 illustrates a single step of the Warp Grid Adaptation Process applied to the Initialized Warp Grid illustrated in FIG. 7. The Warp Rate has been set to 0.5, meaning that the process of adaptation causes each point in the Warp Grid to reposition itself halfway towards the center-of-gravity of its Connectivity Pattern.

Figure 18:
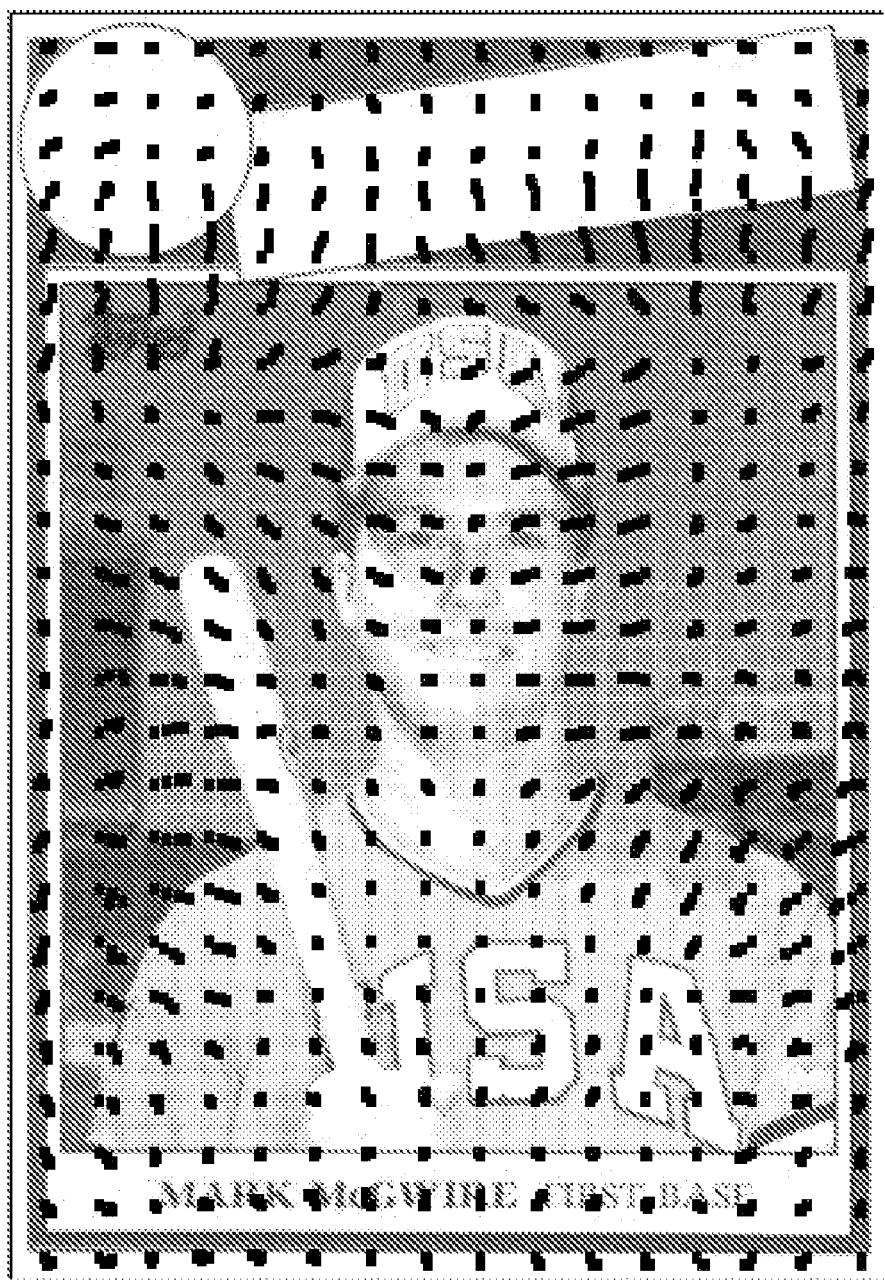
FIG. 18 shows the same Warp Grid Adaptation as in FIG. 17, after three steps. In this figure, the intermediate steps are also shown.

FIG. 18 illustrates three steps of the Warp Grid Adaptation process applied to the Initialized Warp Grid illustrated in FIG. 7, with the Warp Rate set at 0.5. It can be seen that each iteration of the adaptation process causes most of the points in the grid to migrate a small distance on the Digital Image. The migration does not continue indefinitely with additional iterations, but reaches an Equilibrium Configuration after which there is no further significant migration.

Figure 19:
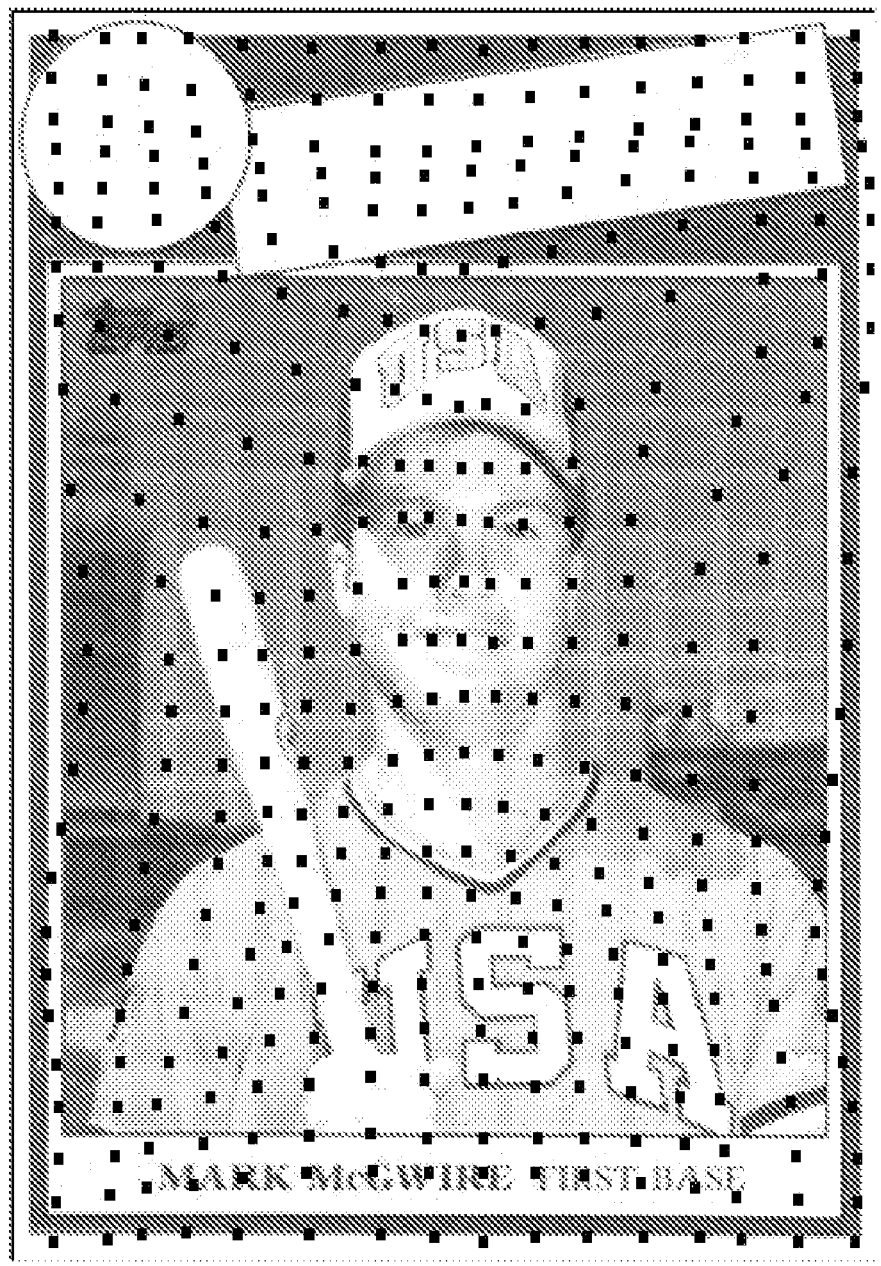
FIG. 19 shows the same Warp Grid Adaptation as in FIG. 17 and FIG. 18, after 250 steps.

FIG. 19 illustrates the Warp Grid of FIG. 7 following a total of 250 iterations of the Adaptation step. At this point the Warp Grid has reached its Equilibrium Configuration. Most of the grid points will remain stationary with the application of additional adaptation steps. A few of the grid points, most notably those in the dark regions of the picture, will randomly move within small orbits around their equilibrium center with the application of additional adaptation steps. Eventually, with very, very large numbers of iterations, the Equilibrium Configuration may drift.

Figure 20:
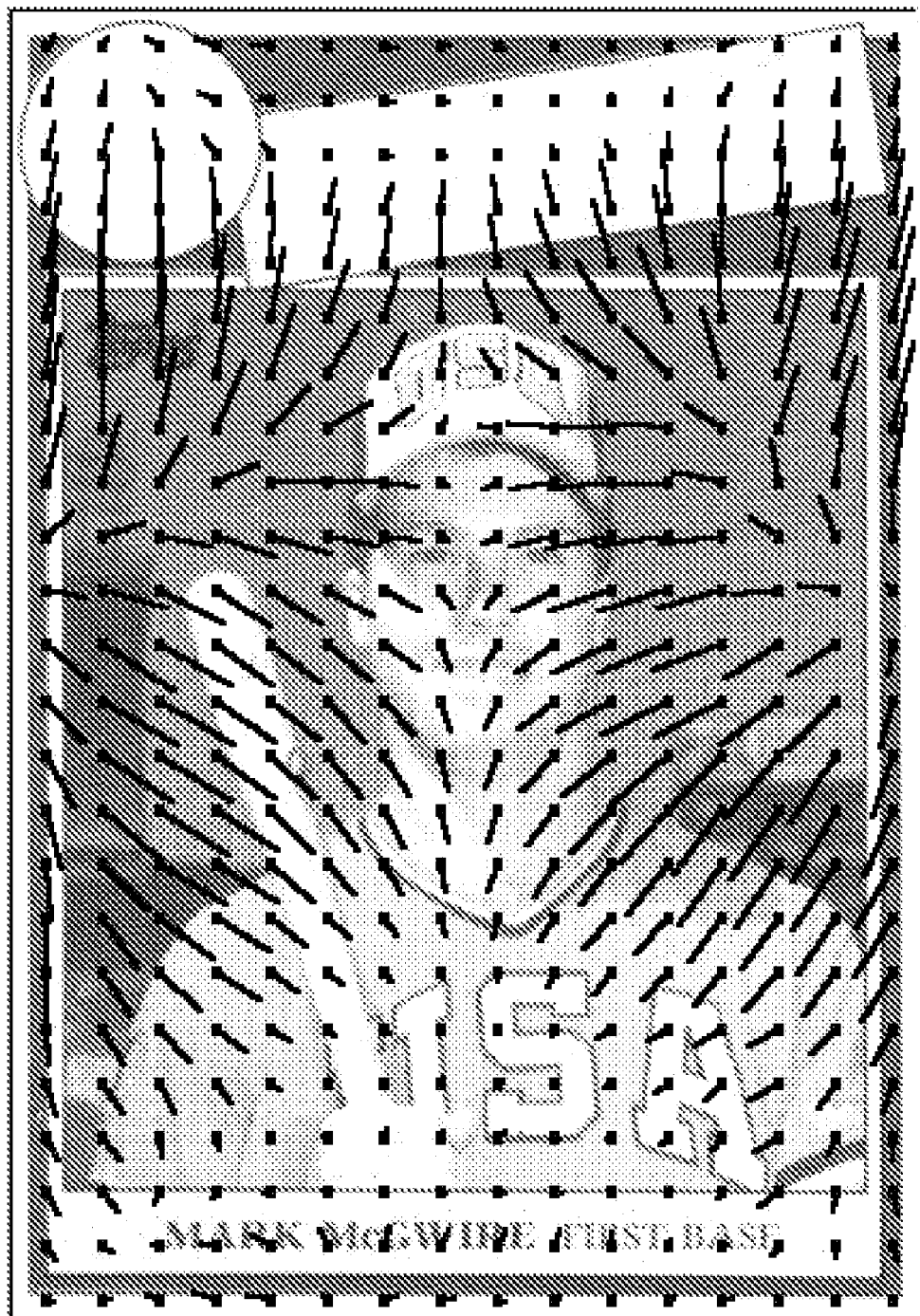
FIG. 20 shows the Warp Grid Vectors for the Warp Grid after it has reached its equilibrium state.

FIG. 20 illustrates the Warp Grid Vectors for the Equilibrium Warp Grid of FIG. 19. Each Warp Grid Vector is drawn as a line emanating from a small square dot, the dot indicating the position of the Grid Point in the Initialized Warp Grid, the line indicating the magnitude and direction of the Grid Point displacement following the application of 250 iterations of the adaptation process. As can be seen from FIG. 18, each point in the Initial Warp Grid generally follows a path taking it in the direction of the closest bright regions of the picture. Points centered in a bright region do not move significantly. Points in dark regions equidistant from bright regions in opposing directions are conflicted and do not move significantly. Remember that points along the edges of the images are, in fact, almost equally distant from the opposite edge because of the torroidal wrap around.

Figure 21:
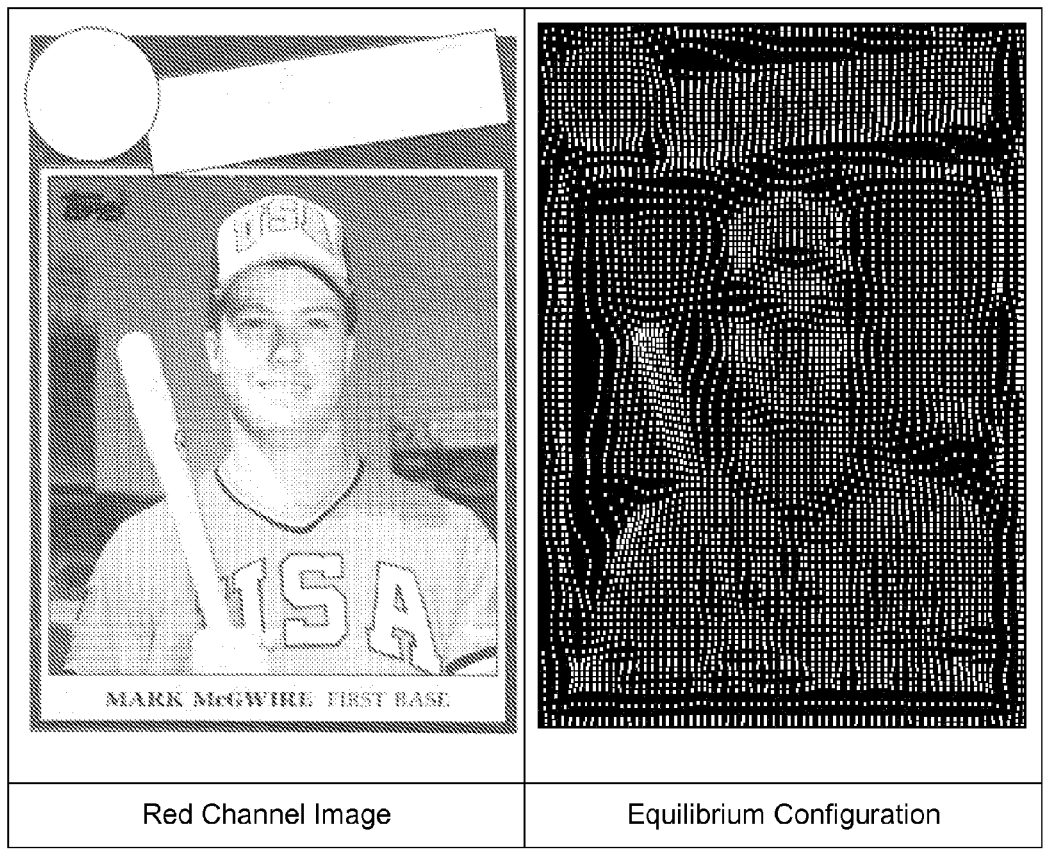
FIG. 21 illustrates a Digital Image and a corresponding Warp Grid that is much finer (96 rows and 64 columns). The Warp Grid is fully adapted in an Equilibrium Configuration.

FIG. 21 illustrates a Digital Image and its corresponding Warp Grid of 96 rows and 64 columns in an Equilibrium Configuration. The figure on the right clearly illustrates that the fine detail of the Digital Image cannot be captured by the fully adapted Warp Grid, although it is clear that employing a finer grid captures far more of the image detail than a coarse grid. The Neighborhood Radius in this example is 1. This is not to be viewed as a shortcoming of the Warp Grid Algorithm as it is not the purpose of the Warp Grid Algorithm to preserve image pictorial content.

Comparing Adapted Warp Grids

The degree of similarity of two matched Pictures is determined in large part by the similarity of their Adapted Warp Grids. The degree of similarity of two Adapted Warp Grids is based on the distance they are separated from one another in the multidimensional space of the Warp Grid Vectors, called the Match Distance.

In order to directly compare two Adapted Warp Grids, their sampling grids must be of the same dimensions and, in general, their Connectivity Patterns should be the same. Furthermore, the number of Warp Algorithm Iterations for each should be the same. Also, their Warp Rate (WR) should be equal or nearly so. Even if all these conditions aren't exactly true, two adapted Warp Grids may be conditionally comparable if adaptation has been allowed to continue until an equilibrium configuration is reached. In that case, the particulars of the Warp Algorithm parameters are not as critical since the equilibrium configuration is primarily dependent on the Composition of the Pictures being matched, secondarily on the Warp Grid Connection Pattern, and quite independent of the speed with which the equilibrium is reached. However, for the remainder of this discussion, we will assume equivalence of all Warp Algorithm parameters for unconditionally comparable Adapted Warp Grids.

Assume that the Warp Grid is M-by-N, M columns and N rows. As previously described, the Adapted Warp Grid is represented by an M*N dimensional vector, the Warp Grid Vector, whose elements are Displacement Vectors representing the displacements of the Warp Grid points from their initial positions by the Warp Algorithm. Each Displacement Vector is characterized by both u-direction and v-direction displacement components.

Let $p_{m,n}$ denote the Warp Grid point on the $m^{th}$ column and the $n^{th}$ row of the initial M-by-N Warp Grid. Let $q_{m,n}$ be the corresponding point in the Warp Grid following some number of iterations of the Warp Algorithm. Then the Warp Grid Vector is a vector V of M*N elements $v_{m,n}$, where the elements are the displacement vectors $$v_{m,n} = q_{m,n} p_{m,n}$$

taken in row-by-row order on the indices of the Warp Grid points.

Let E and F be two Warp Grid Vectors, each being of dimension M*N and each being generated by a Warp Algorithm of i iterations with Warp Rate WR. Then the magnitude of the difference between E and F is given by the relationship $$\| E\ F \| = \sqrt{\sum_{m=1}^{M} \sum_{n=1}^{N} \| E_{m,n}\ F_{m,n} \|^2}$$

where $$\| E_{m,n} F_{m,n} \|^2 = (Eu_{m,n} Fu_{m,n})^2 + (Ev_{m,n} Fv_{m,n})^2$$

where $Eu_{m,n}$ denotes the u component of the $m,n^{th}$ displacement vector of E and $Fu_{m,n}$, $Ev_{m,n}$ and $Fv_{m,n}$ are defined respectively.

The Match Distance between two Warp Grid Vectors E and F is the magnitude of their vector difference normalized by the number of elements in each Warp Grid Vector, $$\text{match}(E,\ F) = \frac{\| E\ F \|}{M \times N}$$

Thus the closeness of match of two Warp Grid Vectors is the average distance between all the corresponding displacement vectors of Warp Grid Vectors.

It is also possible to define the Match Distance between two Warp Grid Vectors in alternate ways. For example, the closeness of match between a given Warp Grid Vector E and a Warp Grid Vector F from a database can be based on the magnitude of displacement vector differences weighted by the values of Warp Grid samples at the grid points of E. Letting $E_{m,n}$ and $F_{m,n}$ denote the Displacement Vectors of Warp Grid Vectors E and F respectively, and letting $L(p_{m,n})$ denote the sampled level of the Digital Image at the point $p_{m,n}$, corresponding to Displacement Vector $E_{m,n}$, a weighted distance measure for E and F becomes the average weighted difference between the corresponding displacement vectors of E and F, $$\text{weighted\_match}(E,\ F) = \frac{\text{weighted\_difference}(E, F)}{M \times N}$$

where the magnitude of the weighted difference of E and F is equal to $$\sqrt{\sum_{m=1}^{M} \sum_{n=1}^{N} L(P_{m,n}) \times \| E_{m,n}\ F_{m,n} \|^2}$$

The weighted matching criteria is useful in cases where an Equilibrium Configuration of the fully adapted Warp Grid is not particularly stable, the small seemingly random motions of some of the grid points with continued adaptive iterations causing the match distances involved to fluctuate. Examination of the circumstances of these grid point perturbations reveals that they arise in regions in the Digital Image with extremely small sampled values. In that case, the center of gravity of a Connectivity Pattern in the region is particularly sensitive to very small changes in the sampled values at the points of the Connectivity Pattern. The weighting match criteria described above places less emphasis on these "noisier" Warp Grid displacement vectors, yielding a more stable match distance.

Visual Key Matching

A Visual Key Vector is a combination of the Warp Grid Vector and possibly some other vector of Image Measures. So, in general, the number of vectors being compared is greater than just the n*m vectors of the Warp Grid. But not much more, because the Warp Grid is the primary way that Visual Keys Vectors separate themselves in space.

From the preceding discussions it can be concluded that a best match to a given Visual Key Vector may be obtained by pairwise comparing the given Visual Key Vector to all the Visual Key Vectors in the database and noting which one yields the closest match. The question of whether a given database contains a match to a given Visual Key Vector is equivalent to the question of whether the best match in a database is sufficiently close to be considered to have arisen from the same Picture. Thus the matching distance of the best match must be compared to a specified maximum allowable matching distance to be considered to have arisen from the comparing of Visual Key Vectors derived from the same Picture.

Likewise, when attempting to find all the matching Visual Key Vectors in a database that match a given Visual Key Vector, it is necessary to consider the question of how many matching Visual Key Vectors are sufficiently close to have arisen from the same Picture, a conclusion that can be decided by comparing all the match distances against a suitably, chosen threshold match distance.

Ultimately, we must address the question of the size of the database of Visual Key Vectors and the number of computational steps required to select the best matching Visual Key Vectors. It is the intention of the present invention to minimize both database size and the number of computational steps in selecting Visual Key Vector matches.

Reducing the Database Size

The size of the database of Visual Key Vectors is the number of Visual Key Vectors in the database times the number of bytes in a Visual Key Vector. Suppose the Visual Key Vector is composed only of the Warp Grid Vector, and consider the application of the warp grid algorithm to a monochrome picture. If the dimensions of the Warp Grid are 16-by-16, and if the u and v components of a Displacement Vector each requires 8 bytes for floating point representation, then the size of a Visual Key Vector is 16*16*2*8 bytes or 4 Kilobytes. If the database consists of 1 million Visual Key Vectors, then its size is 4 Gigabytes.

If we are required to find the best matching Visual Key Vector from a database, each Visual Key Vector in the database will need to be compared to the corresponding vector of the Query Visual Key Vector. For the example in the preceding paragraph, that would represent 16*16*2*1 million of 8-byte comparisons. If each 8-byte comparison took ten nanoseconds ($10^{-8}$ seconds) then a best match search of the database of 1 million would take 5.12 seconds, disregarding any other necessary computations required for determining the match distance.

The 1 million estimate of database size is modest by present day standards, and the estimate of the speed of comparison is optimistic. Therefore, it must be concluded that the present invention so far disclosed would work best for small databases or relatively slow searches. Clearly the questions must be posed as to how small a Visual Key Vector will suffice to allow positive identification and how may unnecessary comparison operations be eliminated to speed up database searches for matching Visual Key Vectors?

One way to reduce the size of a Visual Key Vector is to reduce the size of the Warp Grid. From the preceding example, an 8-by-8 grid would require 1 Kilobyte of storage while a 4-by-4 grid would require 256 bytes. The question that needs to be posed is whether Picture matching using a 4-by-4 Warp Grid would work, assuming 1 million Visual Key Vectors in the database.

Figure 23:
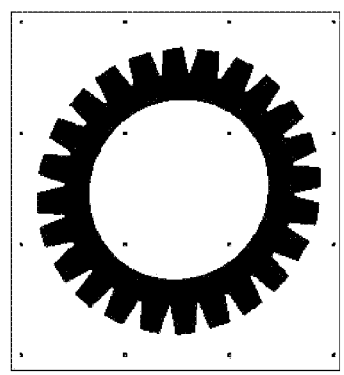
FIG. 23 represents the image an irregularly shaped oblique displayed against a uniform contrasting background.

To answer the above question we might start by asking another question: "For what categories of Picture Composition would the proposed invention fail to yield a satisfactory result?" One surprisingly simple answer is that a Warp Grid Algorithm fails to discriminate between Pictures where the Warp Grid sampled pixel values are all the same. In that case the adaptation step yields all zero displacement vectors since the center of gravity of each given grid point's Connection Pattern is coincident with the given grid point (assuming a symmetric Connection Pattern). Of course, if a Picture's Composition is a uniform value, we might be inclined to accept a number of "Uniform. Pictures" as being equivalent as far as the Warp Grid Algorithm is concerned. But with Warp Grids as small as 4-by-4, a number of non-Uniform Pictures from amongst the 1 million Pictures in the database are likely to be confused with Uniform Pictures. For example, sampling the same value at all 16 sampling points might commonly occur when a Picture's Composition represents the image of an irregularly shaped opaque object displayed against a uniform contrasting background. (See FIG. 23 for an illustration of this example). Furthermore, the seemingly Uniform Picture is just one example of a class of Pictures that are not satisfactorily handled when the Warp Grid dimensions are reduced to small positive integers. The fewer the number of points, the more problematical becomes the initial positioning of the points in the picture, and the more pathological cases there are.

The above example is typical of the kinds of unexpected results that can occur when attempting to match Digital Images based on a very small number of pixel samples. Indeed, experiments have shown that the quality of matches improves as the Warp Grid dimensions increase. This said, how can we reduce the storage requirements of our database?

One answer is surprisingly simple and turns out to be very satisfactory. Use a relatively fine Warp Grid in the Warp Grid Algorithm but sample the adapted Warp Grid points in creating the Visual Key Vector. It can be immediately appreciated that a 4-by-4 sample of a 16-by-16 adapted Warp Grid is not the same as a 4-by-4 adapted Warp Grid. For example, a 16-by-16 grid will math to a Uniform Picture only when all 256 sampled pixels are the same value, thus yielding a much lower likelihood of an erroneous match than if the number of pixel samples were only 16. But more importantly, a typical Connection Pattern defined on a fine Warp Grid will be bound to only a small region of the Picture Composition, while a Connection Pattern on a very coarse grid will necessarily span most of the Picture. Thus the points in the fine grid will be much more sensitive to local variations than the points in the very coarse grid. And when we are attempting to distinguish from among a million or more pictures, it becomes necessarily the case that it is in the fine details that the best of the closest matching pictures is determined.

Sampling the Warp Grid is surprisingly effective in creating Visual Key Vectors with significant discrimination power. Part of the reason for this lies in the "holographic" nature of the Warp Vectors in an adapted Warp Grid. It can be appreciated that, at each iteration of the Warp Grid Algorithm, the influence of any given grid point is propagated through the Warp Grid to adjacent points in its Connection Pattern. When the number of Warp Algorithm Iterations is comparable to the Warp Grid dimensions, the influence of a single grid point is felt by every grid point. It is through the process of adaptively balancing all of the influences from all of the grid points that an equilibrium configuration of grid points is reached. Thus each Displacement Vector in the Warp Grid carries information regarding the totality of all pixel values sampled through the iterative steps of the Warp Algorithm.

That is why a given selection of the Displacement Vectors of an adapted Warp Grid is so effective at differentiating Picture Compositions. Even though a given Displacement Vector in the selection is not itself directly sampling a given region of the Picture, the given Displacement Vector is nevertheless influenced by those pixel levels in the given region of the Digital Image which are sampled by other unselected Grid Points in the Warp Grid.

In addition to sampling the Warp Grid, the database of Visual Key Vectors can be reduced in size by reducing the number of bytes necessary to represent a Warp Grid Vector. In the previous assumption, each Warp Grid Vector Component required 8 bytes for storing as a floating point number. If we were to store each component as a 2 byte integer, that would save 75 percent of the required storage space. Rather than having the very fine grained resolving power of a floating point number, we would only be able to resolve vector component to one part in 216 (64K). Would this have an adverse affect on the Picture matching performance of the Warp Grid Algorithm? No, because the matching distance computed for pairs of Warp Grid Vectors during match searching is generally very much larger than the one part in 64K, and quantizing the vector component to 64K levels introduces only a very tiny variation on match distances.

Another way to reduce the size of Visual Key Vectors is to store a subset of the sampled grid points, for example, keeping only the ones whose displacement vectors have the maximum values. This allows us to only retain the most valuable information in the Stored Visual Key Vector. Thus we draw a distinction between the Stored Visual Key Vector and the Full Visual Key Vector. A database query uses a Full Visual Key Vector, which contains the full set of vectors, whereas the Stored Visual Key Vector only contains the most useful vectors. Since the Stored Visual Key Vector also retains information as to the original location of each vector, a Full Visual Key Vector can be compared meaningfully with each Stored Visual Key Vector.

Reducing the Number of Search Steps

How can the number of computational steps required to search the database for matches be reduced? One way is to eliminate unnecessary computation. For example, if we are searching for a best match and the smallest match distance found so far is small, then if we are pairwise matching the vectors at a given record in the database, we can stop as soon as "small" is exceeded and move on to the next record. Similarly, if we preorder all of the records in a database according to a chosen vector, then there are a number of logically constructed processes that will eliminate computational steps by eliminating whole ranges of records from the computational process.

Another way of eliminating unnecessary computation is by selecting a Minimal Acceptable Match Score, and continuing the search only when the Minimal Acceptable Match Score exceeds the last Visual Key Vector compared.

We refer to the techniques suggested above as "pruning" the computational space, in that we start by assuming that every Visual Key Vector in the database will need to be examined in the match search. Then we logically create procedures that will eliminate some of them under certain conditions that we test for as we are individually comparing each Visual Key Vector.

The match search algorithm employed by the present invention takes a very different approach to eliminating unnecessary computational steps. Rather than assuming the worst (examine every Visual Key Vector in the database) and working to make the situation better by pruning away unnecessary computation, we begin by assuming the best (the first Visual Key Vector we look at from the database matches to within the specified tolerance) and we do additional work if it is not. We next examine that Visual Key Vector which has the next highest probability of being a match. Additional work is done only when the preceding step fails. At each step, the next most likely matching Visual Key Vector is examined The $n^{th}$ step is required only when the preceding n−1 steps have failed to yield a match, where each of the previous n−1 steps optimized the probability of a match.

The Index Key

To implement a more efficient search for a matching Visual Key Vector, all of the Visual Key Vectors in the database are given an index number. Visual Key Vectors in the Visual Key Collection are sorted according to this index number. Visual Key Vectors are then selected from the Visual Key Collection by performing a binary search on their sorted indices for a desired index. The index number for a Visual Key Vector is computed from the Visual Key Vector itself by a method that will be described later in this section. There may be more than one Visual Key Vector in the database with the same index. Index numbers in the database are not sequential; there are frequently large gaps in the indices between adjacent Visual Key Vectors. The index of a Visual Key Vector is referred to as an Index Key.

An Index Key is derived from a Visual Key Vector by sampling pre-selected measurements from the Visual Key Vector (referred to as Visual Key Vector Elements) and quantizing these pre-selected measurements to a small number of intervals. These Visual Key Vector Elements are referred to as Tumblers in the context of producing Index Keys. Each one of these Tumblers is given a discrete value based on the value of the corresponding Visual Key Vector Element, quantized to the desired number of intervals (referred to as Bins).

Various criteria may be used for selecting the Tumblers from the Visual Key Vector to be used in producing the Index Key. For example, one could select Tumblers based on their color value, hue, intensity, geographical location, etc. Which criterion or combination of criteria chosen would depend on the specific application, especially the general nature of the Pictures in the database. In fact, a Visual Key Database could be indexed in multiple ways, adding to the flexibility and effectiveness of the system. For example, looking through the database for a black and white image might be more effectively done via intensity-based Index Keys, rather than R,G, B-based Index Keys.

So an Index Key, obtained by sampling and quantizing a Visual Key Vector, consists of G ordered Tumblers representing the ordered quantized sample. Each Tumbler has a discrete value corresponding to the quantization level (Bin) of the quantized vector. For example, an integer j in the range 1 to B may represent the B possible Bins of a vector element. Within this document, our examples show 10 Tumblers divided into 5 Bins; however, both the number of Tumblers and the number of Bins can be varied for performance optimization.

Figure 22:
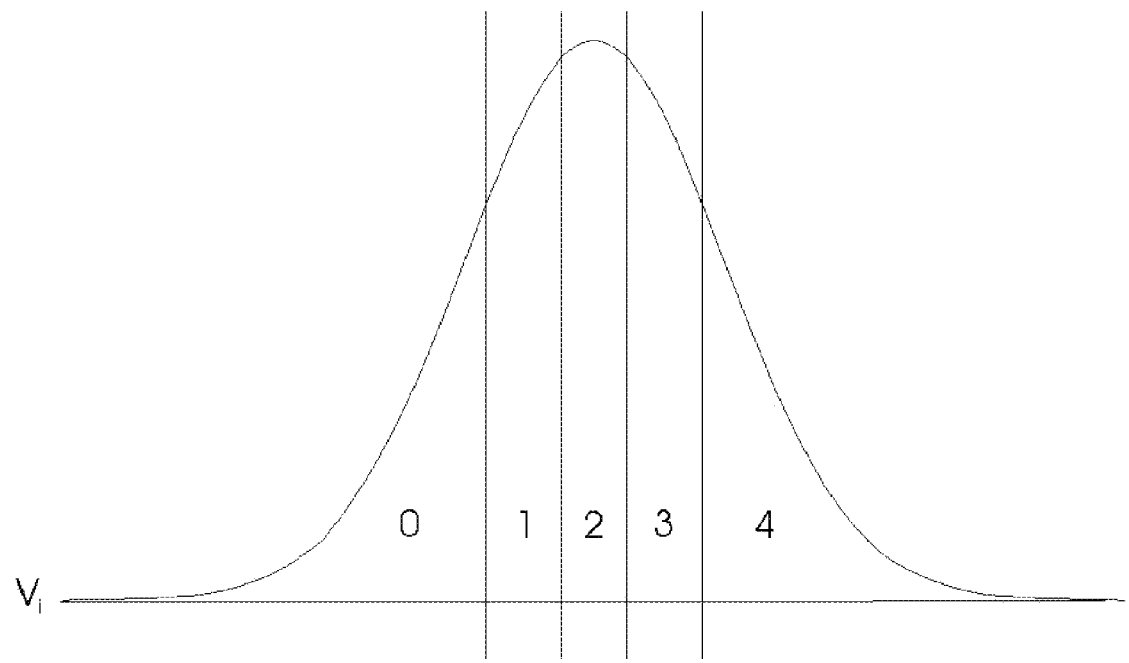
FIG. 22 shows the way in which a probability density function (PDF) of the frequency of occurrence of a given tumbler level may be subdivided into multiple regions, or bins through slicing.

To quantize a Tumbler to 5 levels, the a priori Probability Density Function (PDF) of the frequency of occurrence of a given Tumbler level is subdivided into 5 regions, or bins, by 4 slicing levels, as shown in FIG. 22. The a priori PDF of a Visual Key Vector measurement is derived from the statistical analysis of a very large number of Visual Key Vector Elements taken from a very large number of different Pictures. The slicing levels are selected to give equal chances to each Bin of containing a randomly selected Tumbler. If the 5 Bins are represented by 5 symbols (for example, the numerals 0 through 4), then each symbol will be equally likely to represent a given Tumbler. By equalizing the frequency of occurrence of each symbol, we maximize the amount of information each symbol contains.

The a priori PDF of a Visual Key Vector Element (which is a Displacement Vector) is ideally a Gaussian distribution with zero mean. A zero mean is assumed because there are no preferred directions in an arbitrary Picture, and there are no edge effects in the Warp Grid since it is toroidally wrapped. But actual PDF's of Warp Grid Vectors of real populations of pictures may vary from the ideal and become elliptical (u and v correlated), disjoint, or displaced (non-zero mean). In these cases the performance of the index keys to address the database of Visual Key Vectors will be compromised unless adequate care is taken to normalize variations from the ideal case described above.

Index Keys and Tumbler Probabilities

When a Query Picture is presented to the system for matching to a database object, an Index Key is prepared for that picture. Because a Query Picture is generally somewhat different from the Best Matching Picture in the Visual Key Database, a given Tumbler's Bin in the Index Key of the Query Picture (referred to as the Query Index Key) may or may not match the corresponding Tumbler's Bin in the Index Key of a Matching Picture. That is, a given Tumbler's Bin in a Query Index Key is either correct or it wrong. A Tumbler's Bin is correct if the quantization level of its corresponding Visual Key Vector Element is the same as the quantization level of the corresponding Visual Key Vector Element for the Matching Picture, otherwise it is wrong.

A Tumbler Probability function associates a Tumbler Probability between 0 and 1 to a Tumbler Bin, and represents the probability that the Bin of the Tumbler is correct. Referring to FIG. 24, we seep the basic process of generating Tumbler Probabilities 2400. The same set of Tumblers is sampled from the Visual Key Vector as was used to create the Index Keys in the Visual Key Database originally 2401. In other words, a pre-selected set of Visual Key Vector Elements is used to produce Index Keys and Query Index Keys alike. A DO loop is established to go through each of these selected Tumblers in order to generate their corresponding Tumbler Probabilities 2402.

For each of the Tumblers, we construct a set of Tumbler Probabilities (one for each Bin) whose value represents the probability that the Tumbler falls into that particular Bin 2403. These Tumbler Probabilities are then sorted in order of decreasing probability 2404. When each of the Tumblers has been processed, the DO loop is ended 2405 and the stream of Tumbler Probabilities is returned 2406.

For each of the G Tumblers (denoted $T_1$ to $T_G$) comprising a Query Index Key, we construct a set of B Tumble Probabilities. The Tumbler Probability $TP_{g,b}$ (where g=1 to G, b=1 to B) is computed to be the conditional probability $\text{Prob}_g\{b|i\}$ that the $g^{th}$ Tumbler's correct bin is b given that the Tumbler's actual bin is i, where i=1 to B. The Tumbler Probability $TP_{g,b}$ is calculated from Bayes' rule as:

$$TP_{g,b} = \text{Prob}_{g\ b|i} = \frac{\text{Prob}_g(b, i)}{\text{Prob}_g(i)}$$

where Prob{b,i} is the joint probability that the correct Tumbler Bin is b and the actual Tumbler Bin is i, and $\text{Prob}_g\{i\}$ is the a priori probability that the gth tumbler is in bin i. Note: We are also interested in computing the conditional probability $TP_{g,b}$ using the continuous conditional probability $\text{cProb}_g\{b|w\}$, the probability that the gth Tumbler's correct bin is b given that the corresponding Visual Key Vector Element is actually w, where w is essentially unquantized and continuously varying, $$TP_{g,b} = \text{cProb}_g\{b \mid w\} = \text{cProb}_g\{b, w\} / \text{cProb}_g\{w\}$$

$$TP_{g,b} = \text{cProb}_{g\ b|w} = \frac{\text{cProb}_g(b, w)}{\text{cProb}_g(w)}$$

Here, $\text{cProb}_g\{b|w\}$ is the joint probability density function that the correct Tumbler Bin is b and the actual value of the corresponding Visual Key Vector Element is w, and $\text{cProb}_g\{w\}$ is the a priori probability density function that the gth tumbler's corresponding Visual Key Vector Element is w. The choice of which conditional probability to compute is left to the requirements of the specific application. In general, $\text{Prob}_g\{b|i\}$ is easier to compute than $\text{cProb}_g\{b|w\}$ but is not as accurate.

Although, in the present discussion, we have chosen to illustrate the case where all Tumblers have the same number of Bins, there is nothing in the following discussion which would preclude the application of the methodology to those cases where different Tumblers in an Index Key have different numbers of Bins. The following description of the methodology is fully consistent with this alternative condition.

A Query Index Key is correct if all its G Tumblers identically match the G Tumblers of its Best Matching Picture in the Visual Key Database. The probability of any given Index Key being correct may be computed as the joint probability of all of its Tumbler Probabilities. It is not unreasonable to assume that the individual Tumbler Probabilities are statistically independent when the sampling for the Index Key is selected so that the individual selected Tumblers are well separated spatially and/or functionally. Furthermore, it must be assumed that the individual pictures that give rise to the Visual Key Database are independent and uncorrelated. Assuming independence, the probability of any given Index Key being correct may be computed as the product of all of its Tumbler Probabilities. This assumption is not unreasonable for many picture collections, but is not well suited to streaming media, where individual frames are highly correlated for the reason that they must convey the illusion of continuous motion. The subject of Index Keys for streaming media will be covered later on in this disclosure.

Preferred Search Algorithm

As the number of different Pictures represented in a Visual Key Database increases, the number of Tumblers in an Index Key must increase to permit different Pictures different Index Keys. As Index Key size increases, the probability that it is wrong on any given comparison increases, meaning that one or more of the Tumblers in the Index Key is in the wrong Bin. Therefore, we will wish to search the nearby space of possible Index Keys starting with those that have the highest probability of being correct. The simple-minded approach would be to construct all possible Index Keys and sort them by their probabilities. One could then iterate on the sorted list considering each Index Key in turn, starting with the most probable. The space of all Index Keys can be quite large, as it is equal to B raised to the $G^{th}$ power if each tumbler has B states. For most practical cases, the simple-minded approach is virtually infeasible.

In order to efficiently search in what may potentially be a huge Index Key space, the present invention takes a novel approach, which can be summarized in five steps (outlined below).

1. Compute an Index Key from the Visual Key Vector of the Query Picture's Digital Image. This computed Index Key is the most likely index of the Visual Key Vector in the Visual Key Database that most closely matches the. Visual Key Vector of the Query Digital Image.
2. Locate a Visual Key Vector in the database Visual Key Collection with Index Key equal to the Index Key computed in step 1. If there is no identical Index Key in the database, then go to step 5.
3. Compare the Visual Key Vector selected at the Index Key to the Visual Key Vector of the Query Picture's Digital Image.
4. If the comparison of step 3 results in too low a Match Score, then repeat step 2 to see if there is another Visual Key Vector in the database with an index that is identical to the Index Key computed in step 1.
5. If the present Index Key does not appear among the indices of the Visual Key Vectors in the database, construct a new Index Key which is the next best guess at the index of a matching Visual Key Vector, and go back to step 2.

Squorging

We do not wish to enumerate the entire space of possible Index Keys, as we will only be interested in a very small percentage of them which occupy the space near the given Index Key. Instead we produce a sequence of Index Keys one at a time starting with the one with the highest probability, and sequentially generate the next most probable Index Key at each iteration. By using a "pull" methodology, we only perform as much computation as is necessary to produce the next most probable Index Key. We have given the name "Squorging" to this unique pull methodology, "Squorge" being loosely derived from the words "Sequential Generation".

Squorging makes use of a recursive decomposition of the problem of sequentially generating the next most probable Index Key. An Index Key of size G may be constructed by putting together two "half" Sub-Index Keys. By taking all cross combinations of the Sub-Index Key comprised of $TP_1$ to $TP_i$ with the Sub-Index Key of $TP_{i+1}$ to $TP_g$, where i=G//2, (integer division) one can construct all Index Keys comprised of $TP_1$ to $TP_G$. We apply this recursively, "halving" the Sub-Index Keys until we are combining individual Tumbler Probabilities.

If we start with two lists of either Sub-Index Keys or Tumbler Probabilities, where each list is sorted by decreasing probability, we will observe that those combinations with the higher joint probabilities will come from combining those items near the beginning of the input lists. This observation is what we will use in the Squorge methodology to be described herein.

Recursion Flowchart

A new Squorger is created by connecting its inputA and inputB to two streams. Each Squorger input stream may either be another Squorger or a Tumbler Probabilities Stream.

FIG. 25 is a flowchart showing the process of recursively handling streams of Tumbler Probabilities (TP). For each of its inputs, a Squorger is requested for a stream of Tumbler Probabilities 1 through G wide by B deep 2500. The variable G corresponds to the number of Tumblers in the Index Key; the variable B corresponds to the number of Tumbler Probabilities for each Tumbler. If G is 1 2501, a Squorger is not needed, and so a Stream is created on a Tumbler Probability B deep 2502; then that Stream is returned 2503.

If G is not 1, the collection of Tumbler Probabilities is split in half 2504. The first half will be 1 through i, where i is one half of G; the second half will be i+1 through G. For each half, another Squorger is requested for each of its input streams; the variables aStream 2505 and bStream 2506 are set for the firstHalf and secondHalf, respectively. Each of these will be either a Squorger or a Stream depending on where in the overall Squorger tree we are at the moment.

At this point, the variable squorger is initialized to a new Squorger, using aStream and bStream as its inputs 2507. The new squorger is then initialized with all of the variables necessary for it to do its job 2508, and the squorger itself is returned 2509.

To summarize the nature of this recursive method: at each level, it tests for the following terminating condition of the recursion: if a half collection is just a single stream of Tumbler Probabilities, it sets the input to the corresponding Tumbler Probabilities Stream. Otherwise, the input is set to another Squorger. So, at the lowest levels of a Squorging tree, the inputs will all be Streams of Tumbler Probabilities and the outputs will be Sub-Index Keys; at the highest level, the inputs will all be Squorgers and the output will be a stream of full Index Keys.

Basic Squorger Operation

Figure 26A:
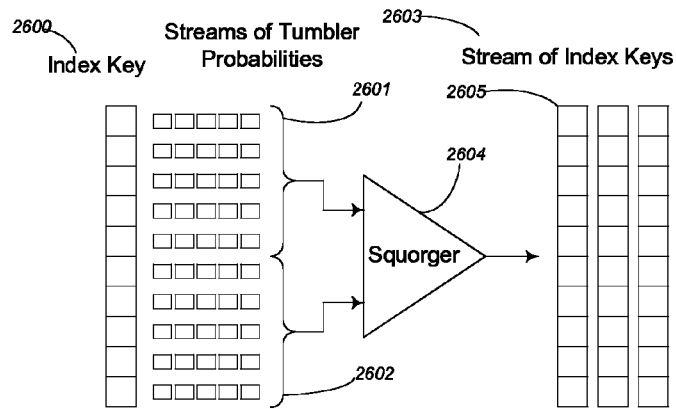
FIG. 26A is a Basic Squorger diagram, showing how the Squorger functions at the highest level.

The basic operation of a Squorger is illustrated in FIG. 26a. The Squorger takes two input streams of Tumbler Probabilities 2601, 2602 from an Index Key and produces a stream of Index Keys 2603 which are variations of the original Index Key, starting with the most likely one. The original Index Key in the illustration is ten elements long. The Squorger 2604 takes each half (5 elements long) into each of its input streams and combines them into new Index Keys of 10 elements each, the same length as the original 2605.

Recursive Squorger Decomposition

Figure 26B:
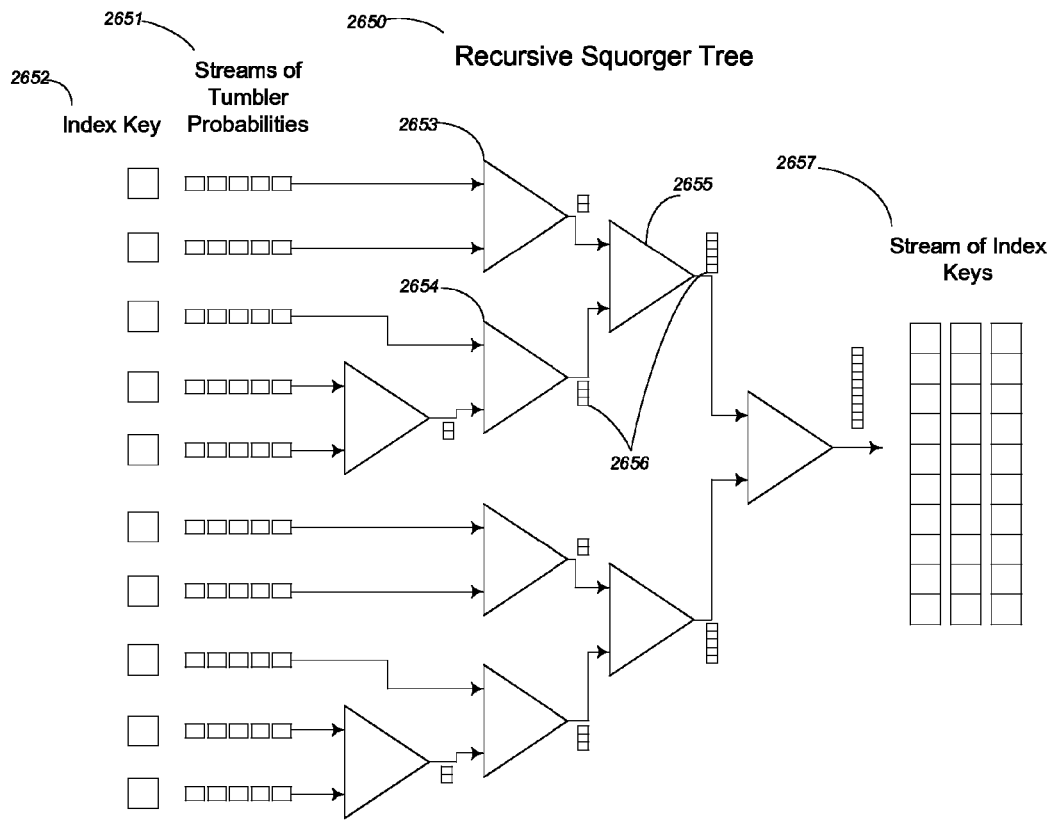
FIG. 26B shows a decomposition of the Basic Squorger diagram, showing how the nested Squorgers accomplish the work.

The preceding description gives a top-level view of how a Squorger functions for an Index Key of 10 Tumblers. The diagram in FIG. 26b illustrates a Recursive Squorger Tree 2650. This is identical to the Squorger shown in FIG. 26a, except that here the breakdown of internal combinations is shown, revealing the recursive, nested nature of Squorger operation.

A tree of Squorgers is created using as inputs the collection of G streams of Tumbler Probabilities 2651 corresponding to the G Tumblers in the Index Key 2652; each Tumbler Probability stream is ordered by decreasing probabilities.

The tree of Squorgers is created by a recursively-applied methodology, at each point dividing the collection of input streams into a firstHalfCollection and secondHalfCollection. Where the collection is evenly divisible, firstHalfCollection and secondHalfCollection will also be even 2653; where the collection is not evenly divisible, secondHalfCollection will be one greater than firstHalfCollection 2654.

So the Squorgers farthest down in the tree have streams of Tumbler Probabilities as inputs, or a stream of Tumbler Probabilities for one input and a Squorger for another, where the collection cannot be evenly divided 2654. Those farther up in the tree typically have Squorgers for both inputs 2655.

At each level, the Squorger puts out a Sub-Index Key whose size is that of the sizes of its inputs combined 2656. At the final output, what emerges from the Squorger is an Index Key, the same size as the original Index Key 2657.

Squorger Algorithm

The Squorger algorithm makes use of the following variables summarized in Table 1 below.

TABLE 1

| Squorger Variables | | |
| --- | --- | --- |
| Variable: | Type: | Description: |
| InputA | Squorger or Stream of Tumbler Probabilities | The source for the first half of each Index Key being constructed. The values are expected in order of decreasing probability. |
| InputB | Squorger or Stream of Tumbler Probabilities | The source for the second half of each Index Key being constructed. The values are expected in order of decreasing probability. |
| ListA | Sorted Collection of sub-Index Keys ordered by decreasing probability | The list of Sub-Index Keys that have already been retrieved from inputA. |
| ListB | Sorted Collection of sub-Index Keys ordered by decreasing probability | The list of Sub-Index Keys that have already been retrieved from inputB. |
| ConnectionCounts | Ordered Collection of Integers | A parallel collection to that of listA. Each value gives how many elements from listB have already been combined with the corresponding element of listA. |
| FirstNonFullyConnectedSlot | Integer | Index of the first slot in listA whose element has not yet been combined with every element in listB. |
| FirstUnConnectedSlot | Integer | Index of the first slot in listA whose element has yet to be connected to any element of listB. |

TABLE 1-continued

Squorger Variables

| Variable: | Type: | Description: |
|---|---|---|
| SizeA | Integer | Cached value of the total number of elements that could be provided by inputA. |
| SizeB | Integer | Cached value of the total number of elements that could be provided by inputB. |

Squorger Initialization

Each newly created Squorger needs to be initialized by initializing all nine Squorger variables shown in Table 1. The inputA and inputB variables are set to the incoming streams, either another Squorger or a stream of sorted Tumbler Probabilities. The sizeA and sizeB variables are the maximum number of elements that could possibly be retrieved from each input stream. Both of the internal lists, listA and listB are created as Ordered Collections and pre-charged with the first element from each input stream. Each list is dynamic; the memory allocation for each list is continuously adjusted to the number Of elements in the list. The connectionCounts variable is also initialized to an Ordered Collection and given a single element whose value is 0. The zero value is in parallel with the first element in listA, and represents that this element has been cross connected with none of the elements in listB.

Continuing with the initialization of a Squorger: the first slot in listA is not fully connected since it doesn't as yet have any connections, hence the variable firstNonFullyConnectedSlot is set to 1. And similarly, the first slot in listA is the first slot that has no connections, hence the variable firstUnConnectedSlot is set to 1. With that, the Squorger is initialized and ready for use.

Squorger Control

A Squorger is commanded via just two messages. In response to the size message, a Squorger answers how many Index Keys could possibly be retrieved from the Squorger. In response to the next message, a Squorger answers a single Index Key.

Squorger Size

Since the possible Index Keys are derived from crossing all possible pairs from the two input streams, the size method is implemented quite simply as answering the product of the two input stream sizes:

size=size$A$*size$B$

Squorger Next

Concatenating a Sub-Index Key from listA with a Sub-Index Key from listB produces the next Index Key that the Squorger returns. The Squorger must, however, decide which two elements to concatenate. This requires looking at various listA-listB pairs and selecting the one that has the highest probability. As the next most likely possibility is required, it is requested of the Squorger by sending it the next method. The elements in each list are ordered by decreasing probabilities. Furthermore, a Squorger always returns the combined elements in order of decreasing probability. Because of this, and because the probability of a concatenated Index Key is equal to the product of the probabilities of its two elements, for any given element in listA, we will always connect it with elements 1 through n in listB before connecting with element n+1 in listB. We keep track of this in the variable connectionCounts. For each slot in listA, connectionCounts holds the number of elements from listB that have already been combined with it. So in general, the value in connectionCounts at a given index into listA gives the index of the last element in listB that has been connected to that element from listA.

Once an element from listA has been combined with every element from listB, we no longer need concern ourselves with that element. Only elements from listA at or beyond the firstNonFullyConnectedSlot are of interest. Also, the firstUnConnectedSlot in listA has yet to be connected to the first slot in listB. When it is, its probability will necessarily be higher than connecting any subsequent slot in listA. So we have no interest as yet in any elements beyond the firstUnConnectedSlot in listA. The last slot we are interested in right now is the firstUnConnectedSlot if it exists. If we've managed to reach the end of inputA, then the firstUnConnectedSlot will have advanced beyond sizeA. In that case we only want to go as far as the firstUnConnectedSlot or sizeA, whichever is smaller.

Detail of Squorger Next Method

With this understanding, we can now see how the Squorger next method is implemented 2700. This is illustrated in the flowchart in FIG. 27.

We start by setting up a DO loop over the interval of interest in listA from firstNonFullyConnectedSlot to the minimum of firstUnConnectedSlot or sizeA. Each time around the loop, we select this element in listA and store its index in a temporary variable indexA 2701.

The expression listA at indexA gives the element from listA we'll be using 2701. It will either be a Sub-Index Key or a single Tumbler Probability. Since connectionCounts at indexA gives the index in listB of the last connected element, listB at ((connectionCounts at indexA)+1) gives the next element from listB we'll be using (again, either a Sub-Index Key or a Tumbler Probability). This is what we'll assign to the variable indexB 2702.

As described in the preceding paragraph, given an element from listA, we already know which element to use from listB (via its connectionCounts). So we merely need to iterate over a subsection of listA and find the combination with an element of listB with the highest probability.

The variable listA is an. Ordered Collection, which is dynamically sized. Elements are only fetched from inputA when they are actually needed. Since inputA may be a whole Squorging sub-tree, unnecessary computations are avoided. However, as we are looking though listA and listB for the next best combination, we must delve deeply enough into the input streams to be assured that the next element won't possibly yield a better combination. When the condition indexA>listA size is true, we are asking for an element at an index beyond the current size of the list 2703. In other words, we need an element that we have not yet pulled from the input stream. As long as that condition holds, we add elements to listA by sending the next message to inputA 2704. That will fetch the next element, (either an Index Key or a Tumbler Probability) from inputA (either another Squorger or a Tumbler Probability Stream) and add it to the end of listA.

In a similar fashion, we handle the fetching of needed elements from inputB for listB 2705, 2706.

We then compute a temporary variable value for the probability of the Index Key formed by connecting the element at indexA in listA to its next unutilized element from listB (indexB). The value of connecting a given element from listA with a given element from listB is the joint probability of the two elements, which (given the independence of Visual Key Vectors assumption) is the product of the individual element probabilities 2707.

We use a temporary variable bestValue to keep track of the highest probability that we've found so far, and use bestIndex to remember the index at which the bestValue occurred. At this point, we check to see if the temporary variable bestValue is empty or if value is greater than bestValue 2708. If it is, we'll change the value of bestValue to be what is currently contained in value, and set the temporary variable bestIndex to be what is currently contained in indexA 2709.

At this point, whether bestIndex and bestValue have been updated or not, the DO loop is repeated for the next indexA 2710. When the iteration is fully evaluated, it will retain the highest probability of a listA-listB conjunction in the variable bestValue and the index to listA at which the highest probability occurred in the variable bestIndex.

Once the DO loop has been executed for the full range of slots to be considered and the best combination chosen, the Squorger updates its internal bookkeeping. The connectionCounts for bestIndex is incremented, then indexB is set to that value 2711.

It then checks to see if indexB is equal to 1 2712. If true, that means this is the first time that we are connecting to this slot in listA. Since this slot was previously unconnected, we need to update where the firstUnConnectedSlot is. In general the firstUnConnectedSlot will be just beyond where we are connecting, or bestIndex+1. Since we'll now be considering an additional slot in listA, we'll need an additional corresponding element in the dynamically sized Ordered Collection that holds the connectionCounts for each element in listA. This additional element is initially set to zero. 2713

Then we check to see if we've now connected the slot in listA to all of the slots in listB by seeing if the connection count has just grown to be equal to sizeB 2714. If so, we need to update the firstNonFullyConnectedSlot. Since the slot at bestIndex is now fully connected, the firstNonFullyConnectedSlot will be just beyond us, or at bestIndex+1 2715.

We then concatenate listA at bestIndex with listB at indexB 2716. This will produce a new Index Key whose collection of Tumbler Probabilities is the concatenation of the Tumbler Probabilities of the two parts, and whose probability is the product of the probabilities of the two parts. We return this new Index Key in response to the next message 2717.

Example of How a Squorger Combines Two Lists

Figure 28A:
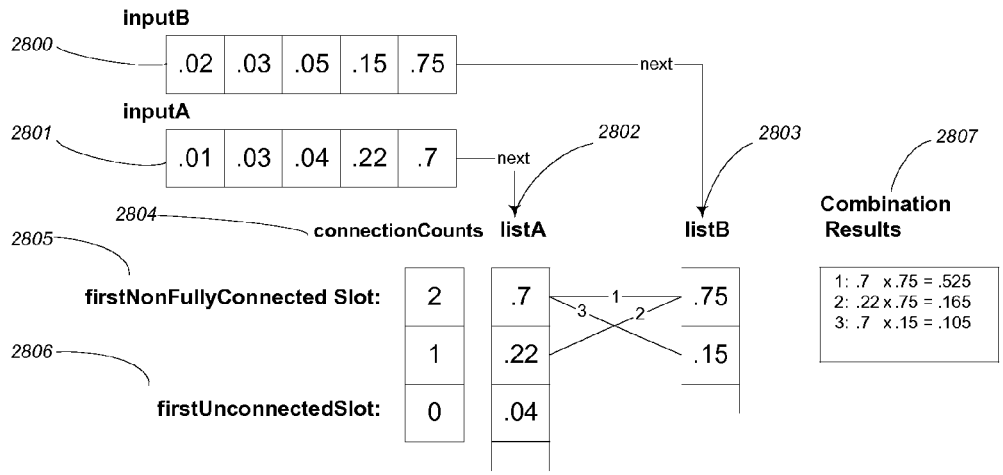
FIG. 28A, FIG. 28B and FIG. 28C detail the process of combining two lists in a Squorger.

In FIG. 28A, we see an example of a Squorger combining two lists of Tumbler Probabilities, inputA 2800 and inputB 2801, which act as the sources of Tumbler Probabilities for listA 2802 and listB 2803, respectively. connectionCounts 2804 is a dynamic list parallel to listA that keeps track of the number of connections that each of the Tumbler Probabilities in listA has made so far. The variable firstNonFullyConnectedSlot 2805 keeps track of the first element in listA that has not yet been connected to all elements in listB; firstUnConnectedSlot 2806 keeps track of the first element in listA that has not yet been connected to any elements in listB. The variables firstNonFullyConnectedSlot 2805 and firstUnConnectedSlot 2806 provide the boundaries of the range of elements that must be checked in listA for any given point in the process of selecting the next best combination.

At this point in the process, three connections have been made. The first element in listA is the firstNonFullyConnectedSlot 2805, and has two connections; the second element in listA has one connection; the third element has no connections yet, and so is the firstUnConnectedSlot 2806. The Combination Results 2807 shows the product of each of the combinations.

Figure 28B:
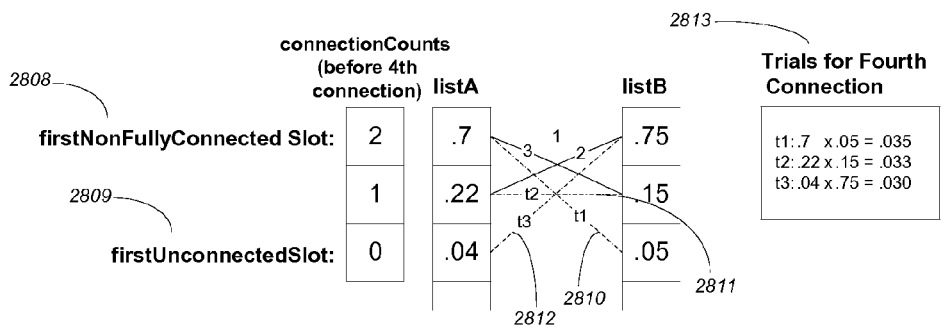

FIG. 28B shows the actual process of deciding which of the possible combinations is the best for making a single connection, in this case, the fourth. The elements to be considered in listA are the first (firstNonFullyConnectedSlot 2808) through the third (firstUnConnectedSlot 2809). Each of these elements connects with one element from listB on a trial basis (t1 2810, t2 2811 and t3 2812).

For each element in listA to be tried, one element in listB is used, determined by the connectionCounts for that element, using the formula listB at: (indexA connectionCounts+1), where indexA is the element in listA to be tried. So the first element in listA combines with the third element in listB (2+1) 2810, the second element in listA combines with the second element in listB (1+1) 2811, and the third element in listA combines with the first element in listB (0+1) 2812. The scores for these trial connections are compared 2813 and the best one chosen, in this case, t1 2810.

Figure 28C:
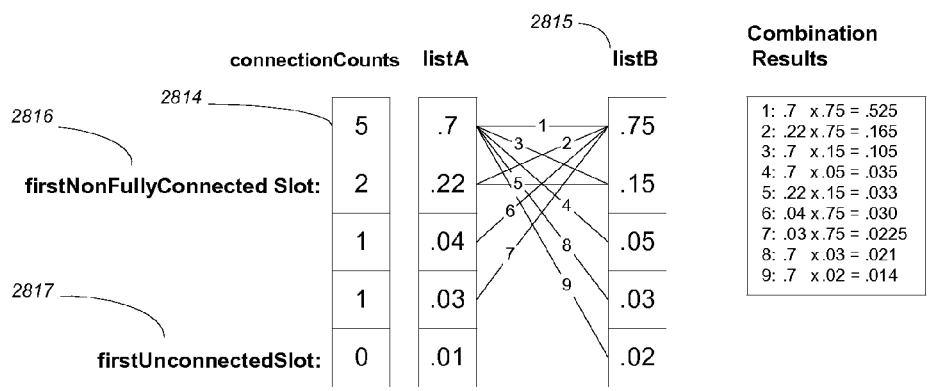

FIG. 28C shows the Squorger after the ninth connection has been made. The connectionCounts for the first element in listA is now 5 2814, which is the same value as the size of listB 2815. In other words, the first element is fully connected. Therefore, firstNonFullyConnectedSlot now becomes the second element in listA 2816. The fifth element in listA is the only one that has not been connected to any element of listB, making it the firstUnConnectedSlot 2817.

Holotropic Stream Recognition

Experiments have demonstrated the effectiveness of the methods described thus far in recognizing individual picture objects. In a first experiment, one thousand baseball cards were all consistently identified from their video camera images even though the cards were rotated, translated, zoomed, bent, defaced, shadowed, defocused or partially obscured. In another test one million randomly composed geometric compositions were learned and then properly identified even though on testing the query compositions had pieces of their original composition that were randomly missing, displaced, scaled and colorized.

The methods previously described do not, however, suboptimal when the individual picture objects are individual frames of a movie or video stream. The problem occurs in the process of assigning index keys to visual keys. A crucial assumption in the Squorge methodology is that the individual tumbler probabilities are independent. Individual tumblers are identified with individual visual key vectors. For the tumblers to be independent, the individual visual key vectors would need to be uncorrelated. But this is impossible, because the individual frames of a movie or video stream are highly correlated images; otherwise the observer would not sense motion. This high degree of frame-to-frame correlation means that any warp grid vector pattern in a given frame is very likely to be very nearly repeated many times in the stream, which significantly correlates the individual warp grid vectors. The result of creating index keys for individual stream frames by the methods described thus far does not lead to a desirable uniformly distributed density of index keys across the space of possible index keys, but rather an undesirably sparse distribution with some of the index keys being duplicated very many times.

Therefore, in order to extend the present invention to the recognition of streams, it is necessary to add a few additional components to our suite of algorithms. We call this algorithm suite Holotropic Stream Recognition (HSR), Holotropic being conjoined from holo meaning "whole" and tropic meaning "turning towards".

Figure 30A:
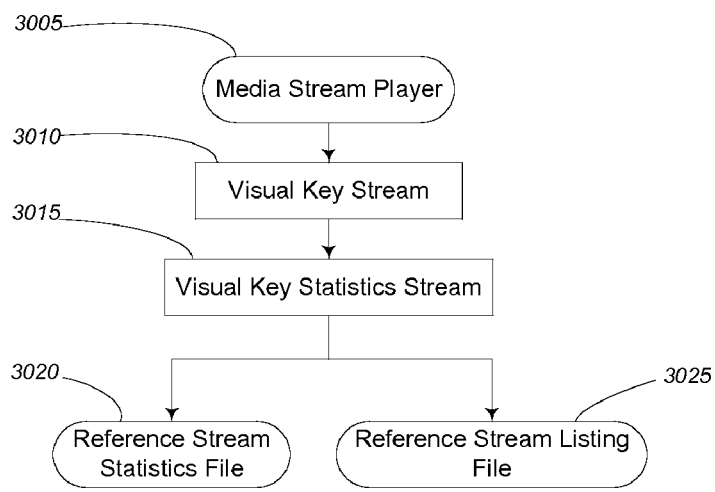
FIG. 30A, FIG. 30B and FIG. 30C illustrate the process of Holotropic Stream Database Construction.
Figure 30B:
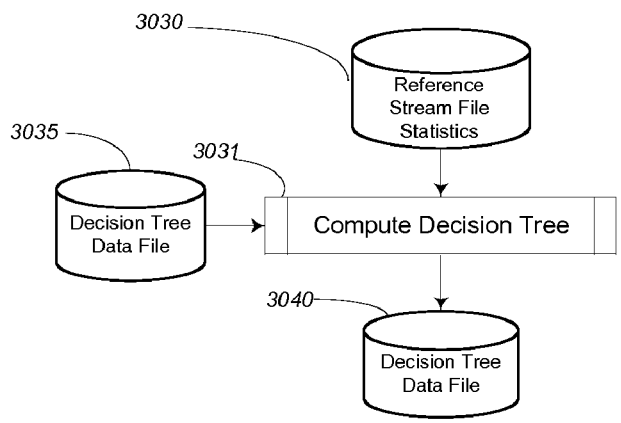
Figure 30C:
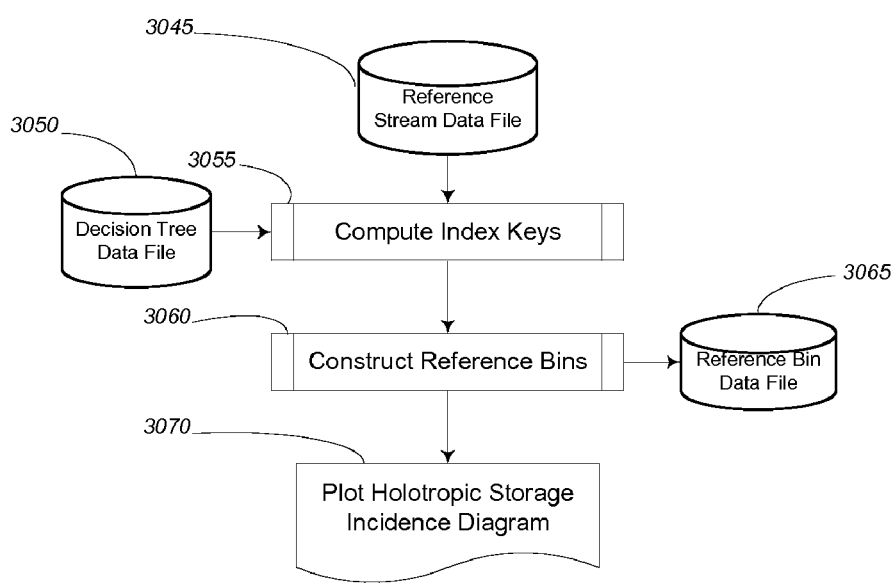
Figure 31:
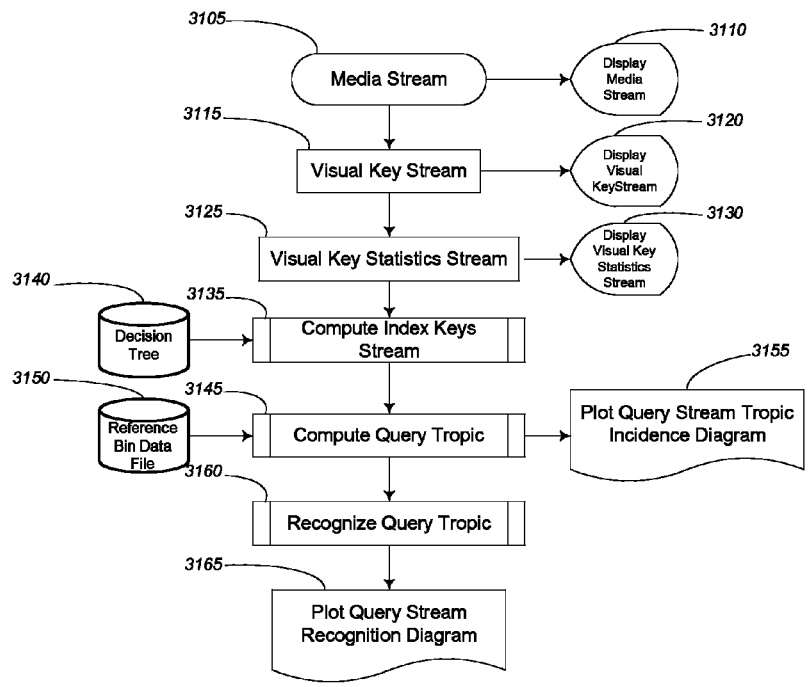
FIG. 31 shows the process of Holotropic Stream Query Recognition.

Holotropic Stream Recognition is diagrammed in FIGS. 30 and 31. FIG. 30: Holotropic Stream Database Construction, consists of three phases, FIG. 30A: Collecting the Statistics Data, FIG. 30B: Constructing the Decision Tree, and FIG. 30C: Constructing the Reference Bins. Referring to FIG. 30A, a Media Stream is learned by playing it on an appropriate player 3005 and converting it, frame by frame, into a stream of Visual Keys 3010 using the Warp Grid algorithm. A Media Stream may be obtained directly from a video camera, a television or cable broadcast, a film, a DVD, a VHS tape, or any other source of streaming pictures. But rather than indexing the Visual Keys directly by sampling individual Visual Key Components as previously demonstrated, the Index. Keys are derived from statistical measurements of the warp grids which are defined over the entire warp grid and which, characterize the twists and turns of the adapted warp grids themselves. This Visual Key Statistics Stream 3015 for the Media Stream to be learned is recorded by appending it to the end of the Reference Stream Statistics File 3020, and cataloging it into the Reference Stream Listing File 3025.

The Reference Stream Statistics File is not used directly to implement Stream Recognition. FIG. 30B: Constructing the Decision Tree, illustrates that a Decision Tree 3035 for converting Visual Key Statistics into Index Keys is explicitly constructed from the Reference Stream Statistics File 3030. The resulting Decision Tree is stored on file storage device 3040. The Decision Tree maps individual media frames into Index Keys by sequentially examining each of their statistical measures and sorting them based on a threshold level which is conditioned on the prior results of previous sorts.

Referring to FIG. 30C: each line of the Reference Stream Data File 3045 has a sequential frame number, starting with 1. Each frame of the Reference Stream is assigned an Index Key by the Decision Tree 3055 which has been stored on storage device 3050. In general, there are many more Reference Stream frames than there are individual Index Keys. The Reference Stream Frame Numbers are sorted into bins according to their assigned Index Keys 3060, the number of bins being equal to the number of possible Index Keys. This Reference Bin Data File is stored on device 3065. The Reference Bin Data can also be plotted as a Holotropic Storage Incidence Diagram 3070 for visualizing the data.

Once the Decision Tree and Reference Bins have been constructed, the HSR system can be queried. Referring to FIG. 31: Holotropic Stream Query Recognition, a Query Media Stream, either one of the streams previously learned, a facsimile of a learned stream, a portion of a learned stream or facsimile thereof, or an unrelated stream, is played on a suitable player 3105. A Visual Key Stream 3115 is created from the playing stream by the Warp Grid Algorithm and further reduced to a stream of Visual Key Statistics 3125. Employing the Decision Tree 3140 previously constructed, the stream of Visual Key Statistics is converted into a stream of Index Keys 3135. The Media Stream, Visual Key Stream and Statistics Stream can all be displayed for visual inspection on display devices 3110, 3120 and 3130 respectively.

Continuing with FIG. 31, the computed Index Keys are used as indices into the database of frame numbers which resides in the Reference Bin Data File 3150. The collection of frame numbers residing in an indexed bin are composited with previously indexed bins to form a Query Tropic 3045, which is a graphical line segment indicating the trajectory and duration of the Query Stream 3145. This trajectory can be plotted as a Query Stream Tropic Incidence Diagram 3155. The Query Tropic is recognized by analyzing a histogram of its frame numbers 3160. The histogram may be plotted as a Query Stream Recognition Diagram 3165.

Holotropic Stream Recognition Application Program

Figure 32:
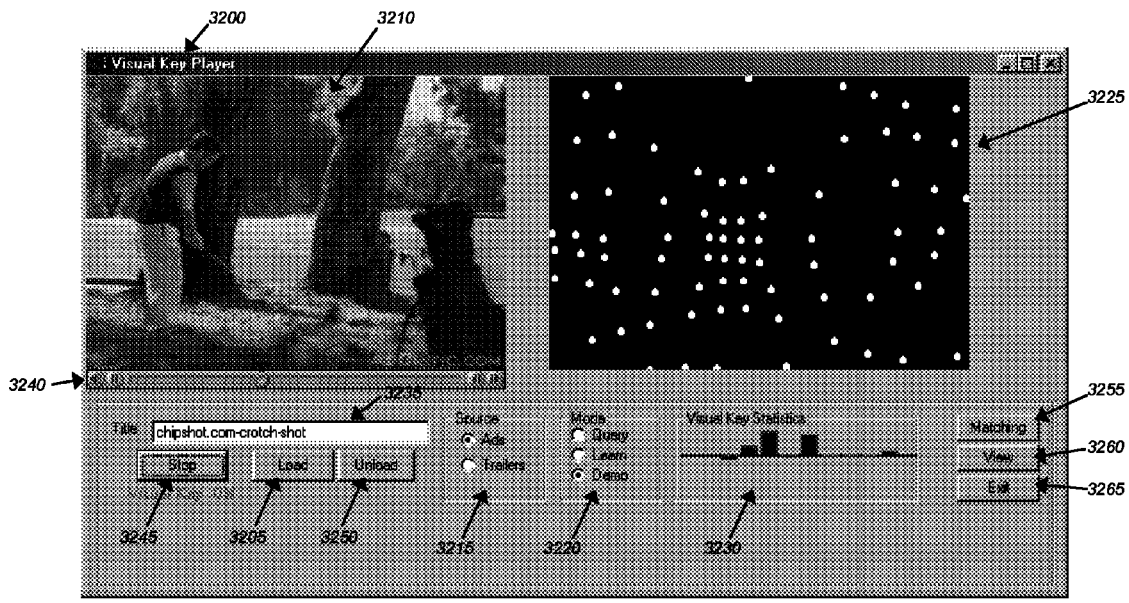
FIG. 32 shows a demonstration Visual Key Player.

A demonstration computer application illustrating Holotropic Stream Recognition is illustrated in FIGS. 32 through 35. FIG. 32, the Visual Key Player, illustrates the user interface window 3200 which contains displays of the Media Stream 3210, the Visual Key Stream 3225 and the Visual Key Statistics Stream 3230. To operate the Visual Key Player, a video source is loaded by clicking the Load Button 3205 and selecting the video file to be played from a pop-up dialog box (not illustrated). The video file is preferably an mov, avi, rel, asf or any other digital video format supported by the Video Player 3210 in the application interface window. In this demonstration application, the video source file may be an advertisement or a movie trailer, as selected by the Source Option 3215, but in general, any video material may be used.

The Visual Key Player operates in three modes as selected by the Mode Option 3220. Query Mode is used to identify a source video, Learn Mode allows adding a new video to the database of learned videos, and Demo Mode enables the display of the Warp Grid Stream while the video is playing but does not cause learning or querying to occur. Demo mode also enables the display of the Warp Grid Statistics.

To add a new video to the database of learned videos, the Learn Mode is selected and the new video is loaded into the Media Player. Its title appears in the Title Text Box 3235. Normally, the Media Player Control 3240 will be set at the start of the video so that the entire video may be learned. Clicking the Visual Key Button 3245 causes the Media Player to enter its play mode and the application to initiate the AutoRun Subroutine, flowcharted in FIG. 36. The AutoRun Subroutine continues to loop while the Visual Key Button remains depressed and the Media Player has not reached the end of the video. The functions performed in the Learn Mode have previously been diagrammed in FIG. 30.

Operation in the Query Mode is similar to operation in the Learn Mode, with the exception that the loaded video is generally untitled given that it is the intention of the Query Mode to identify the video that is played. The functions performed in the Query Mode have previously been diagrammed in FIG. 31. Additional functionality in the Visual Key Player Window is obtained by the Unload Button 3250 for unloading the currently loaded video, the Matching Button 3255 for displaying the Matching Window illustrated in FIGS. 33 through 35, the View Button 3260 for displaying and modifying detailed parameters of the Warp Grid Algorithm, and the Exit Button 3065 for exiting the application program.

Figure 33:
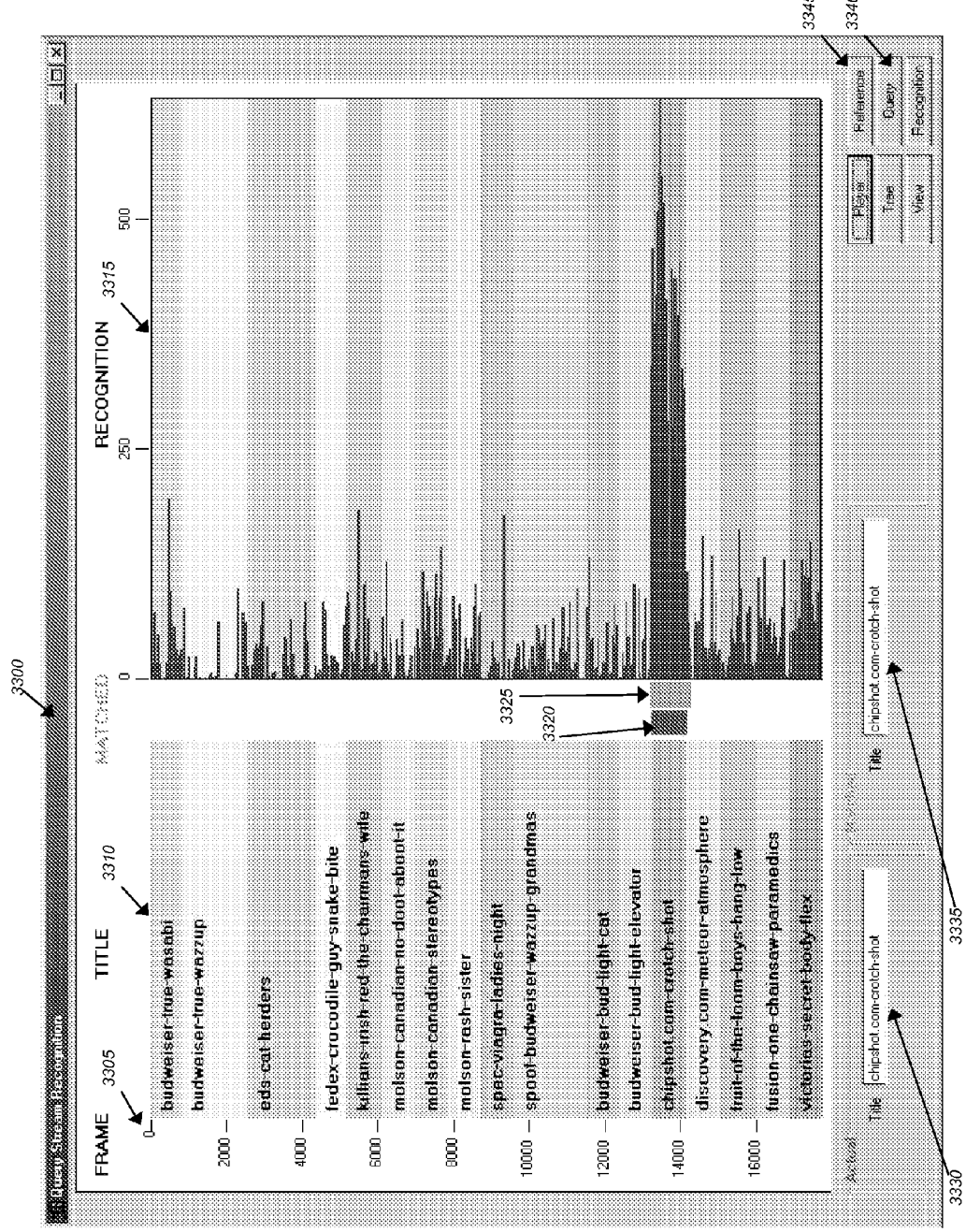
FIG. 33 shows a Query Stream Recognition Plot.

FIG. 33: Query Stream Recognition Plot, illustrates one possible output of Holotropic Stream Query Recognition. The individual frame numbers 3305 of the Reference Stream are listed down the left side of the Query Stream Recognition. Window 3300. Adjacent to the column of frame numbers is a column of Media Stream Titles 3310, indicating the individual Media Streams composing the Reference Stream, the data for which has been stored in the Reference Stream Listing File. On the right hand side of the Query Stream Recognition Window is a Recognition Plot of the recognizability of the individual frames of the Reference Stream 3315. The length of each individual spike is a measure of how distinguishable a given frame is within the context of all the frames in the Reference Stream. This recognizability measure is not a probability, but rather a count of the number of times a given frame number appears in the Reference Bins indexed by the stream of Index Keys computed for the Query Stream. As such, the Recognition Plot could be converted to a plot of individual frame recognition probabilities by an appropriate scaling of the Recognition axis. It should also be pointed out that the Recognition Plot is a histogram: that is, the frame number axis has been quantized into multiframe intervals. In this illustration, the Recognition Plot Interval is 25 frames. Therefore, strictly speaking, the plot shows the recognizability of an interval of 25 frames rather than the recognizability of individual frames. The Recognition Plot Interval defines the minimum length of the shortest snippet of a Query Media Stream which may be usefully recognized: in this case, less than one second for a 30 frames/second display.

The Query Stream Recognition Window also identifies the actual and matched Query Streams for purposes of testing the performance of the system. The title of the actual Query Stream, if it is known, is displayed in the Actual Title Text Box 3330, while the result of recognition is displayed in Matched Title Text Box 3335. The actual duration of the Query Stream is displayed as a vertical bar 3320 in the space between the Titles and the Recognition Plot, the top and bottom of the bar indicating the actual starting and stopping frame of that portion of the Reference Stream which is being played as the query. If the Query Stream is not part of the Reference Stream, this vertical bar is not displayed. The estimated starting and stopping position of that portion of the Reference Stream which is matched to the Query Stream is displayed as a second vertical bar 3325. As can be seen from the example plot, the estimated duration of the matched stream is slightly greater than the actual duration of the Query Stream. The methods employed for matching and estimating Query Stream duration from the Recognition Plot are covered in detail in the flow chart of FIGS. 49A and 49B.

Figure 34:
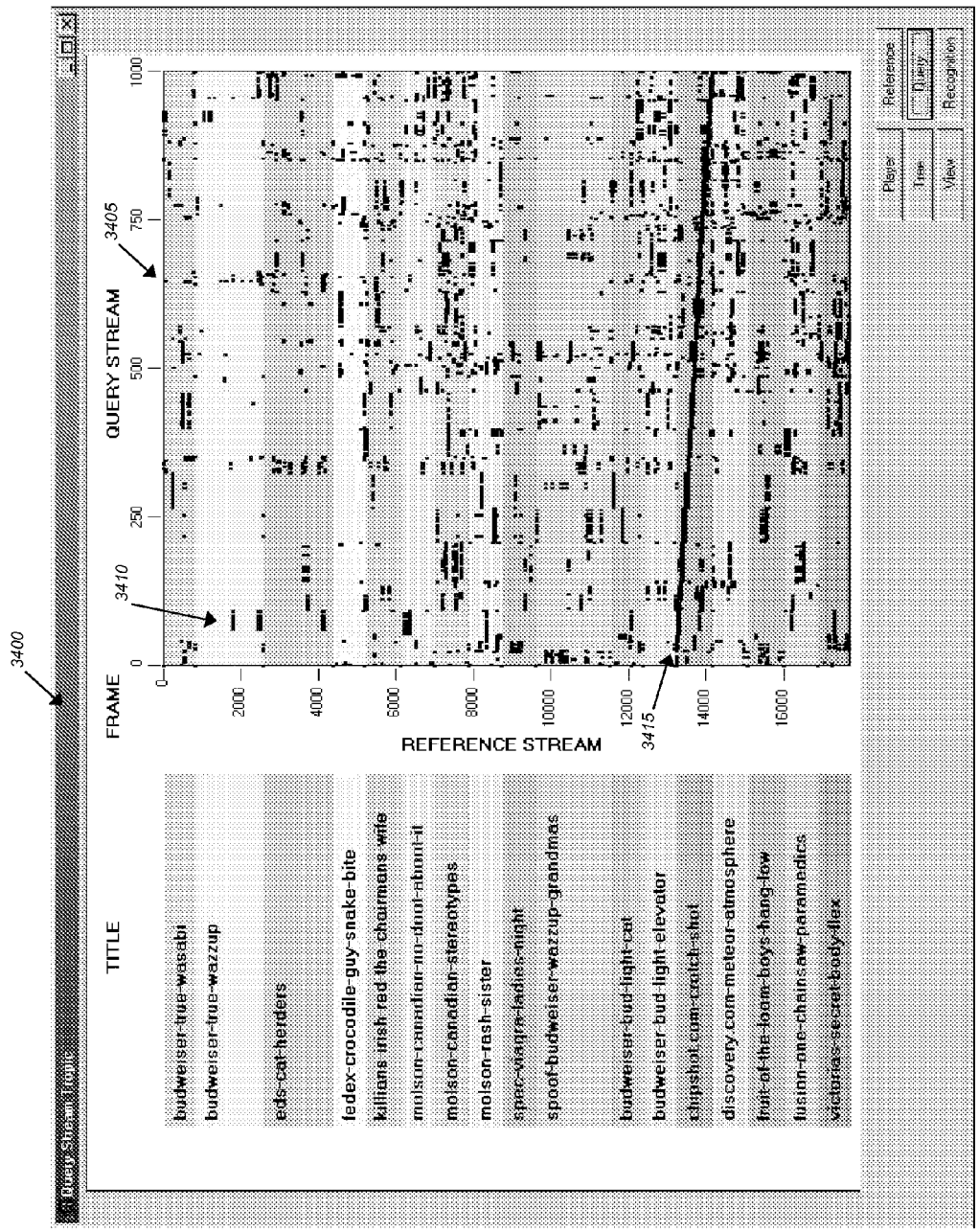
FIG. 34 shows a Query Stream Tropic Incidence Diagram.

Clicking the Query Button 3340 of the Query Stream Recognition Window constructs the Query Stream Tropic Window 3400 illustrated in FIG. 34. The Query Stream Tropic Incidence Diagram 3405 is so named because the Query Stream appears in the diagram as a diagonal line segment, with the left and right ends of the segment indicating the start and stop of the matched Query Stream in the Reference Stream. The diagram also indicates portions of the Reference Stream which only partially correlate with the Query Stream. These are seen as short horizontal line segments 3410. The longest of these line segments are readily distinguishable from the Query Tropic 3415 because they lack both the length and the inclination of the Query Tropic. The inclination of the Query Tropic of course arises from the fact that the frames of the Query Stream are sequentially matched by the frames of the appropriate portion of the Reference Stream. If there is no match of the Query Stream in the Reference Stream, the Query Tropic is absent from the diagram.

Figure 35:
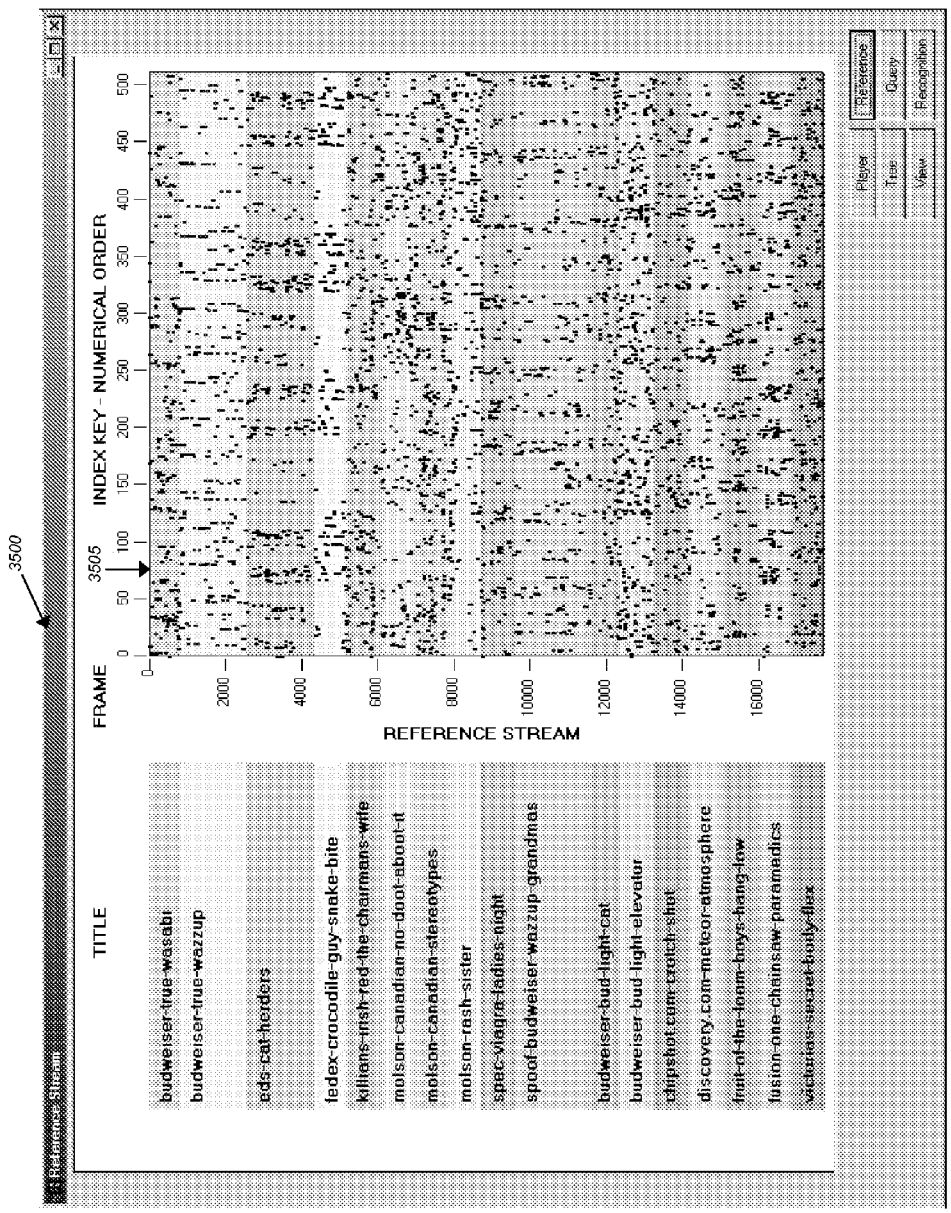
FIG. 35 shows a Holotropic Storage Incidence Diagram.

Clicking the Reference Button 3345 of the Query Stream Recognition Window constructs the Reference Stream Window 3500 illustrated in FIG. 35. This window contains the plot of the Holotropic Storage Incidence Diagram 3505. This diagram plots the contents of the Reference Bins. Together with the Decision Tree, it is these two database entities that actually embody the information to determine if any subsequence of the Reference Stream has been matched by the Query Stream.

Index Keys are plotted horizontally and Reference Stream frame numbers vertically in the diagram. The illustrated application program employs 9 statistical measures to characterize the warp grids. Hence, there are $2^9$ Index Keys in the range 0 to 511. In this example there are 17704 Reference Stream frames. Thus, on the average, each Index Key is repeated about 35 times. When Index Key i contains frame j, the incidence diagram places a black dot at column i, row j. The resultant diagram has an overall random appearance with very little structure, reminiscent of an unreconstructed transmission hologram, hence the name Holotropic Storage. It is only when the individual columns of the diagram are reordered according to the sequence of Index Keys for the frames of the Query Stream that the Tropic for identifying the Query Stream emerges from the noise.

Subroutine Flow Charts

Figure 36:
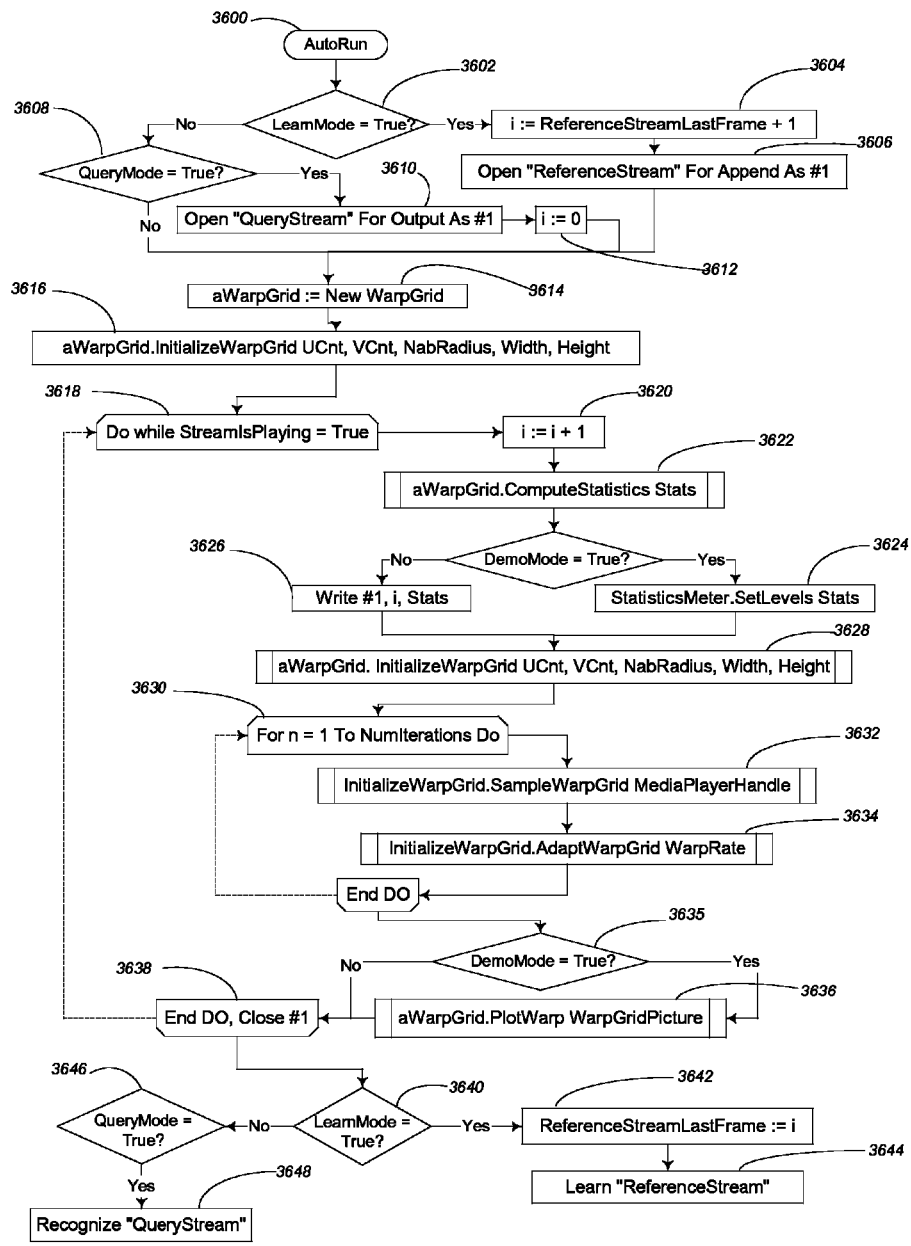
FIG. 36 is a flowchart of the AutoRun subroutine.

The main subroutine of the application program is called AutoRun and it is flowcharted in FIG. 36. It consists of an initializing portion which is entered when the Visual Key button on the interface window is clicked, a loop that is repeated as long as the Media Player is playing, and a terminating portion. AutoRun makes subroutine calls to the other principle subroutines in the application program.

Entering AutoRun at 3600, the first action is to determine the running mode and take the appropriate initializing action. If the user has selected Learn Mode 3602, then the frame counter i 3604 begins at the last recorded frame number+1 and the Reference Stream Statistics file is opened for appending the new statistical data 3606. If the user has selected the Query Mode 3608 then a Query Stream Statistics file is created 3610 and the frame counter 3612 is initialized at 0. If the user selects Demo Mode no statistical data is collected.

A new Warp Grid is created 3614 and subsequently initialized 3616 as flowcharted in FIG. 37. The main loop 3618 of AutoRun is repeated while the Media Stream is playing. First, the frame counter i is incremented 3620. Next, the statistics of the warp grid are computed 3622 as flowcharted in FIG. 40, and, if the Demo Mode has been selected, the statistics are plotted 3624 on the Statistics Meter on the user interface window. If Demo Mode has not been selected then these same statistics are written to the Reference Stream Statistics file or the Query Stream Statistics file, whichever is appropriate 3626.

Each pass through the loop, the warp grid is initialized and adapted a fixed number of iterations (NumIterations) sufficient for it to reach a near equilibrium condition 3630. Each adaptation iteration occurs in two steps, sampling the Media Player window 3210 at the warp grid points 3632 and adapting the warp grid using the sampled levels 3634. The subroutines for these two steps are flowcharted in FIGS. 38 and 39 respectively. Finally, if Demo Mode has been selected 3635, the adapted warp grid is plotted in the Warp Grid Picture 3636 (3225 of the Visual Key Window 3200).

Figure 46:
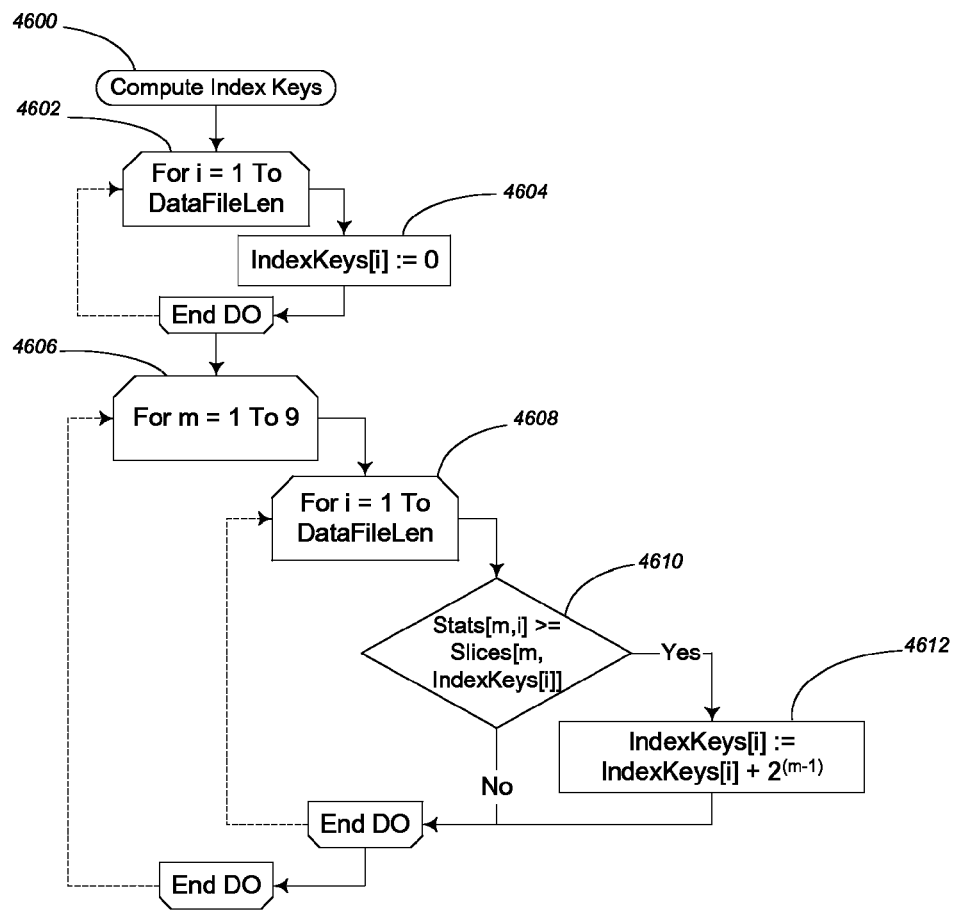
FIG. 46 is a flowchart of the computeIndexKeys subroutine.

When the Media Stream is no longer playing, the loop 3618 is exited and the file for receiving the statistical data is closed 3638. If the Learn Mode is selected 3640 then the Reference Stream Last Frame is set to the frame counter i 3642 and the application program calls the Learn subroutine flowcharted in FIG. 41 to operate on the Reference Stream Statistics file 3644. If the Query Mode is selected 3646 then the Recognize subroutine flowcharted in FIG. 46 is called to operate on the Query Stream Statistics file 3648.

Figure 37:
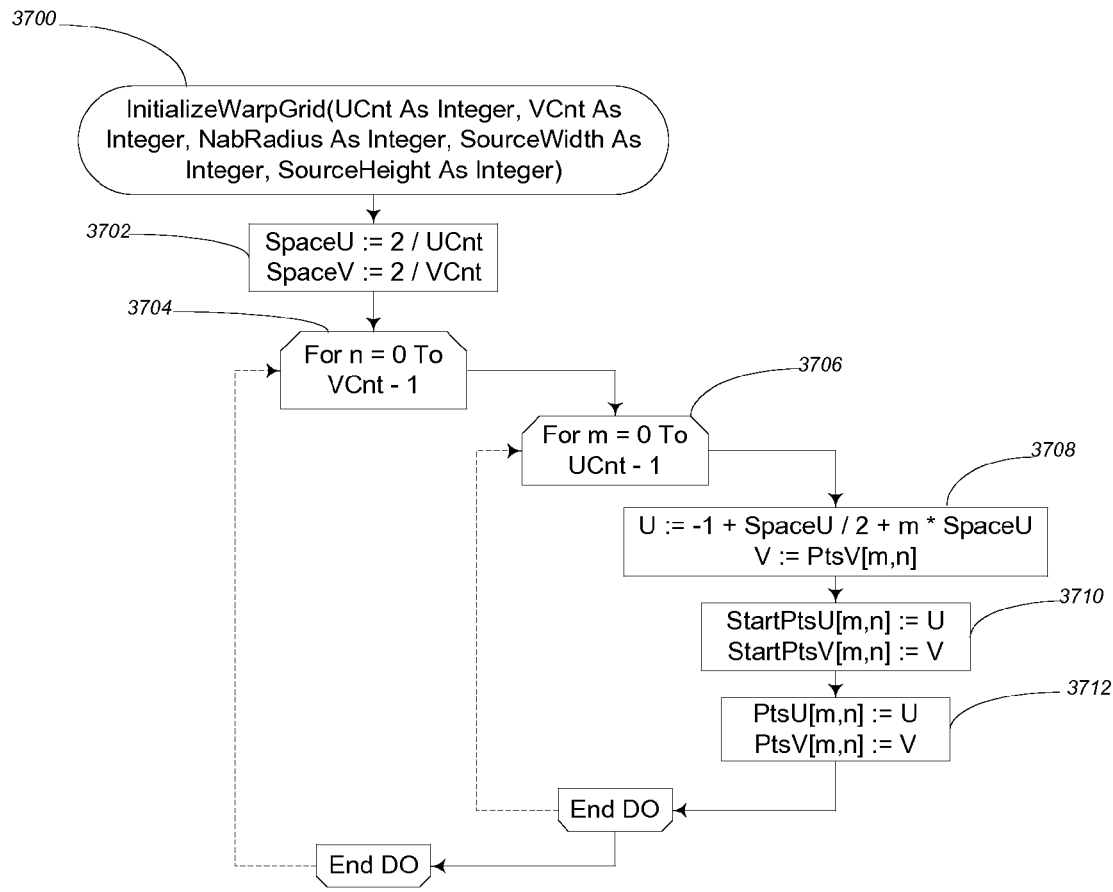
FIG. 37 is a flowchart of the initializeWarpGrid subroutine.

Subroutine InitializeWarpGrid 3700 flowcharted in FIG. 37 establishes the points of the warp grid in their initial positions PtsU and PtsV within the U,V space of the warp grid. The number of points to be initialized in the U and V directions are UCnt and VCnt respectively which are entered as arguments to the subroutine. The variables SpaceU and SpaceV 3702 determine the spacing of the initial warp grid point placements, which are individually placed within the nested iterations 3704 and 3706 according to the linear calculations of 3708. These starting positions of the warp grid points are held in array variables StartPtsU and StartPtsV 3710 as well as array variables for maintaining the current positions of these points PtsU and PtsV 3712.

Figure 38:
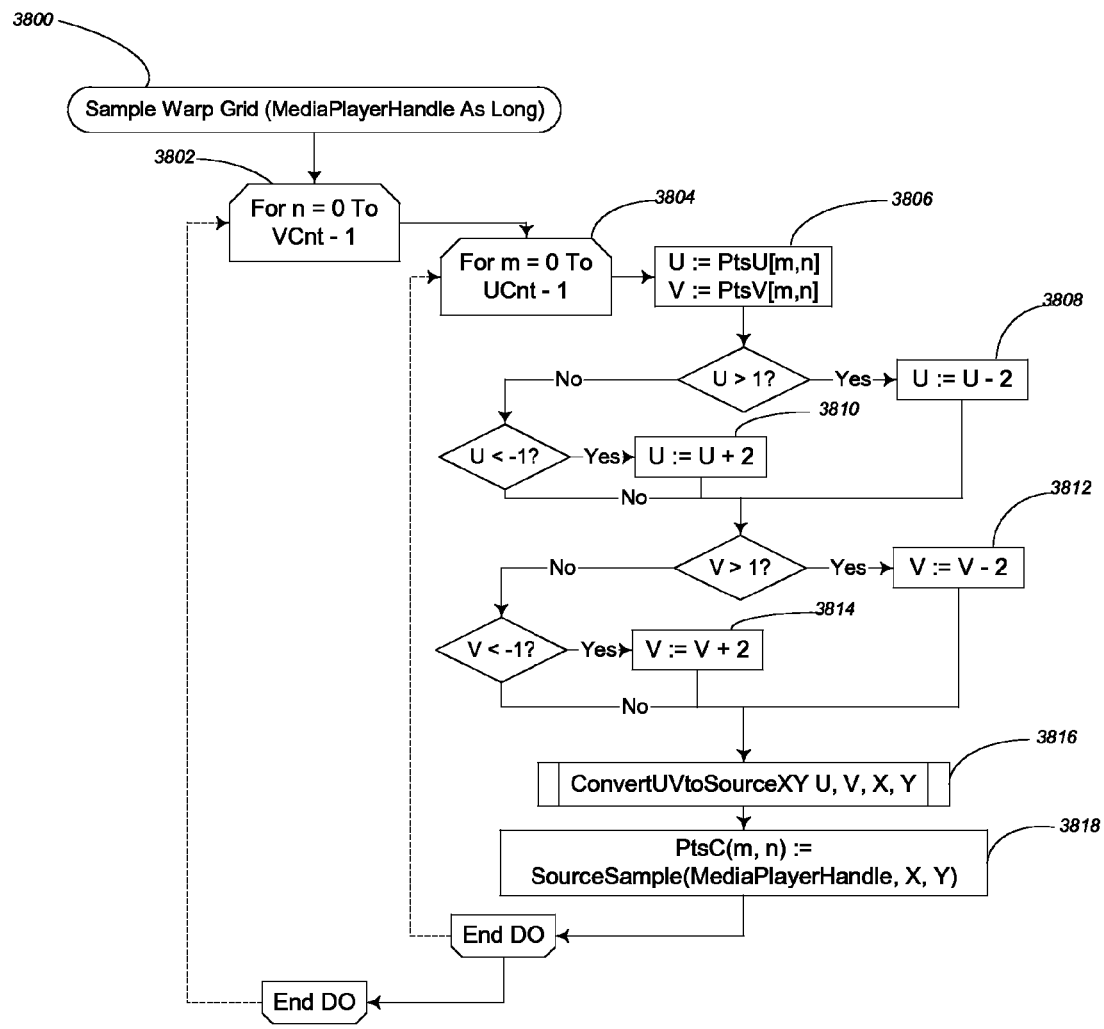
FIG. 38 is a flowchart of the sampleWarpGrid subroutine.

Subroutine SampleWarpGrid 3800 flowcharted in FIG. 38 obtains the pixel brightness levels of the Media Player Window at the Warp Grid point locations U and V. Iterations 3802 and 3804 index through the Warp Grid points 3806. If a point's value U is greater than 1 so that it falls outside the Warp Grid Bounding Rectangle, then it is decremented by 2 so that it samples inside the rectangle, but on the opposite side of the rectangle 3808. Likewise, if a point's value U is less than −1 so that it falls outside the Warp Grid Bounding Rectangle, then it is incremented by 2 so that it samples inside the rectangle, but on the opposite side 3810. Similarly, Warp Grid point values V are wrapped if they fall outside the bounding rectangle 3812, 3814.

The subroutine ConvertUVtoSourceXY 3816 establishes the mapping from the U,V space of the Warp Grid to the x,y space of the Media Player Window. Finally, the brightness of a pixel at x,y in the Media Player Window is sampled by the SourceSample subroutine 3818 and stored in the array variable PtsC.

Figure 39:
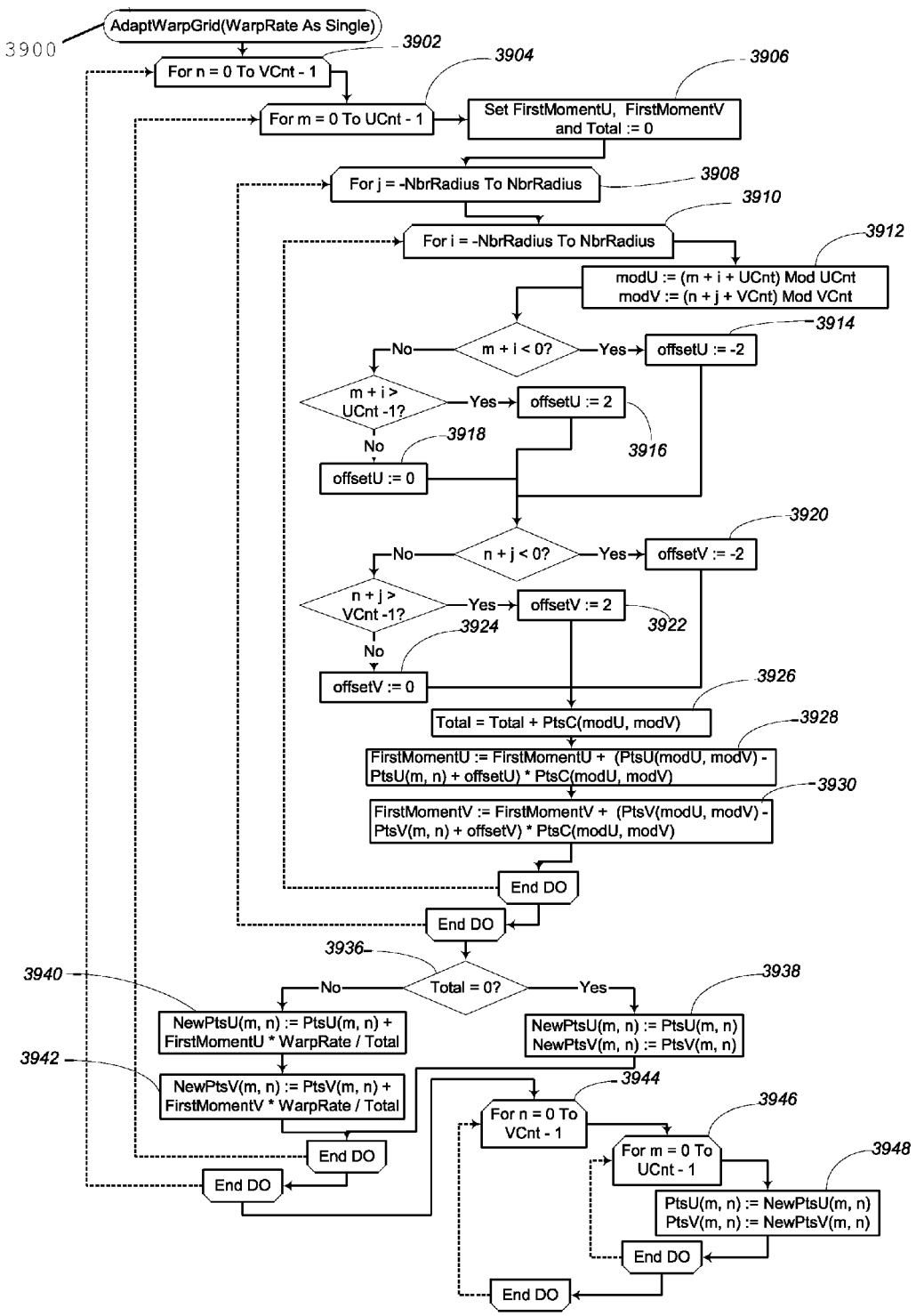
FIG. 39 is a flowchart of the adaptWarpGrid subroutine.

Subroutine AdaptWarpGrid 3900 flowcharted in FIG. 39 adapts the current warp grid a single iteration at the specified Warp Rate. A pair of nested iterations 3902, 3904 treats the current warp grid point m,n individually. Each individual warp grid point is connected via its connectivity pattern to surrounding points of the warp grid. Here, the connectivity pattern is called "neighborhood connectivity" because the connected points are all the immediate neighbors in the initialized warp grid. The nested iterations on i and i 3908, 3910 iterates over the points of the neighborhood of grid point m,n. The width of these iterations is determined by the neighborhood radius NbrRadius.

The adaptation method employed here uses a center-of-gravity calculation on the points of an adapted warp grid. That is, the points of the warp grid may be significantly displaced from their starting positions. The center-of-gravity is computed over the points in the neighborhood connectivity pattern. Each point is given a weight equal to the brightness of the corresponding pixel in the Media Player Window. The "lever arm" of the center-of-gravity calculation is the current distance between the given warp grid and its neighbor. The variables necessary for the center-of-gravity calculation are initialized 3906 for each point in the warp grid.

The points of the wart) grid are toroidally connected, hence the modular calculation 3912 for modU and modV which are restricted to the ranges 0 to UCnt−1 and 0 to VCnt−1 respectively.

Recall that the bitmap in the Media Player Window is also treated as being toroidally wrapped, hence the bitmap can be viewed as an infinite repeating patchwork. That is why the subroutine SampleWarpGrid applies offsets of +2 and −2 whenever U or V goes outside their bounding ranges −1 to +1. But the center-of-gravity calculation does not give the pixel sampled from the opposite edge of the bitmap a lever arm that long; rather, the lever arm of the calculation is taken from the point's unwrapped position even if it falls outside the bounding rectangle.

The calculations for testing m+i and applying the appropriate value to offsetU 3914, 3916 and 3918 ensures that the neighborhood geometries will be contiguous in the U direction as discussed in the preceding paragraph. Similarly testing n+j and applying the appropriate value to offsetV 3920, 3922 and 3924 ensures that the neighborhood geometries will be contiguous in the V direction.

Summing the sampled levels of each warp grid point in the neighborhood yields the zero$^{th}$ moment of the center-of-gravity calculation 3926 for the point m,n. The first moment is of course the sum of the sampled levels weighted by the distance of the sampling point. These distances are taken with respect to the U and V coordinates of the grid point m,n. The offsetU previously calculated is applied to the coordinate ptsU of the sampling point in summing the First Moment for U 3928. Similarly, the offsetV previously calculated is applied to the coordinate ptsV of the sampling point in summing the First Moment for V 3930.

At the conclusion of the nested iterations over the neighborhood of grid point m,n, the first moment is tested for a zero value 3936 and if true the location grid point m,n remains unchanged 3938, otherwise the temporary array variable NewPtsU will be calculated by offsetting the U coordinate of grid point m,n by an amount proportional to the center-of-gravity's U coordinate, namely the Warp Rate 3940. Similarly, NewPtsV will be calculated by offsetting the V coordinate of grid point m,n by an amount proportional to the center-of-gravity's V coordinate, namely the Warp Rate 3942.

Only after the nested iterations on n and m have completed does the actual changing of the warp grid point array variables PtsU and PtsV occur. Nested loops on n and m 3946 and 3948 iterate over all grid points replacing PtsU and PtsV with the temporary array variables NewPtsU and NewPtsV respectively 3950.

Figure 40:
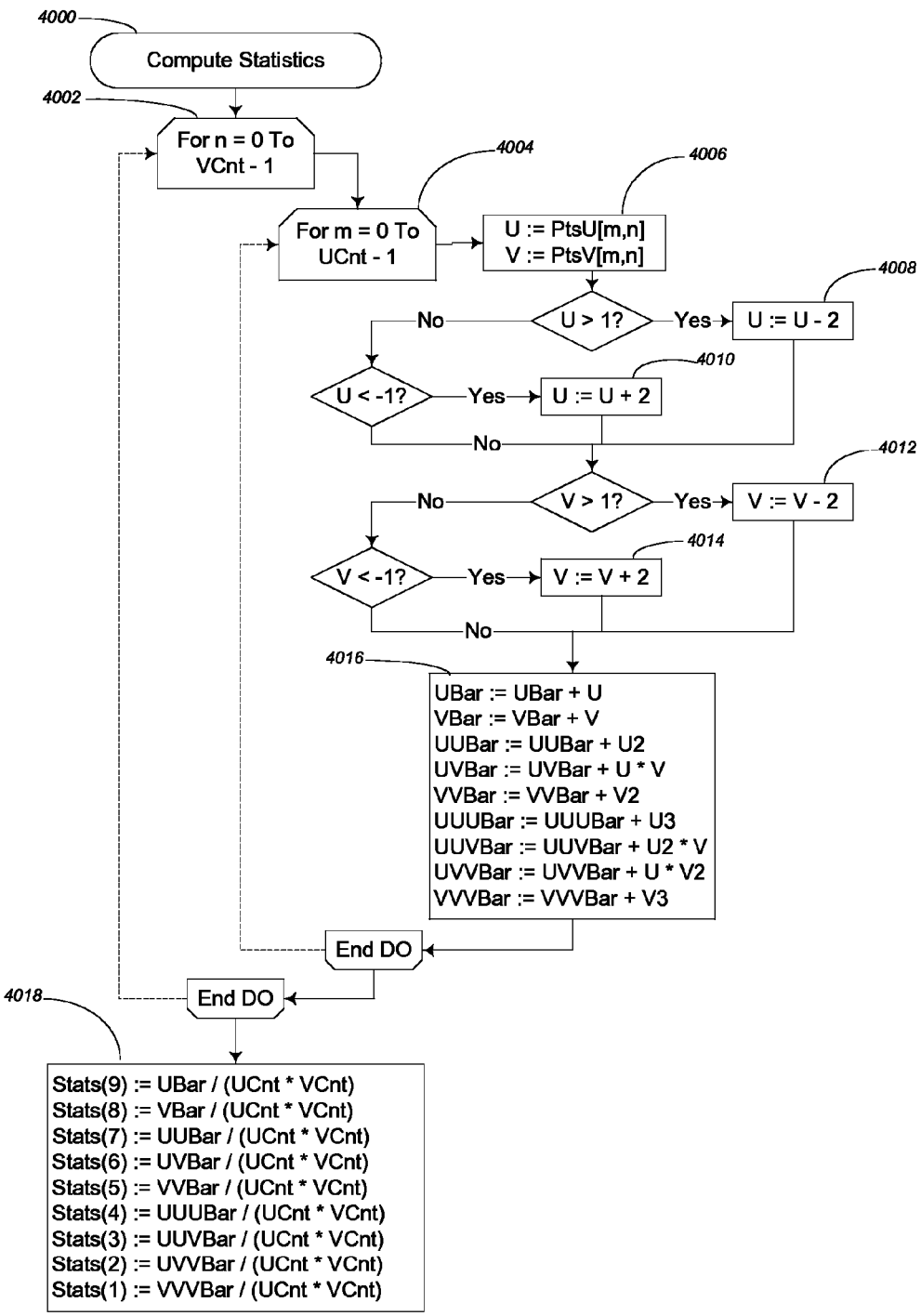
FIG. 40 is a flowchart of the computeStatistics subroutine.

Subroutine ComputeStatistics 4000 flowcharted in FIG. 40 generates a set of nine statistics on the points of the fully adapted warp grid. The statistics are the average values over all the warp grid points of the quantities $U^i * V^j$ (U coordinate raised to the $i^{th}$ power times V coordinate raised to the $j^{th}$ power). These statistics are the higher moments and cross-moments of the warp grid patterns. The nine statistics that have been chosen for this application program are those forms for which i+j>0 and i+j<n where n=4. In general, n could take on other values, the higher values of n leading to arithmetically more statistics with a geometric rise in the number of possible index keys. Or other sets of statistics could be defined.

Nested iterations on n and m 4002, 4004 individualize warp grid point coordinate pairs U, V 4006. Offsets are applied if necessary to wrap point U,V back into the bounding rectangle at 4008, 4010, 4012 and 4014. These four steps may be omitted. Next the partial sums of the nine statistics are obtained in 4016.

Upon exiting the nested iterations on the points of the warp grid, the nine statistics are computed as the average values of the nine partial sums 4018.

Figure 41:
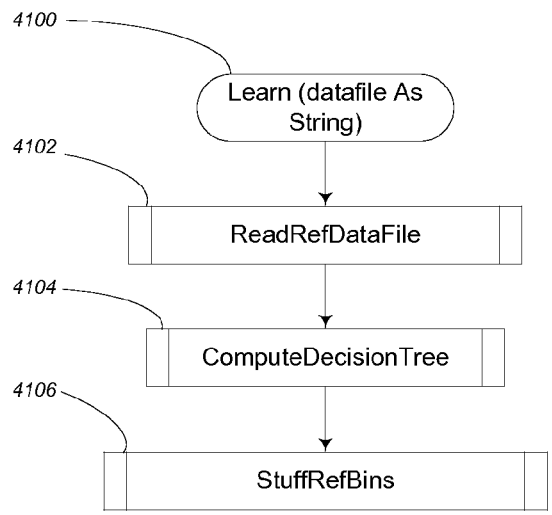
FIG. 41 is a flowchart of the Learn subroutine.
Figure 44:
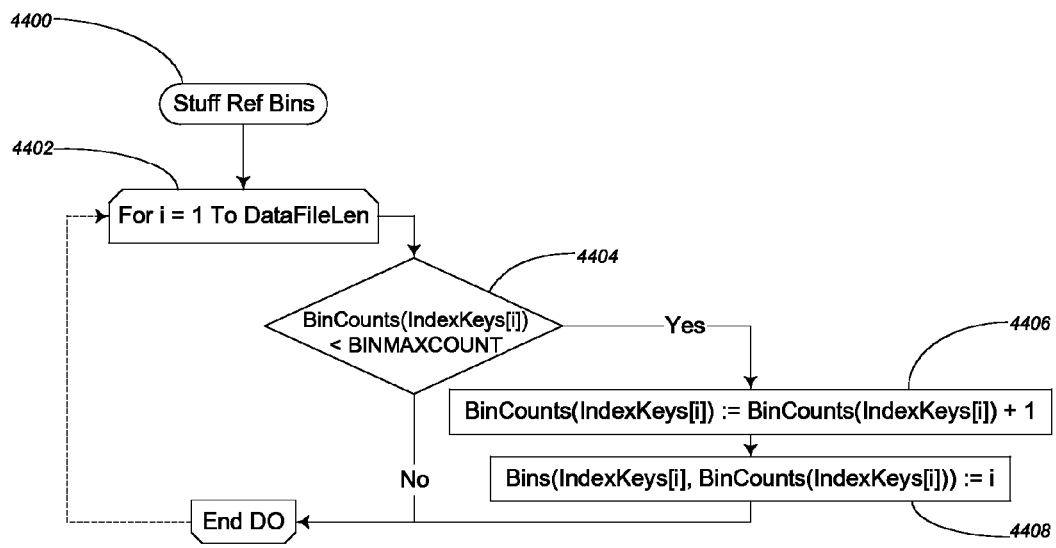
FIG. 44 is a flowchart of the stuffReferenceBins subroutine.

Subroutine Learn 4100 flowcharted in FIG. 41 consists of the three major steps for converting the Reference Stream Statistics file into Decision Tree data and Reference Bins data. First the Reference Stream data is read from the specified file 4102. The subroutine ComputeDecisionTree 4104 creates the Decision Tree database as flowcharted in FIG. 42. The subroutine ComputeDecisionTree also constructs index keys for each frame of statistical data in the Reference Stream Statistics file. Finally, the subroutine StuffReferenceBins 4106 creates the Reference Bins database and is illustrated in FIG. 44.

Figure 42:
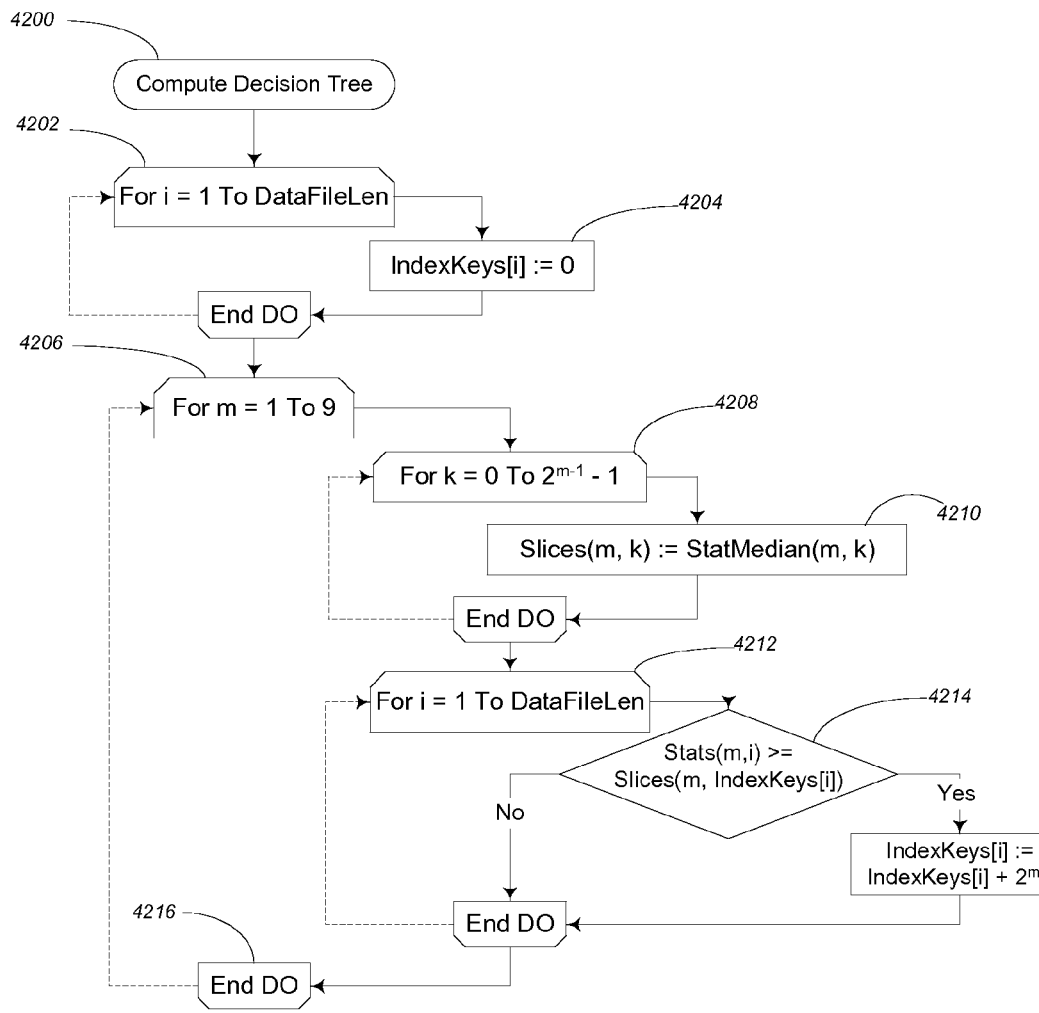
FIG. 42 is a flowchart Of the computeDecisionTree subroutine.

Subroutine ComputeDecisionTree 4200 flowcharted in FIG. 42 constructs the Decision Tree and Index Keys for the data in the Reference Stream Statistics file which is specified in the datafile, argument in the subroutine call. The general principle of the Decision Tree construction is to treat the nine statistical measures sequentially, starting with the first statistical measure. To begin, an Index Key of 0 is assigned to each frame of the datafile. Next, the median value of the first statistic is determined over all the frames of the datafile. The first statistic of each individual frame of the datafile is then compared to this first median value. If the first statistic is greater than this first median value, then the value 1 is added to the corresponding Index Key for the frame. This first operation on the first statistical measure partitions the datafile into those frames with an Index Key of 0 and those frames with an Index Key of 1.

Next, we consider the second statistical measure. Two additional statistical medians are computed for the second statistic over the entire datafile, a second median for those frames whose Index Key is 0 and a third median for those frames whose Index Key is 1. The second statistical measure of those frames whose Index Key is. 0 is compared to this second median and if the second statistic of the frame exceeds this second median, then the Index Key of the frame is incremented by 2. Similarly, the second statistical measure of those frames whose Index Key is 1 is compared to the third median and if the second statistic of the frame exceeds this third median, then the Index Key of the frame is incremented by 2. This second operation on the second statistical measure partitions the datafile into four groups specified by their Index Keys, at this operation having possible values of 0, 1, 2 and 3.

The process continues for the remaining statistical measures. At each successive stage of the process, the number of new statistical medians needed to be calculated is doubled. Similarly, the number of possible Index Key values is doubled as well. At the completion of the ninth statistical measure, the number of statistical medians calculated in total will be 511, or $2^9-1$, while the number of possible Index Keys will be 512, or $2^9$.

Referring now to FIG. 42, the subroutine begins with an initializing iteration over all of the frames of the datafile 4202 setting a corresponding Index Key to zero 4204. Next is the actual iteration over the nine individual statistical measures indexed by m 4206. As can be derived from the previous paragraphs, the $m^{th}$ statistical measure requires that $2^{(m-1)}$ statistical medians be calculated, hence a further nested iteration on an integer k runs over values 0 to $2^{(m-1)}-1$ as shown in 4208. Each newly computed statistical median 4210 is stored in a two-dimensional array variable Slices(m,k). The computation of the statistical median is illustrated in the flowchart of FIG. 43.

After all the statistical medians for the m statistical measure are calculated, the datafile can be iterated frame-by-frame 4212 and the Index Keys of the individual frames can be incremented or not by a value of $2^{(m-1)}$ depending on whether the $m^{th}$ statistic is equal to or greater than the appropriate statistical median given the frame's present Index Key 4214. The construction of the Decision Tree is complete 4216 when all the statistical measures have been dealt with in this manner.

Because each branch of the Decision Tree is constructed by partitioning an array of statistical measures approximately in half by comparing it to the median value of the array, the resultant tree be considered to be balanced in that we expect each of the Possible Index Key values for the frames of the datafile can be expected to be represented about an equal number of times. This is exactly what is observed on the actual data. As can be observed from the Holotropic Storage Incidence Diagram of FIG. 35, each Index Key column has approximately the same number of black dots. This uniform distribution of the Index Keys through the space of possible Index Keys is the highly desirable result that could not be obtained on picture object streams using the methods previously described for individual picture objects employing the Squorging algorithm.

Figure 43:
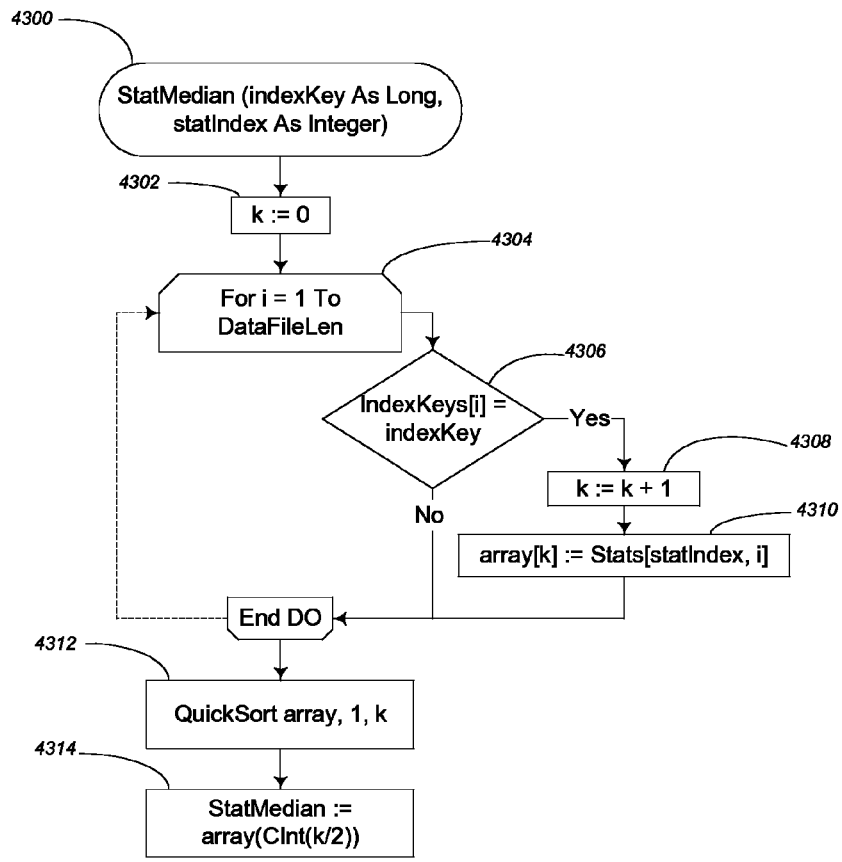
FIG. 43 is a flowchart of the statMedian subroutine.

Function StatMedian 4300 which is repeatedly called from Subroutine ComputeDecisionTree is flowcharted in FIG. 43. The function accepts as arguments an Index Key value (indexKey) and the index of the statistical measure presently under consideration m. After first initializing a temporary variable count as zero 4302, the individual frames of the datafile Reference Streams Statistics are iterated 4304. The Index Key corresponding to each frame is compared to the argument indexKey 4306 and if they match, count is incremented by one 4308, and the $m^{th}$ statistical measure for the $i^{th}$ frame of the datafile is added to temporary array variable array 4310. Recall that on calling StatMedian from ComputeDecisionTree, the Index Keys are being "built" one statistical measure at a time. Therefore, the array IndexKeys contains these "partially built" keys.

What is needed is the statistical median of the contents of temporary array variable array. This is obtained by first sorting array using the QuickSort method 4312. Since QuickSort returns array sorted in numerically ascending order, the Statistical Median can be directly determined by drilling down halfway through the sorted list to obtain the value at the mid-position in the sorted list 4314.

The final step of the Learning process is the subroutine StuffReferenceBins 4400 flowcharted in FIG. 44. The integer variable i is iterated over all the frames in the datafile Reference Stream Statistics 4402. Each frame of the datafile has an associated completed Index Key, the Learn process having just computed the Decision Tree and the Index Keys in the process. The two-dimensional array variable Bins is initialized to 512 individual bins corresponding to the 512 possible Index Key values arising from the 9 statistical measures. The size of each bin is fixed in this example at a constant BIN-MAXCOUNT, although the bin storage does not have to be of fixed size and could be redimensioned as degred. In this example application program, the bin counts and bin contents are upgraded only if the bin count for the bin number indexed by the Index Key of the $i^{th}$ frame of the datafile is less than BINCOUNTMAX 4404. If so, the appropriate bin count is incremented by one 4406 and the frame number i is added to the appropriate bin 4408.

This concludes the discussion of the subroutines required for the Learn Mode of the example application program. We continue with a discussion of the subroutines required for the Query Mode of operation of the application program.

Figure 45:
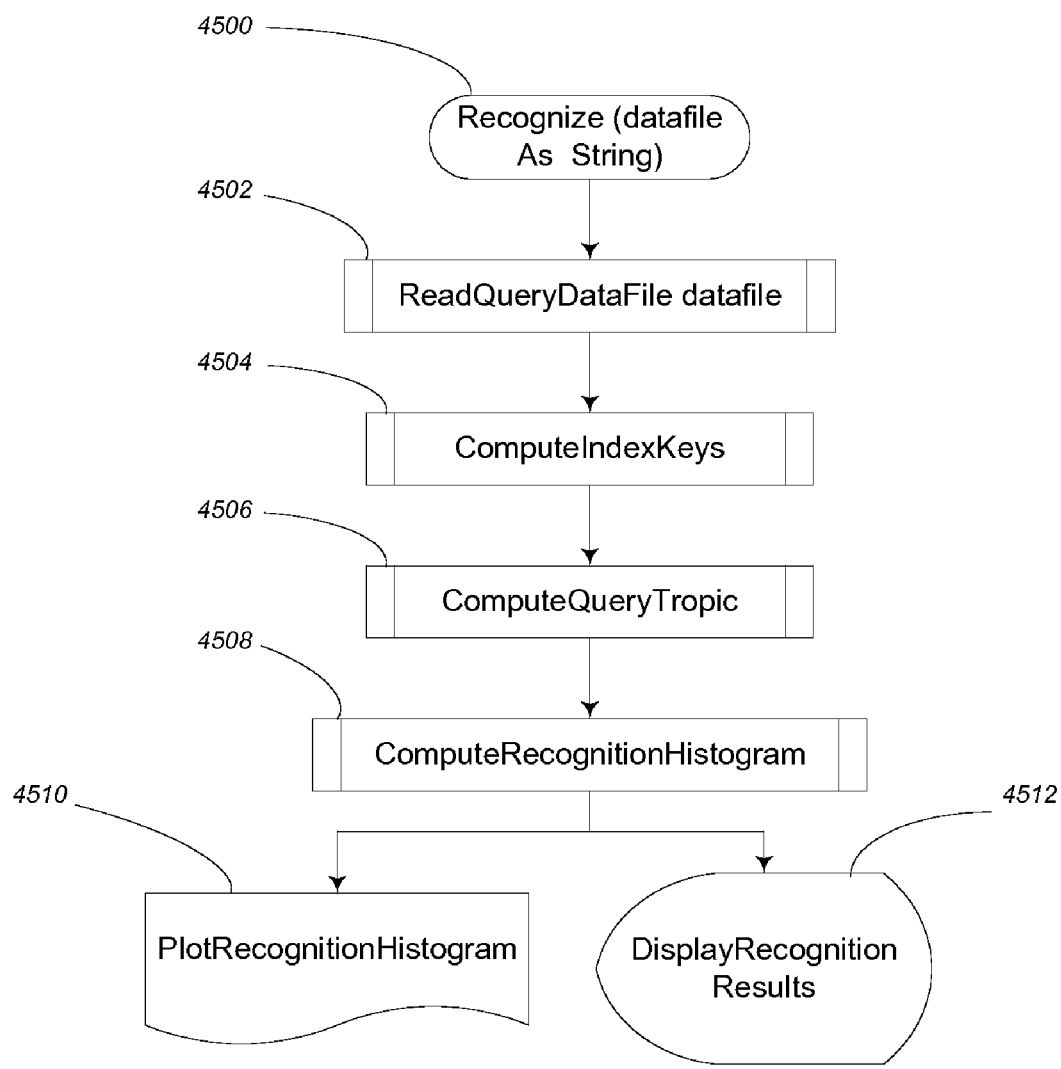
FIG. 45 is a flowchart of the Recognize subroutine.

When the AutoRun subroutine is in its main loop in Query Mode, the statistics of the Visual Keys of each frame are written to the datafile QueryStreamStatistics. When the Query Stream ends or is manually shut off, this file is accessed by the Recognize subroutine 4500 flowcharted in FIG. 45. The first step of the recognition process is to read the datafile statistics in the ReadQueryDataFile subroutine 4502. Next, the Index Keys of the Query Stream are computed from the Query Stream Statistics and the Decision Tree obtained in Learn Mode in the ComputeIndexKeys subroutine 4504 and flowcharted in FIG. 46. Next, the bins of the Reference Bins collected during Learn Mode are reordered according to the Query Stream Index Keys, which creates a Query Tropic. The Subroutine ComputeQueryTropic 4506 is flowcharted in FIG. 47. Next, the Query Tropic is projected onto its Reference Stream Frame Number dimension, resulting in a histogram which plots the frequency of occurrence of Frame Numbers in the Query Tropic. The subroutine ComputeRecognitionHistogram 4508 is flowcharted in FIG. 48. Next is the Plotting of the Recognition Histogram 4510. Finally, the subroutine DisplayRecognitionResults 4512, flowcharted in FIGS. 49a and 49b, analyses the Recognition Histogram for its peak value and the width of that peak to make a positive match or to refrain from matching.

Referring now to the subroutine ComputeIndexKeys 4600 which is flowcharted in FIG. 46, a first iteration 4602 on i over the frames of the datafile QueryStreamStatistics sets each Index Key for each frame to zero 4604. A next iteration on m 4606 considers the nine statistical measures sequentially over all frames in the datafile, which is a nested iteration over i for the length of the datafile 4608. At each iteration of m, all of the Index Keys for the datafile frames are recomputed. The recomputation consists of either adding $2^{(m-1)}$ to the index key or not. The decision is based on comparing the $m^{th}$ statistic of the $i^{th}$ frame to the Decision Tree value stored at Slices(m, IndexKeys[i]). If Stats(m,i) is greater than or equal to the Decision Tree Slicing value 4610, then the Index Key for the frame is incremented by $2^{(m-1)}$ 4612; otherwise, the value Index Key for the frame is unchanged.

Figure 47:
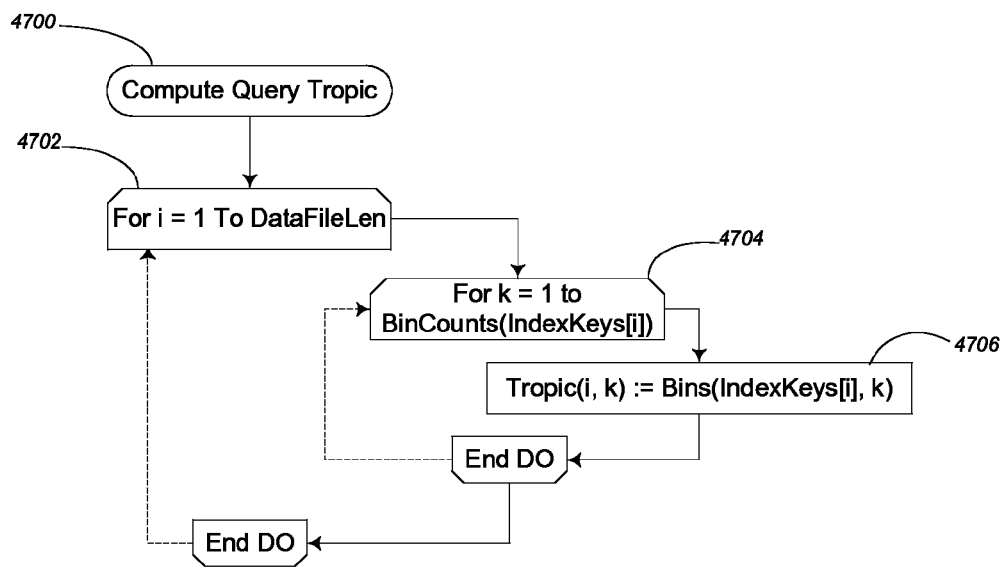
FIG. 47 is a flowchart of the computeQueryTropic subroutine.
Figure 48:
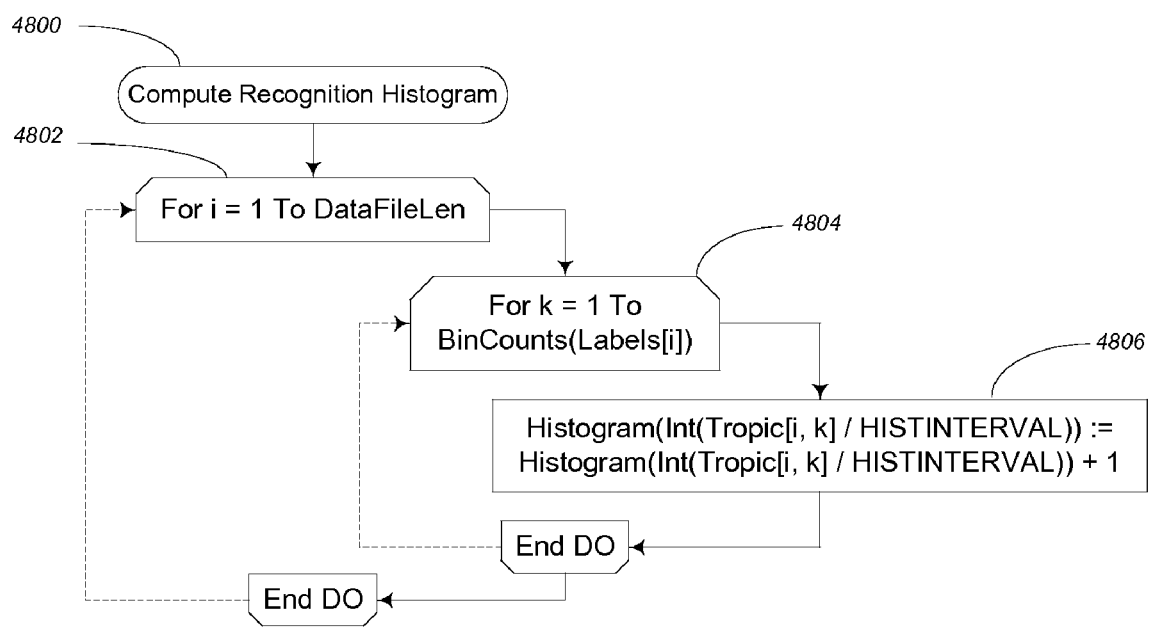
FIG. 48 is a flowchart of the computeRecognitionHistogram subroutine.

FIG. 47 flowcharts the ComputeQueryTropic subroutine 4700. After the Index Keys for all the QueryStreamStatistics datafile frames have been computed, the contents of the Reference Bins obtained in Learn Mode are selected and ordered by the sequence of Index Keys for the Query Stream. A first iteration on i 4702 considers each frame over the length of the Query Stream datafile. A second nested iteration over k 4704 runs through the contents of the bin indexed by $i^{th}$ Index Key. The two-dimensional array variable Tropic is indexed on i and k and collects the frame numbers stored in the designated bins 4706:

The subroutine ComputeRecognitionHistogram 4800 is flowcharted in FIG. 48. A first iteration on i over the length of the QueryStreamStatistics datafile considers each frame of the query sequentially 4802. A second nested iteration on k selects each frame number in the Reference Bin identified by the Index Key of frame i of the datafile 4804. These frame numbers have already been copied into the Query Tropic in the previously called subroutine ComputeQueryTropic, therefore a one-dimensional array variable histogram is incremented for each instance of a frame number in Tropic(i, k) which falls into the preselected histogram interval HISTINTERVAL 4806. In this example application program, HISTINTERVAL has been chosen to be 25.

Figure 49A:
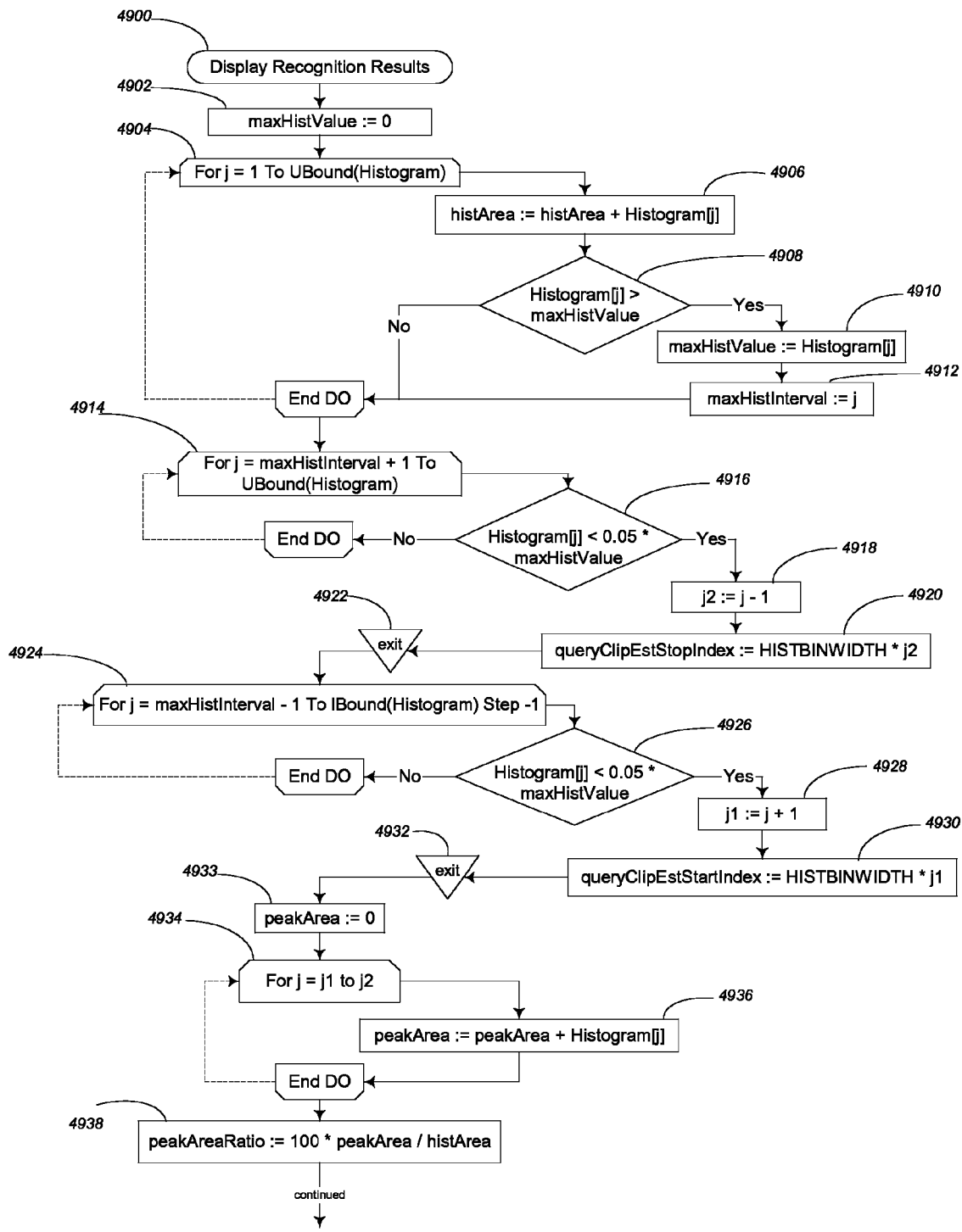
FIGS. 49A and 49B together form a flowchart of the process of displaying the Holotropic Stream Query Recognition Results.
Figure 49B:
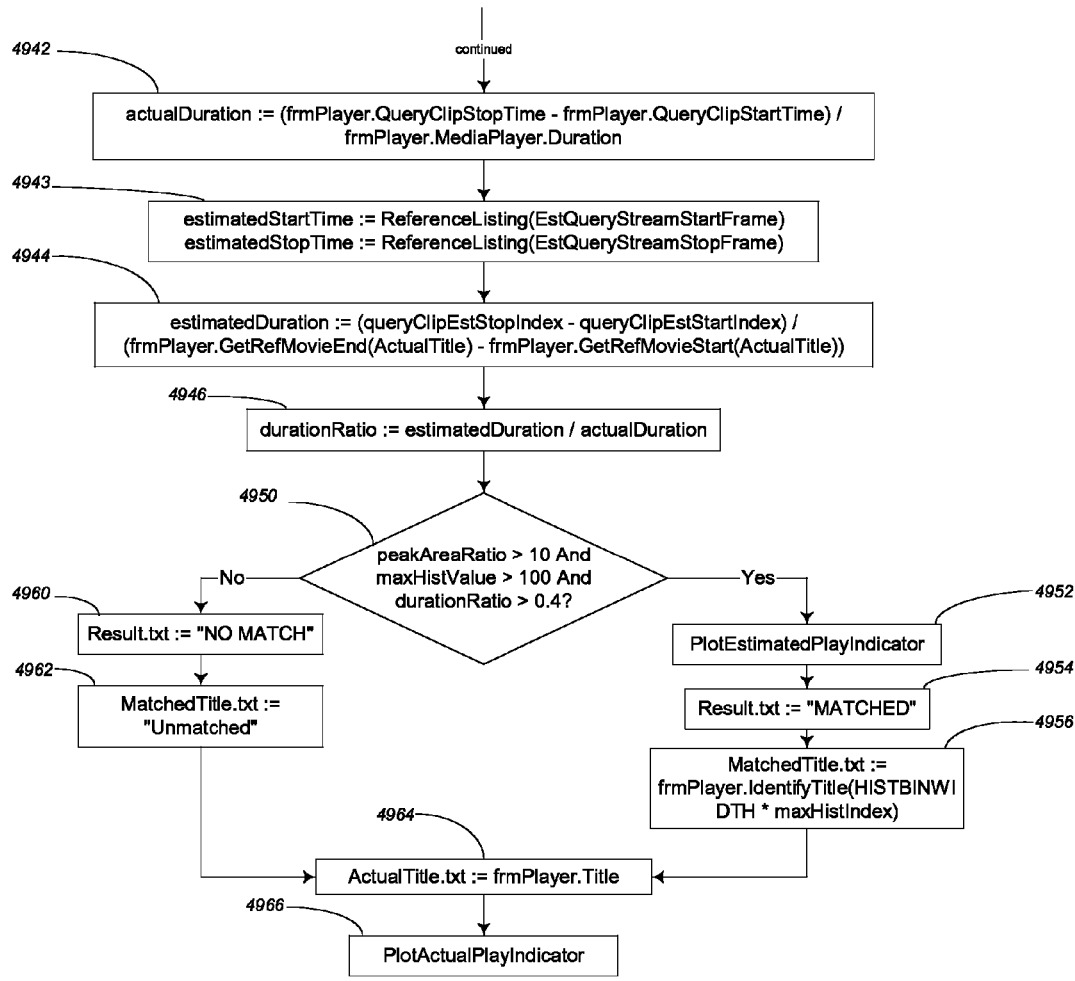

The last subroutine to be examined and flowcharted in FIGS. 49a and 49b is DisplayRecognitionResults 4900 (note: this subroutine is split into two figures solely for space considerations). The function of this subroutine is to first determine the maximum peak of the recognition histogram, then to determine the width of the peak and the area under the peak, then to compare the width of the peak against the length of the Query Stream as determined by the Media Player. The subroutine then tests to see that the area under the peak is greater than a selected percentage of the entire histogram area, that the peak height is greater than a preselected minimum, and that the estimated width of the peak is at least a selected percentage of the actual Query Stream play time. If all these conditions are met, then the subroutine identifies the Query Stream from the position of its peak. Of course, this is an example of how the Query Tropic could be analyzed for identifying the Query Stream. There are countless other ways that this analysis could be carried out, and one skilled in the art could no doubt supply an endless stream of alternative analytical techniques, all of which accomplish essentially the same result.

Referring to FIG. 49, after the variable maxHistValue is initialized to zero 4902, an iteration on j over all the intervals of the recognition histogram 4904 computes the histogram area 4906 and tests for the maximum value 4908 which is stored in maxHistValue 4910 with its interval being noted at maxHistInterval 4912.

The upper edge of this histogram peak, is determined by the next iteration on j which begins at the center of the peak and iterates towards the upper bound of the histogram 4914. When the histogram value falls below a selected fraction of the histogram peak value 4916, here chosen to be 0.05, the variable j2 marks the interval of the upper edge 4918, and an estimate of the Query Stream Stop Frame is calculated 4920 before the iteration is prematurely terminated 4922.

Likewise, the lower edge of this histogram peak is determined by the next iteration on j which begins at the center of the peak and iterates towards the lower bound of the histogram 4924. When the histogram value falls below a selected fraction of the histogram peak value 4926, here chosen to be 0.05, the variable j1 marks the interval of the lower edge 4928, and an estimate of the Query Stream Start Frame is calculated 4930 before the iteration is prematurely terminated 4932.

Following the initialization of the variable peakArea to zero 4933, the intervals of the histogram from j1 to j2 are iterated 4934 to determine the area under the peak 4936, which is used to calculate the peakAreaRatio 4938, i.e., the percentage of the peak area to the entire histogram area.

The actual duration of the Query Stream can be obtained directly from the Media Player as the difference between the start and stop times of the played stream 4942. The estimated start and stop frames from the histogram peak analysis are converted to actual start and stop Query Stream times by interpolating the catalog entries in the Reference Stream Listing file 4943, thus yielding an estimated Query Stream duration from the peak analysis 4944. The duration ratio is then just the ratio of the estimated to the actual duration 4946.

The test for determining whether the Query Stream is matched by some portion of the Reference Stream is to compare the peakAreaRatio, the maxHistValue and the durationRatio to acceptable minimums 4950, and if they are all greater than their acceptable minimums, then to plot the indicator for the estimated Query Stream play interval 4952 on the Query Stream Recognition Window, shown as 3325 on FIG. 33, To print the word "MATCHED" in this same window 4954, and to obtain the title for the matched Query Stream from the frame number of the peak maximum from the Reference Stream Listing datafile 4956. Otherwise, if all the acceptable minimums are not exceeded 4958, then the result "NO MATCH" is printed 4960 with the matched title "Unmatched" 4962.

Finally, for comparison and testing, the actual title of the Query Stream is displayed 4964, if known, along with the play interval 4966 of the actual played stream which is plotted as 3320 on the Recognition Window of FIG. 33.

Assigning Keywords to Images

Throughout the discussions of the present invention it has been repeatedly stated that the purpose of the invention was to enable the searching of media databases with query media. Here, the term media can mean still pictures, streaming pictures, or recorded sound. Although it was stated that the media query search could be augmented by natural language descriptors such as keywords or phrases, it has been repeatedly emphasized that the strength of the present invention is primarily its ability to perform a search without keywords or phrases, i.e., with pictures alone. But having asserted this premise, it may be useful to examine further the relationship between pictures and their keywords in order to clarify further possible applications of the methods presented herein.

Most media database searching is performed with Keywords. Thus, if a person desires a picture of Humphrey Bogart, he enters the words "Humphrey Bogart" into a media search engine and he is presented a set of links to media' which have previously been tagged with the keywords Humphrey Bogart. Now, this process of tagging or associating keywords with media such that they may be searched by conventional search engines is an area of considerable interest. Largely, the process of tagging is an intensely manual one, depending upon human perception to assign tags which correspond to the pictorial or aural content of the media. It is in response to this problem that a suggestion is put forward here that the methods of the present invention may be employed autonomously or with human assistance to greatly ease the burden of assigning keywords to media.

When a picture appears on the Internet, it does not usually appear in isolation of textual material. First of all, the picture, being a file, has a file name, which is its first textual asset. The picture is usually the target of a hyperlink, and that hyperlink is another textual asset when it is hyperlinked text, or, if the hyperlink is another image, then the filename of that image is a textual asset. The title of the page on which a picture resides is a textual asset, as is the URL of the page, metatags on the page (which may intentionally contain keywords), and all of the text on the same page as the picture. Text which appears in the immediate vicinity of a picture is potentially a more valuable textual asset than words on the page, words that appear in the same frame or table as the picture again being potentially more valuable. In short, a piece of media usually resides in an environment rich in textual material, and within this wealth of textual material may lie effective keywords for tagging the picture. The problem is which words derivable from the set of all textual assets are good keywords.

It is in answering the above question that the methods of picture searching previously described may be employed. Suppose we have an Internet image and all of its associated textual assets that we have automatically captured from its web page environment. Now we perform a Visual Key search of the Internet using the methods described herein by first making the picture in hand a reference picture and extracting and recording its Visual Key. Now we automatically crawl the internet using a software robot or spider looking for files of the usual types for images, i.e., jpeg's or gif's, and each one that we find we generate its Visual Key and match it to our reference image. Each time that we find a sufficient match to the reference image we collect all of the textual assets of the matched image. When a sufficient number of matches to the initial picture have been found, all of the textual assets for the matching pictures can automatically be statistically analyzed for the frequency of occurrence of individual words. Common non-descriptive words can be thrown out immediately, while at the same time the words contained in the image file names can be given a higher weighting in the process. Although it is not the intention of this disclosure to describe in detail how all of the textual materials found associated with matched pictures may be analyzed, it should be clear to anyone skilled in the art that words which make multiple appearances in textual assets which are a priori given high weightings make good candidates for keywords, while words that may often appear in lower weighted assets may also make good keywords.

Although the above process has been presented in terms of crawling the Internet in search of matches to a single picture, that process would be extremely inefficient. Rather, an entire large collection of pictures in a Visual Key Database could be searched simultaneously using the methods of the present invention. Each image which is located and downloaded from the internet would be matched against the entire database. When a match is found, the textual assets of the found match would be added to the textual assets of all the pictures that have been previously matched to that same picture. When a picture is downloaded that does not sufficiently match any of the pictures in the database, it may be added to the database with its associated textual assets, or, if the database is one of a fixed number of pictures, it may be discarded.

Clearly, the efficacy of this approach depends on a given picture being found a multiple of times on the Internet in association with different textual assets. This is probably a good assumption for those pictures which would most frequently be searched for by keywords on, media search engines. The more frequently a particular image is searched for, the more popular is that image, hence the more likely it is to appear multiple times in different textual environments.

Finally, although it has not been explicitly pointed out in previous discussions, the methods of Holotropic Stream Recognition might quite profitably be employed in the above process of automatically assigning keywords to individual Internet images. It should be appreciated that the Holotropic methods do work on streaming media precisely because the individual adjacent streamed images are very similar. Thus, when the individual images of a stream are, converted to Index Keys by the Decision Tree and stuffed into individual bins, each bin being indexed by a different Index Key, it is not surprising to find very similar images from the same portion of a stream in a given bin. This in fact is the basis of the mechanism which is employed to create the Tropic of a given Query Stream, thus leading to its immediate identification.

Now suppose that the individual images in a sequence of images do not correspond to the frames of a movie, but rather are the individual images collected during the crawling of the Internet for any image. We can still employ the Holotropic steps of constructing a Decision Tree and sorting the individual images into bins according to their Index Keys, and it should come as no surprise that the individual images in each bin would be quite similar. The longer the Index Key, the more bins there would be, the more similar the individual images in each bin would be. If, furthermore, we had collected the textual assets of all the images to be sorted by Holotropy in this manner, then all of the textual assets of the images in a given bin could be analyzed for multiply repeated words and these words could then be used as keyword tags for the individual images in a given bin.

By the methods of keyword preparation described above, a preliminary keyword searchable database of media could be prepared. This preliminary database could then be further refined by an iterative method which may employ a conventional search engine. If a set of keywords is extracted from the textual assets of similar or matched pictures in our preliminary database and if these same keywords derived for similar or matching pictures are then entered into a conventional text based search engine, then those web pages returned by the conventional search engine are more likely to contain images which match or are similar to the images in our preliminary database than pages which are randomly searched for images. When a picture match is observed on a web page listed by a conventional search engine, the process adds the textual assets of the matched picture to the previously accumulated textual assets in the preliminary database as well as the matching or similar picture.

At each step of the above described iterative method, the database being constructed of images and their associated keywords becomes more refined because of the addition of more textual assets describing similar or matched pictures. At each stage of refinement of the database and its automatically derived keywords, the step of finding additional pages to search for additional matches using a conventional search engine becomes more refined, and the probability of finding relevant pages with matching pictures and valuable textual assets increases. Thus the entire process of automatically deriving keywords for media can be thought of as a bootstrap process, that is, a process which is capable of perpetuating and refining itself through the iterative application of its basic functional operation to the current materials in the database.

Reticle Projection

This method employs pseudo-random sequences to sample frames of transformed media. These pseudo-random sequences operate on the transformed data in a manner analogous to the optical encoding of projected images through a coded reticle, hence we refer to these steps of the following technique as the reticle projection.

The reticle projection step of the process will be described in much greater detail in the next sections, along with the subsequent steps of thresholding, sampling, shuffling, and segmenting. These steps compose a process of "image combustion" where most of the information in an image is "burned" away and that information which remains is split into k individual channels of n bits each. Because these steps and possibly the initial transformation step are so destructive of original image content, those bits which remain, although appearing so much like noise, actually encode the most primitive image structures of the transformed image input. Hence these remaining bits are descriptive not only of the input image, but to all images that share these primitive features.

An important advantage of these techniques is that although we know that it finds similarity through the process of comparing common image features, we have no idea what those image features represent nor do we care. We only know that the system is comparing features by observing its behavior in identifying groups of similar images out of a database of images.

Digital Audio

Building upon the methods described herein and the reticle method discussed above, an application for the archiving and retrieval of digital audio objects, using only the content of those objects, has been developed. To date, most of the practical applications of this technology have been concerned with vocal and instrumental music; however, because the application is strictly content-based, it can successfully be applied to any digital audio data.

In order to build a database of digital audio objects, a specific, proprietary algorithm is to convert such audio objects into digital keys. An audio object is broken up into an overlapping temporal sequence of intervals. Each of those intervals is quite analogous to a sequence of digital video frames, and essentially the same Holotropic stream recognition process which has been described in that context is used to find the best match between query object and database object. However, the process of generating the decision tree from which Holotropic information flows is specific to the digital audio application.

As noted above, an audio object is broken up into an overlapping temporal sequence of intervals. Overlaps from 50 to 90 percent ultimately offer good performance. In general, less overlap results ion greater processing speed, while more overlap results in more accurate identification. To date, the audio stream has been broken up into intervals against an arbitrary time reference. We intend to try to determine the placement of the intervals based upon information contained in the music itself. If we are successful in this endeavor, enhanced performance should result.

Each interval of the overlapping temporal sequence is transformed by the fast Fourier transform (FFT) into a spectrum of resulting magnitude vs. frequency. A frequency cutoff of 5.5 kHz has been seems to work well, and has become something of a standard.

Because of the nature of music, the magnitude associated with one frequency may typically be very much larger than the magnitude associated with another frequency and, in subsequent signal Processing may have an undue influence upon the final result. Thus, a normalizing function is applied to the power spectrum so that the resulting normalized power spectrum will be fairly uniform over the frequency range of interest. The normalizing function has been obtained by averaging the power spectra obtained from a large body of music content. We obtained our standard normalizing function by averaging the power spectra of a bout 20 hours worth of music.

The normalized power spectrum FFT is sampled uniformly to produce a vector containing these values in a vector of length 1023. This transform, data vector is projected through a 1023-element reticle to generate the projection. The threshold projection is then calculated.

A fixed process is used to select 90 binary values out of the threshold projection. A selection process which selects the 90 values as the approximate intersection of 91 approximately-equal intervals has been shown to work well. These 90 values are then scrambled by a fixed pseudo-random algorithm. The result is the gene.

The gene is now divided into 10 codons of 9 bits each. The decision tree is built out of these codons, and the tools are in place to use Holotropic stream recognition for the matching of query objects and database objects.

Performance of the system described generically above has been exemplary. Using 2-second music intervals as query objects on a database derived from over 20 hours of music, the system has made matched query object and database object without error.

Digital Text

The incorporation of text stream recognition into the space of processed media inputs permits holotropic searches for textual content. For example the lines:

All the world's a kennel,
And all the dogs and cats merely pets.
They have their exits and their entrances,
And one owner in his time opens many doors,
His acts being twentyfour hours.

may or may not be familiar to the reader of this document, but they are readily recognizable as the Shakespearean lines All the world's a stage,
And all the men and women merely players:
They have their exits and (heir entrances;
And one man in his time plays many parts,
His acts being seven ages.

to those having a general familiarity with Shakespeare's plays.

When a conventional search engine is asked to search all of Shakespeare for the fictitious quote it of course responds that it cannot find a match. When the same quote is entered into a Shakespearean trained media content search employing the methods described in this document, it correctly states that there is no identical match but that the best existing match in all of Shakespeare is the actual Shakespearean quote above. And the system will continue to make this correct identification as the quote is further maligned with misspellings, deletions, insertions, or rearrangements.

Media Content Indexing System Description

Figure 50:
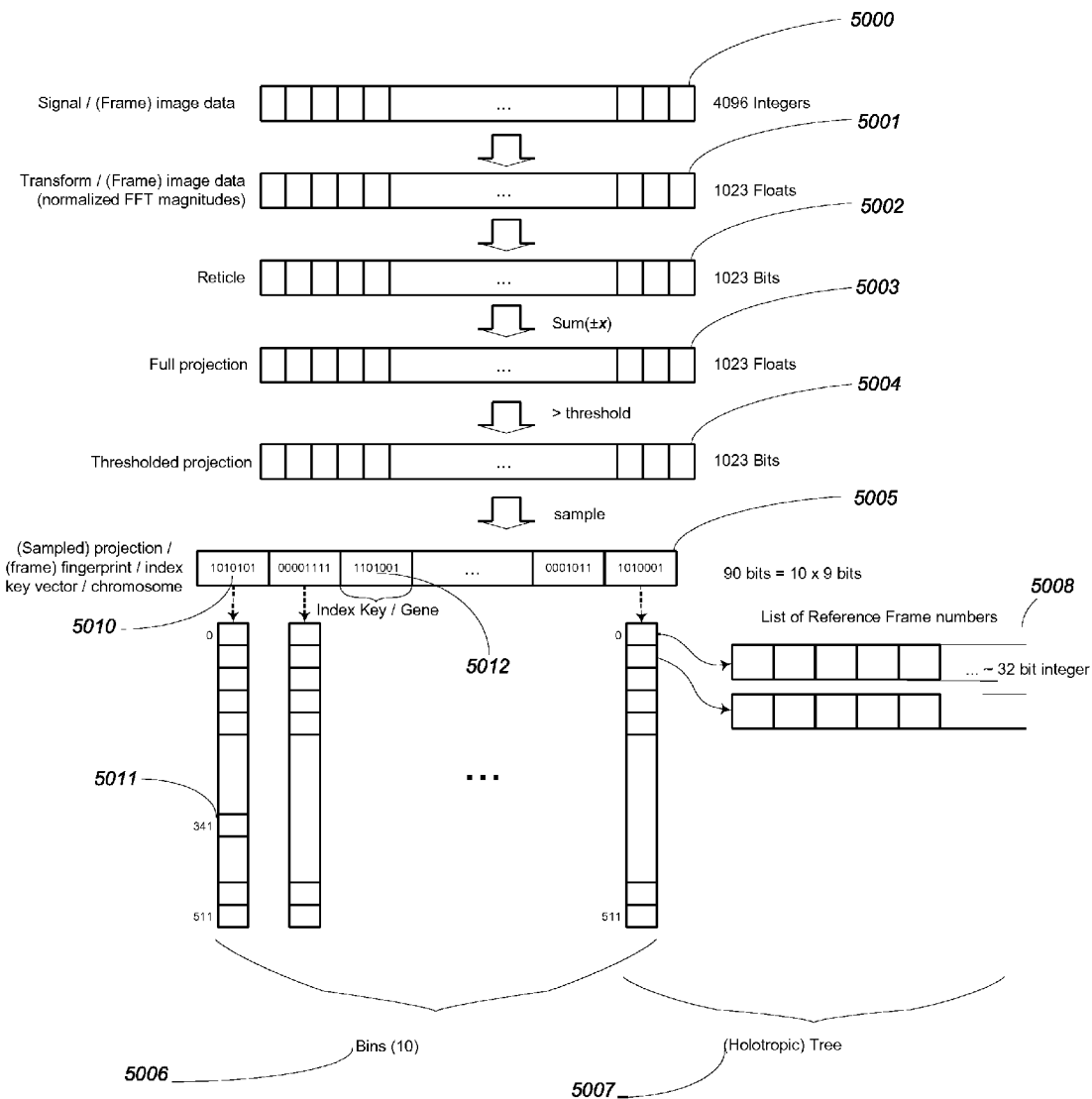
FIG. 50 depicts a media content indexing application according to the invention.

Reference is now made to FIG. 50 which depicts a media content indexing application according to the invention. Input signal 5000 may be a portion of an audio waveform, a digital image, a frame of digital video or a phrase of text, although the parameters illustrated in FIG. 50 represent nominal parameters for the processing of audio waveforms representing high fidelity music. In the case of audio, the input waveform is preferably segmented into frames, a typical frame being 200 milliseconds. Audio frames can overlap by 50 percent; therefore, audio frames can be acquired at the rate of 10 per second. In this example, a frame is digitized to 4096 integer values, sufficient to sample up to midrange audio frequencies.

In the next step 5001, the input data frame is transformed into an auxiliary digital construct. In the case of audio illustrated here, that auxiliary construct is the Normalized Power Spectrum of the Discrete Fourier Transform (DFT) which is well known and described in numerous references on signal processing. The DFT of the audio waveform has both real and imaginary parts, and represents both the amplitude and the phase of the frequency components of the waveform. The Power Spectrum is the magnitude of each frequency component, disregarding its phase, computed as the square root of the sum of the squares of the real and imaginary components of the DFT. In the case illustrated in FIG. 50, the transform data is represented by 1023 floating point numbers which correspond to 1023 frequencies in the power spectrum. Furthermore, the Power Spectrum values are normalized over the entire set of audio input frames entered into the Digital Key database. Normalization consists of adjusting the individual frequency components of the DFT magnitudes by scaling each frequency component by the inverse of the average DFT magnitude of the frequency component for all of the input frames of all the input samples.

In the case of a digital image input at 5000, the transform at 5001 may take four or more different forms. The first form is simply the isomorphic transform, meaning the transformed image pixel value is a function of the value of the corresponding pixel in the input image. Secondly, the transformed image may be a warp transform of the input image. The warp transform has been extensively discussed earlier in this application. Thirdly, the image transform may be a normalized two-dimensional DFT magnitude, directly analogous to the one-dimensional DFT discussed in the previous paragraph for audio input, and finally, the transformed image may be a histogram of the relative frequency of occurrence of identical m-by-n sub-images of the input image. The m-by-n sub-images are here referred to as neighborhood sub-images. For example, if the input image is binary and the neighborhood is 3-by-4, then there are 4096 possible configurations of neighborhood sub-images (2 raised to the 3×4 power). A binary digital image of 512 by 512 pixels would contain 510×509 or 259,590 discrete sub-images, each sub-image being one of the 4096 possible sub-images. Thus the transformed data at 5001 would represent the normalized frequency of occurrence of each of the 4096 possible 3×4 binary sub-images. Each frequency of occurrence may be normalized by scaling by the inverse of the expected value of each sub-image frequency computed over all sub-images of all input images to the Digital Key database. Other methods of scaling are discussed later.

An image input at 5000 represents' a single input frame, whereas if the input were a digitized video then it would be represented by a series of frames. Each frame of video is entered into the database in the same manner as a frame representing a still image.

The input at 5000 may also be a string of text or other alphanumeric symbols, represented by their ASCII values or any other recognized character-to-byte or character-to-binary word mapping. In a straightforward variation, the input can be a string of words, each word of the recognized set being converted to an integer representing its index in a word dictionary. The input strings can be of any length, but similar to the audio case, the input string is preferably subdivided into overlapping frames, each frame representing a given number of words or characters of the input string. However, it is also possible to have textual inputs of a single frame.

Transformation of input text into the auxiliary construct 5001 may be appreciated by its similarities to the neighborhood sub image transformation of still images. For example, an input frame of 512 characters may be considered to be a sequence of 511 overlapping 2-tuples, each 2-tuple being 2 successive characters. Likewise, the input frame of 512 characters may be viewed as 512−n+1 successively overlapping n-tuples, each n-tuple being a succession of n characters. This example corresponds to an n-by-n neighborhood sub-image in the case of still images. For an alphabet of m possible characters, there are $m^n$ power different n-tuples. For example, if we restrict ourselves to a lower case alphabet of 26 characters plus a space character, then there are $27^n$ possible n-tuples. Once again, the transformed text data may be in the form of a histogram of the normalized frequency of occurrence of each possible n-tuple, where normalization is accomplished by scaling each histogram component by the inverse of the relative frequency of each n-tuple in the entire data set of input frames represented in the database. Alternatively, each n-tuple frequency may be scaled by the negative logarithm to the base 2 of the inverse frequency of occurrence, which weights each histogram component by a factor representing the information content of the n-tuple within the collection of all n-tuples in the database. Finally, the histogram of n-tuple frequencies at 5001 may represent multiple values of n, for example, 2-tuples, 3-tuples, 4-tuple and 5-tuples. In this case; the histogram may be multi-dimensional or the individual histograms for each n-tuple may be combined and added together into a single histogram by normalizing their lengths.

The next two steps of the input processing of digitized media signals perform an additional transformation upon the already transformed auxiliary construct of 5001. This transformation involves the projection of the vector representing individual auxiliary construct values through a weighting vector 5002 and onto a collecting screen 5003, where each element of the full projection on the screen 5003 is then composed of a unique weighting of all of the elements of the auxiliary construct 5001 vector of digital values. We have referred here to the vector of weighting elements 5002 as a reticle, owing to its similarity to the optical element of the same name employed in optical processing.

Figure 51:
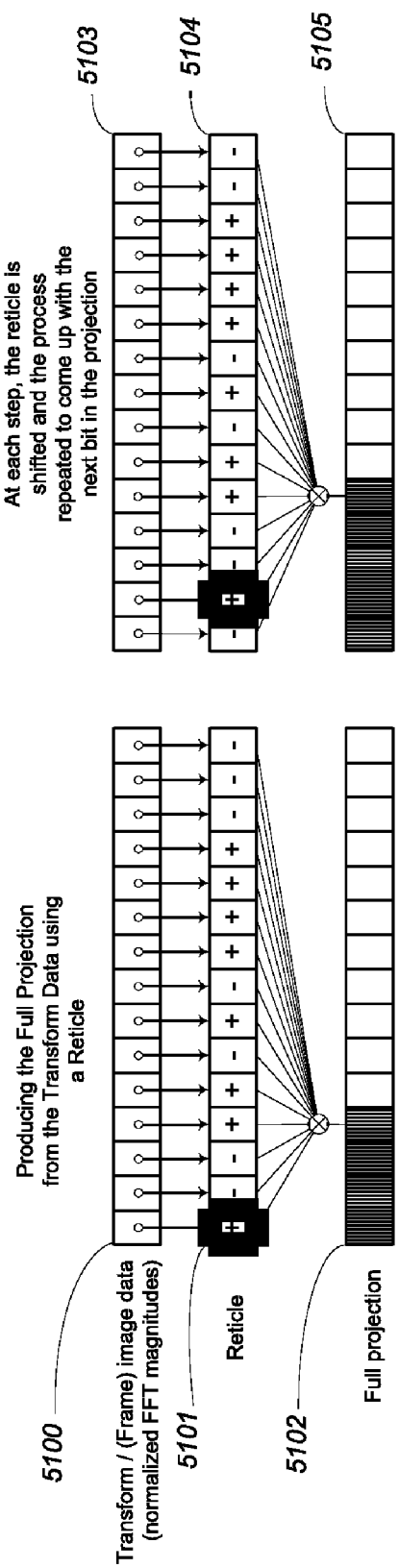
FIG. 51 concerns the reticle projection process, and shows two stages of the process used in computing the full projection in constructing the reticle.

The reticle projection process may be further appreciated by reference to FIG. 51. Two stages of the process of computing the full projection are illustrated in FIG. 51. At the first illustrated stage (left), the 4'th element of the full projection is calculated, while at the next stage (right), the 5'th element is calculated. At the first illustrated stage of the calculation, all of the elements of the transformed data of the auxiliary construct 5100 are individually weighed by the elements of the reticle 5101, here illustrated by the elements "+" and "−" representing weightings by +1 and −1 respectively. The value of the 4'th element of the full projection 5102 is then computed as the linear sum of the individually reticle weighted transformed input data. At the next illustrated stage of the computation (right), the 5'th element of the full projection 5105 is computed as the individually reticle weighted elements of the transformed data 5103 where the reticle elements 5104 are rotationally shifted by one element.

Referring back to FIG. 50 and making reference to the illustrative values contained therein, a vector of 1023 floating point numbers representing 1023 discrete values of the transformed input frame 5001 is weighted by 1023 binary values, these being +1 and −1, represented by a vector of 1023 bits called a reticle 5002, there being 1023 possible such weightings each possible weighting being effected by a particular cyclic rotation of the bits of the reticle, and the linear sum of each of these 1023 individual reticle weighting being recorded at the elements of the full projection 5003, the I'th element of, the full projection being computed as the rotation of the reticle by I places.

An explanation is probably in order concerning the rationale for the reticle projection steps of the input process. Clearly, the reticle projection process is a mapping of every element of the transformed input data onto every element of the full projection. This step is necessary even though the transformed input data already represents a process of weighted integration over the input frame. For example, in the audio case illustrated in FIG. 50, the DFT transform computes its resulting audio frequency spectrum on an element-by-element basis by the equivalent of weighting the input frame elements by sine waves of incrementally increasing frequency. Thus, the energy of each element of the input audio waveform may be spread across the spectrum depending upon the shape of the entire waveform. It necessary to perform this weighting and integration step for several reasons. The first is that once the input frame is transformed into its auxiliary construct, the remaining steps of the process are the same regardless of whether the input is an audio waveform, a still image, an image sequence, a character sequence or a word sequence. Since the auxiliary construct is different for each of these media, and since each media may have multiple auxiliary constructs, the step of reticle projection provides a homogenizing of the individual characteristics of a particular transformation of a particular media. In other words, although the characteristics of a particular auxiliary construct of a particular media might be recognizable, once the reticle has stage has performed its function; no such recognizable characteristics should exist.

Another way of phrasing this conclusion has to do with visualizing the process described here as a construction of a decision tree as described earlier in this document. The method of reticle projection is designed to yield balanced decision, trees which ultimately result in superior signal-to-noise values for frame or sequence recognition. Each terminal branch of the decision tree has approximately the same number of leaves. The method of Holotropy previously described herein is optimized for this condition, where the reference scatter diagram as illustrated in FIG. 35 appears to be a random dot scatter.

This extinguishing of any remaining pattern in the auxiliary construct dictates the selection of the weighting values of the reticle. The individual weightings by the reticle should appear to be as random as possible, given the constraint that the reticle projection is not a random process by virtue of the fact that the pattern of +'s and −'s is the same for every input frame of every media sequence for any media. Rather, the reticle pattern is a pseudo-random sequence. One such class of pseudo-random sequences are the so-called maximal length shift register sequences. Although the methods described herein may make use of other pseudo-random sequences, the discussion from here on will focus on maximal length shift register sequences, so named for the manner in which they are generated. For a further discussion of maximal length shift register sequences, see http://support.xilinx.com/xapp/xapp210.pdf.

The full projection is represented in the illustrated audio case of FIG. 50 by 1023 floating point numbers. Each of these 1023 numbers is a pseudo-random combination of +1 and −1 weighted elements. Ideally, the expected value of a full projection element is 0, the number of +'s and −'s eventually balancing. Thus the step of thresholding each element of the full projection 5004 is one of preserving a full bit of information for each bit of the 1023 bit thresholded projection 5004.

It is interesting to note that the computationally intensive process of computing the full projection may be implemented optically. In the optical implementation of the full projection step, all elements of the full projection vector are calculated in parallel in a single step. That compares very favorably to the nested iterations of the full projection as computed digitally (see FIG. 54) This may be an important computational alternative when the input to the system are high resolution images, i.e., on the order of 5000-by-5000 pixels, as might be required in a secure document identification system. Currently, for the cases studied in this disclosure, input images have to be closer to 100-by-100 in order to sustain near real-time functionality on contemporary desk top computers.

Figure 60:
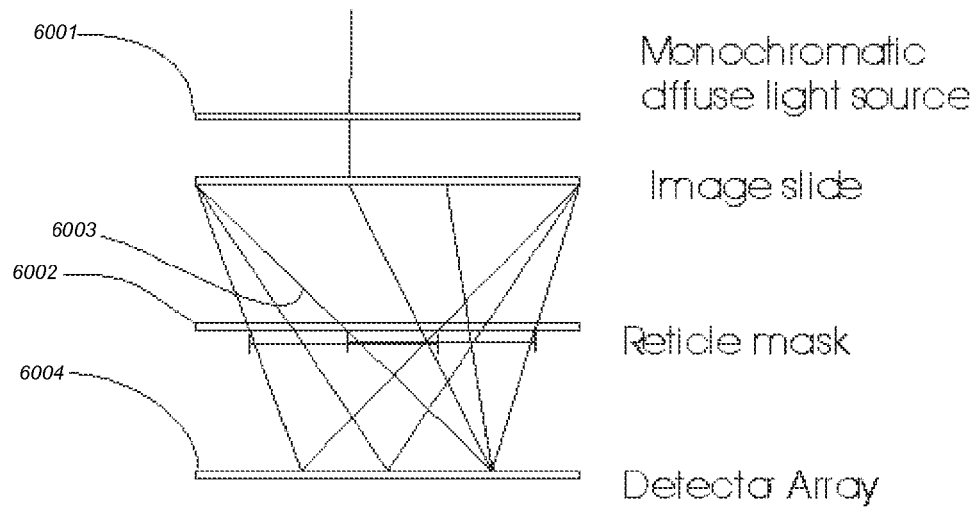
FIG. 60 illustrates the optical reticle projection concept in a single dimension.

FIG. 60 illustrates the optical reticle projection concept in a single dimension. The image 6001 of FIG. 60 is formed as a slide and illuminated with monochromatic diffuse light 6000. Here, the image referred to is the transformed image of the auxiliary construct previously discussed. The reticle mask 6002 is a complex spatial filter whose individual elements weight the transmitted light rays 6003 from the display by +1 or −1, the −1 weighting being accomplished by 180 degree phase shifting of the ray 6003. The detector for this one-dimensional case is ideally a linear array 6004. Rays combining on a given element of the detector array necessarily pass through different portions of the reticle, rays from adjacent pixels of the image source passing through adjacent pixels of the reticle. Note the size of the image, reticle and detector are the same, but the resolution is twice that of the image or detector.

Figure 61:
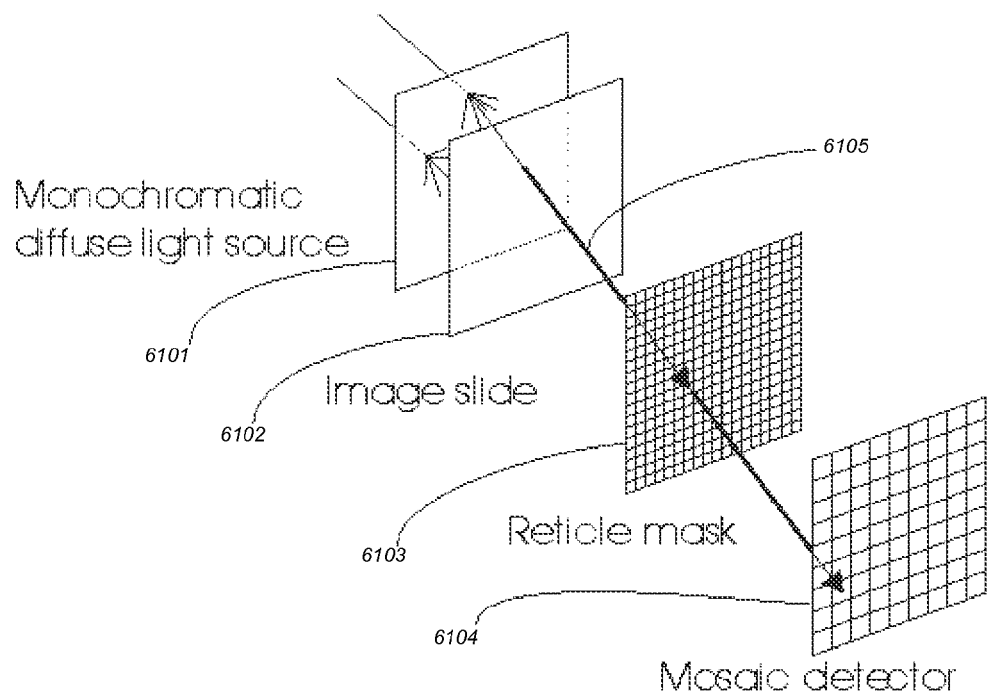
FIG. 61 illustrates this basic configuration for two-dimensional images and reticles.
Figures 62A, 62B, 62C:
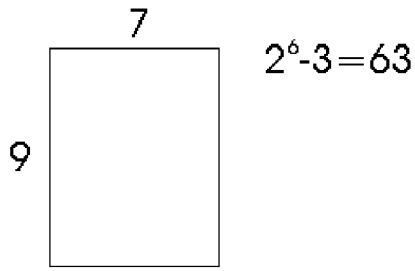

FIG. 61 illustrates this basic configuration for two-dimensional images and reticles. A monochromatic diffuse light source 6101 illuminates an image slide 6102, the transmitted rays 6105 being passed by the reticle 6103 either uneffected or phase shifted 180 degrees so that unshifted and phase shifted rays destructively combine at the detector array 6104.

FIGS. 62A-62E illustrates the specific example of a 7-by-9 reticle implemented as an optical reticle mask. The numbers in FIGS. 62B-62E represent individual pixels of the reticle, and weight transmitted light rays by +1 or −1. Here we see that shifts of the reticle position by plus or minus one pixel horizontally effect single pixel cyclical rotations of the entire reticle code, through the 7-by-9 reticle block as illustrated by 6201, 6202 and 6203 repectively. Vertical single pixel shifts 6204 effect 7 pixel cyclical shifts within the 7-by-9 block as illustrated in 6204.

Leaving optical computation of the reticle projection, the next step of the audio process illustrated in FIG. 50 results in a significantly reduced bitstring representation of the input frame. Here, the sampled projection 5005 is but 90 bits long, although it might be as short as 8 bits as was the case of video holotropy discussed earlier, or as long as the full projection, which offers significant recognition advantages when the number of input frames is severely limited. In keeping with our notion of destroying patterns in the stored representation of the frames, the 90 bits are pseudo-randomly sampled and shuffled from the 1023 bits available in the thresholded full projection 5004.

The sampled and shuffled bits 5004 are partitioned into segments of equal length, which may be anywhere from about 8 bits to perhaps 32 bits or more, depending upon the anticipated maximum size of the database being accumulated, where the size of the database is measured as the total number of input frames of media data indexed in the database.

It is not unreasonable to think of these sampled and shuffled bits 5005 as a gene, since they represent the genotype, i.e., the input frame, in the database. Extending this analogy to the fixed length segments of the gene, these must be analogous to the codons of fixed length sequences of amino acids. However, in this case it is the frame that described the gene, and not the other way around. This is another way of saying that the frame cannot be reconstructed from the gene, which contradicts the genetic analogy.

Other names for the gene and codon have previously been used in this disclosure. The codons are recognizable as the index keys of video holotropy previously described. The gene corresponds to the previously discussed index key vector. Other useful analogies are fingerprints. They represent a recognizable trace of the entire individual the pattern of ridges of moisture left behind a touch. Another analogy is digital ash, the end product of the complete annihilation of pattern and structure.

The remainder of the input process is essentially the same as the holotropic processing previously discussed in the processing of video data. Each of the 10 codons, or index keys in the gene, here illustrated by a 9-bit bitstring, represents the input frame in the database. The input frame is identified by its position in the input sequence of frames entering the database. In the audio example of FIG. 50, a 32-bit binary word counts the input frames. Each of the 10 codons or index keys generated, being a 9-bit bitstrings, indexes 512 possible lists for accumulating frame numbers. Thus, if the input frame was number 32456, then the first codon 5010 in the audio example, specifically 101010101 in the audio example, adds the number 32456 to its list index 341, illustrated at 5011 in FIG. 50, the second codon 5012 of FIG. 50, namely 000011111 in the audio example, adds the number 32456 to its list index 63, and so forth, the frame number 32456 being added once to each of the 10 bins 5006, each addition of a frame number to a bin being designated to the list whose index is specified by the codon bitstring.

This completes the overview of the process of entering media data into the database and creating an index of media contents. To summarize this process, sequentially presented input frames of media are numbered and transformed, first into an auxiliary construct, then into a full reticle projection, then into a gene sequence of codons by thresholding, sampling, shuffling and partitioning. Associated with each codon in the gene is a bin, much like a filing cabinet. Each bin has a number of drawers, equal to the number of possible codon values. When frame number N is entered into the system, each codon places a card with the number N at the back of the drawer determined by its value. Quite naturally then, the frame numbers in each drawer are arranged in ascending order.

Now we will review from holotropy the process of identifying an unknown query frame, using this analogy of filing cabinets and drawers. Query identification makes use of another auxiliary construct, in particular, a histogram, which, for our purposes here, can be analoged as a row of boxes, each box able to accommodate a pile of frame cards drawn from the filing cabinet drawers. The histogram boxes are labeled from 1 to M, where M is the total number of frames entered into the system.

As a first example, suppose the media input to our system are all digitized still images, there being one million such images entered. Since a still image is a single frame and we can't rely on the presence of additional sequential frames for enhancing identification, we would probably want a long gene of codons, so imagine we have a gene of a hundred 9-bit codons. Then we imagine a hundred filing cabinets, each filing cabinet having 512 drawers, and each drawer containing approximately 1953 cards. The average number Of cards per drawer is arrived at by the fact that the total number of cards in each filing cabinets is one million, while the number of drawers per filing cabinet is 512.

Now we present a query digitized still image to this system. The query image generates a gene in precisely the same way as all of the previously entered images. This query gene is similarly partitioned into a hundred codons having 512 possible values each. Suppose that the value of the first codon is 411. Then we go to drawer number 411 in the first filing cabinet and remove all of the approximately two thousand cards in the drawer. Then we sort the cards into the million labeled histogram boxes, placing the card marked N into the box labeled N. Next, we remove the contents of drawer number K where K is the value of the second codon of the query gene, and likewise we sort this drawer of cards into the boxes. We proceed with each codon until we have emptied and sorted through 100 drawers.

As a final step of the identification process we count the number of cards in each histogram box. Suppose that histogram box J has the maximum number of cards. Then we identify the query as being most like image J of the million input images.

If the query image is identical to the image J previously learned, then the total number of cards in the box with the maximum number of cards will be 100, since the query gene will match codon for codon the gene for the J'th inputted image. But if the query image is not an exact match of any of the query images, but is still more similar to image J than any other learned image, then the number of cards in the J'th box will be a maximum but generally will be less than 100, there being fewer cards the more dissimilar the query image is from the learned image J. For if we would examine the query gene for the similar but not identical to image J query image, we would find that some number of bits in the gene have been mutated, that is, their binary states have beep complemented owing to the dissimilarities of the query image and learned image J. Each of the 100 codons may contain a mutated bit, in which case it will select a different drawer from its filing cabinet than it did with the codon generated from learned image J. This "wrong" drawer will similarly contain about two thousand cards, but they will arrange themselves totally randomly amongst the million boxes. Now if mutations occur in half the query gene's codons, then the maximum box will have 50 cards, while the average number of cards in all the other boxes will be approximately 0.1, i.e., 50 drawers of approximately 1953 cards each equals approximately 100,000 cards randomly distributed over one million boxes. Similarly, if only ten codons of the query gene are unmutated, then the histogram maximum will be 10 while the average of all of the other random numbers of cards in histogram boxes will be 0.18.

Finally, we look at the process of query identification when the input media is a sequential type such as a video stream, an audio stream, or a text string. Again we'll assume that we have inputted one million frames of sequential media, which, if the media were audio, might represent about 333 five minute songs, about 16 hours worth. Although we might be satisfied with only knowing which song a five second audio snippet comes from, we might also desire to know not only the identity of the song, but where in the song the snippet comes from. Since the length of the snippet is known, the position and identity of the snippet is determined by which frame of the one million learned frames the snippet starts on. This, of course, assumes we have cataloged the beginning and ending frame numbers for all the songs we have entered.

Because a five second audio snippet typically consists of 50 frames, there is probably no need of a gene from a single frame having 100 codons. From our audio, example of FIG. 50, assume that the gene is 90 bits long, arranged as 10 codons of 9 bits each. Now we will proceed to show how the audio query snippet is processed using our filing cabinet and histogram boxes analogy.

As in our previous example, each drawer of our filing cabinets averages 1953 cards or approximately two thousand. The first frame of the 50 frame audio query snippet generates its gene of ten 9-bit codons. The contents of the ten codon specified drawers are then sorted amongst the million labeled histogram boxes. The next frame of the query sequence is now presented and generates its gene. But before we sort the contents of the specified codon specified drawers, we shift the labels of the histogram boxes one box in the direction of increasing box labels. Thus box 2 is now box 1, box 501 is now box 500, and so forth, adding an additional box to the end of the histogram row of boxes. Now we sort the cards in the drawers specified by the codons generated from the second frame of sequential input. This process of gene generation, histogram box label shifting, and card sorting is repeated until all of the query sequential frames have been entered. Once again, the desired answer is the label of the box with the largest number of cards.

This completes the introductory description of the operation of the media content indexing system. We now proceed with detailed flow charts and discussions of the principal steps of the system's operation.

Flowchart Descriptions

We now present details of the principle steps of the operation of the media content indexing system. These steps are described in depth by detailed flowcharts and discussion of the major elements of these flowcharts. We begin by discussing the construction of the reticle used in the reticle projection step of processing. The reticle we have chosen to implement is based on the well known family of pseudo-random sequences called "maximal length shift register sequences". We describe in detail now the method of generating maximal length shift register sequences for purposes of completion of the discussions herein. We make no claims of originality for the materials discussed in the next section, Setup of the Reticle.

Setup of the Reticle

Figure 52:
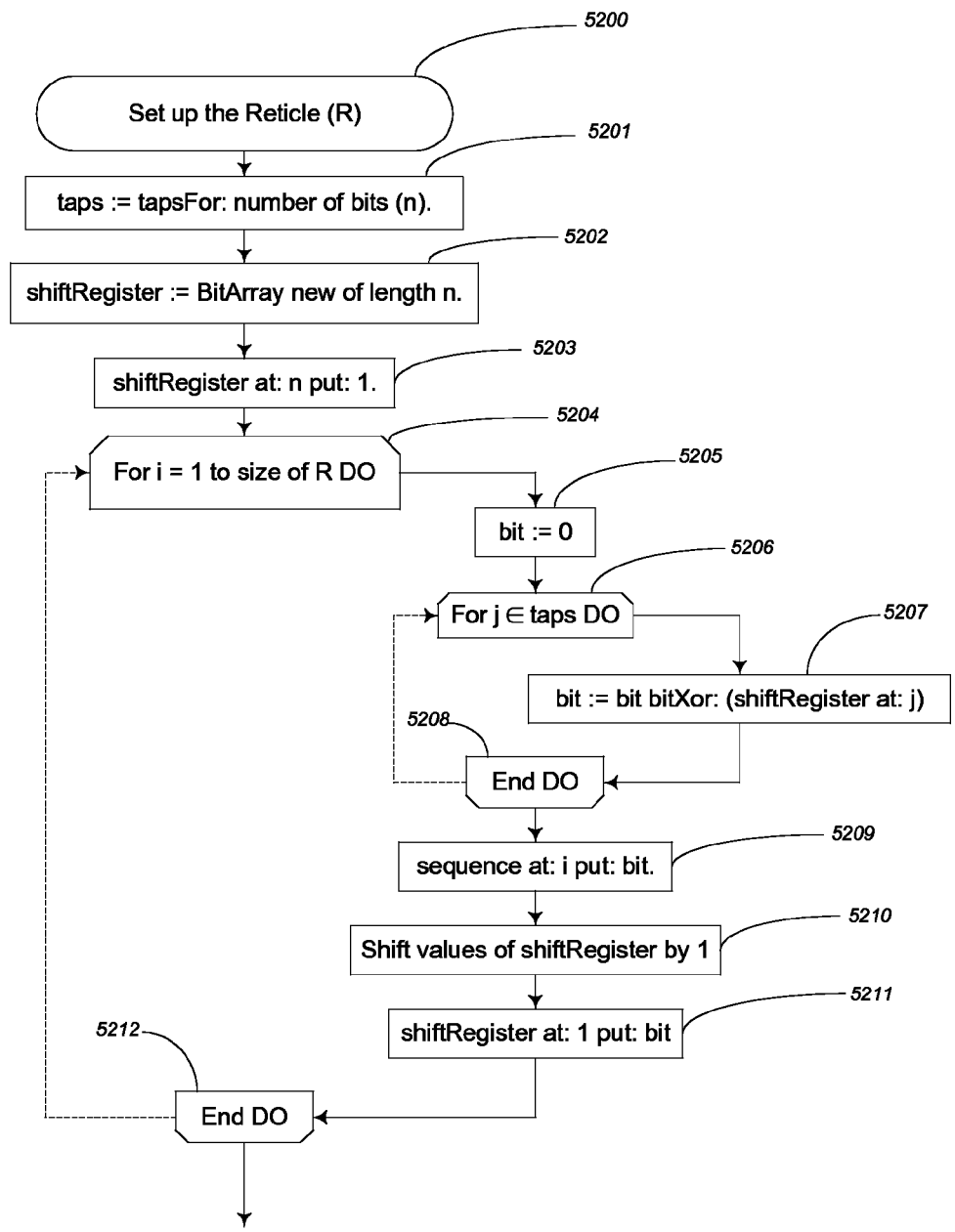
FIG. 52 describes the construction of reticle.

The construction of the reticle is described in FIG. 52: Setup the Reticle 5200. The reticle is setup using predefined default values. Different values may be used to achieve different performance results, but they must be consistent between those used in producing the reference data and is used to process queries. In these examples, the input vector, the reticle and the gene all have the same length. This need not be the case, as the example of audio processing in FIG. 50 illustrates.

Figure 59:
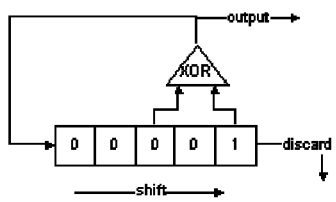
FIG. 59 shows the basic action of a shift register.

The reticle is built using a shift register. The basic action of a shift register is illustrated in FIG. 59: Shift Register. The shift register has a number of taps 5201, determined by the length of the reticle according to the table below. With a reticle of length 4095 ($2^{12}-1$), where n is 12, we'll use 4 taps. Note that the last position is always included as one of the taps.

| n | TAPS |
|---|---|
| 3 | 3, 2 |
| 4 | 4, 3 |
| 5 | 5, 3 |
| 6 | 6, 5 |
| 7 | 7, 6 |
| 8 | 8, 6, 5, 4 |
| 9 | 9, 5 |
| 10 | 10, 7 |
| 11 | 11, 9 |
| 12 | 12, 6, 4, 1 |
| 13 | 13, 4, 3, 1 |
| 14 | 14, 5, 3, 1 |
| 15 | 15, 14 |

Table of Reticle Taps

The shift register is initialized to a BitArray of length n (12) containing zeros 5202; a 1 is placed in position n 5203. Then a DO loop is established to produce the bits of the reticle, looping for i to the length of the reticle 5204. The variable bit is established and initialized to zero 5205. Then a DO loop is established to go through each of the tap positions 5206. An XOR function sets the bit by comparing bit with each of the tap positions in turn 5207. At every step, if the value of bit and the tap are the same, it sets bit to 0; if they are not the same, it sets bit to 1.

Then reticle sequence at position i is set to the value of bit 5209. The shift register is shifted by one 5210, and the first element is replaced by the value of bit 5211. When this has been done for every position of the reticle, the DO loop is ended and the reticle is complete 5212, As previously emphasized, the reticle setup remains fixed for the life of the media content indexing system. Changing the reticle construction after media data has been collected and indexed will destroy the system's functionality.

Computing the Transform of the Input Data (the Auxiliary Construct)

Many of the details of computing the transform of the Input Data (the Auxiliary Construct) has been presented earlier or is well known in the literature. For example, the warp grid transform for still image data has been dealt with in this document in abundant detail. Other transforms that the system may employ are well known and require no additional discussion. As an example, the Discrete Fourier Transform (DFT) also referred to here as the. Fast Fourier Transform (FFT) is well know by anyone skilled in the art and requires no further explanation. Other transforms, notably the Neighborhood Frequency-of-Occurrence Transform for Still Images and the N-Tuple Frequency-of-Occurrence Transform for Text Sequences have been dealt with in sufficient depth in the previous discussion of system operation that no further details are needed at this time to enable anyone skilled in the art to implement them.

Compute Gene

Figure 53:
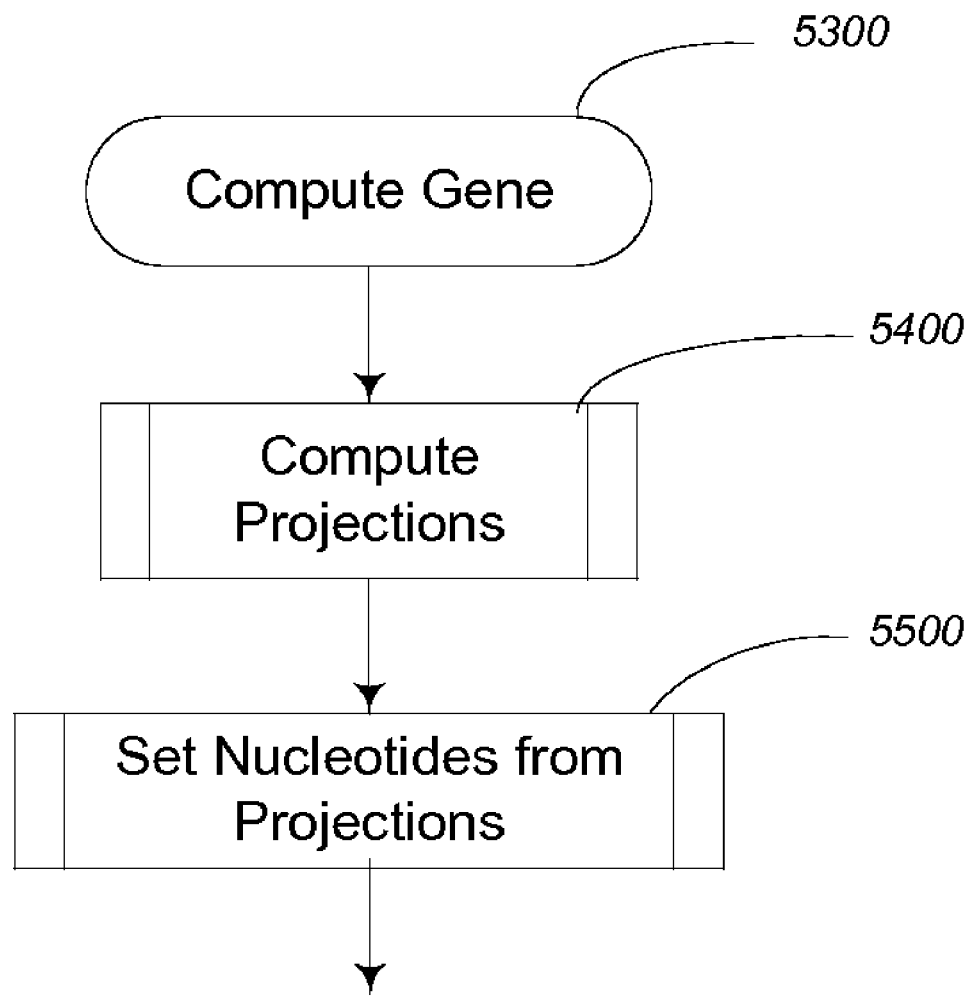
FIG. 53 shows the process of a compute gene.

As illustrated in FIG. 53: Compute Gene, to compute the gene 5300, we simply compute the projections from the transformed input data 5400, then use the projections to set the nucleotides (bits) of each of the gene's codons 5500. Each of these operations is described separately.

Compute Projections

Figure 54:
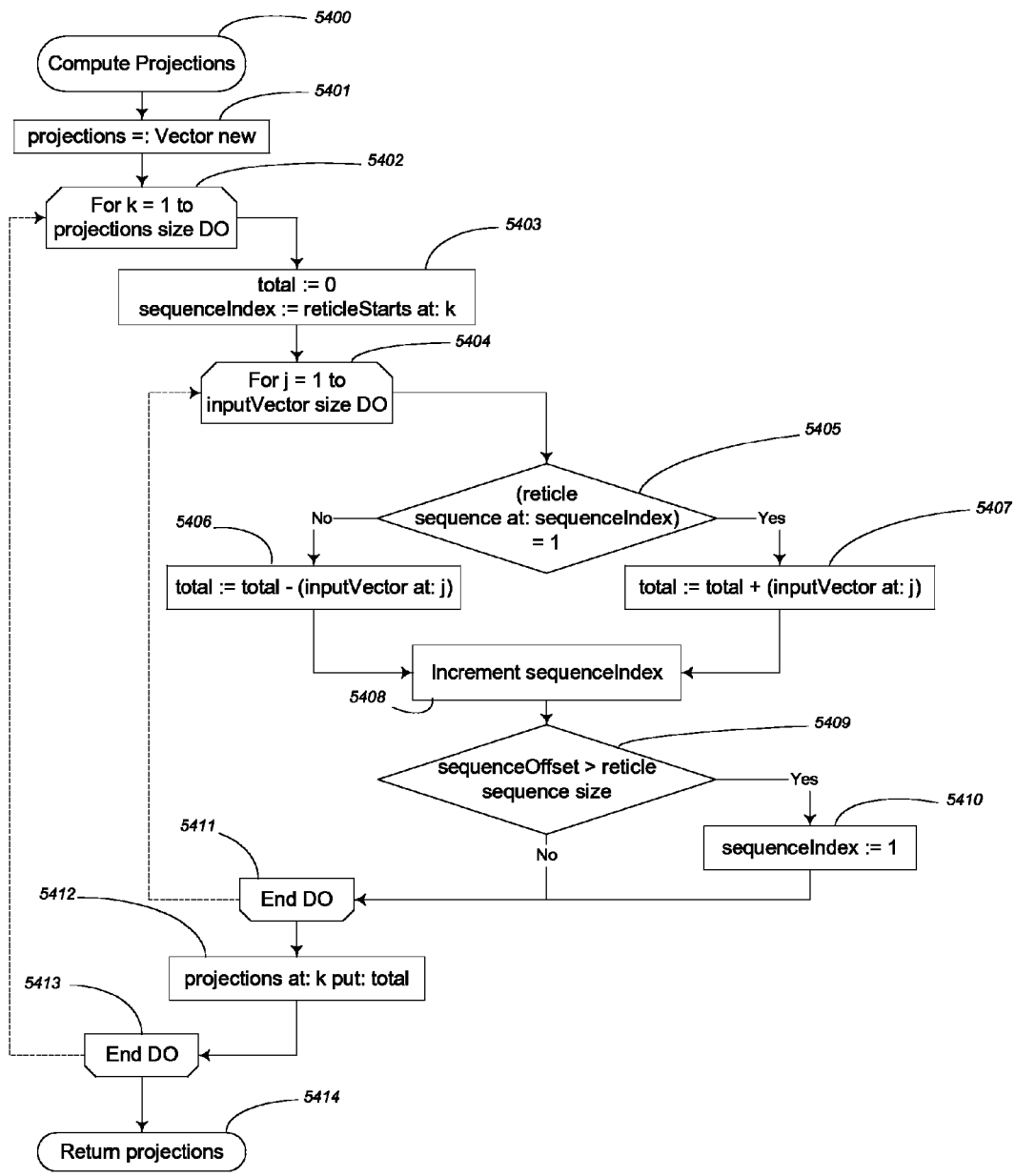
FIG. 54 illustrates the compute projection.

In FIG. 54 the projections are computed. At 5400, we start with a new vector (projections), which will be filled in by processing the transformed input data through the reticle 5401. A DO loop is established to set the values of all elements of projections, looping for k=1 to the size of projections 5402. Variable total is initialized to 0, and sequenceIndex is initialized to the corresponding $k^{th}$ position of the reticle 5403.

Then a DO loop is established to go through all of the elements of the transform data vector (inputVector), looping for j=1 to the size of inputVector 5404. At each step, if the reticle at the sequenceIndex 1 5405, total is incremented by the value of inputVector at j 5407. Otherwise, total is decremented by the value of inputVector at j 5406. In other words, the value is either added to or subtracted from total; then the sequenceIndex is incremented 5408. Next the sequenceOffset is checked to see if we've come to the end of the reticle 5409; if so, sequenceIndex is re-set to 1 5410. When all elements of the inputVector have been processed, this DO loop is ended 5411.

Then the $k^{th}$ element of projections is set to total 5412. When all elements of projections have been set, the DO loop is ended 5413, and the projections vector is returned 5414.

Set Nucleotides from Projections

Figure 55:
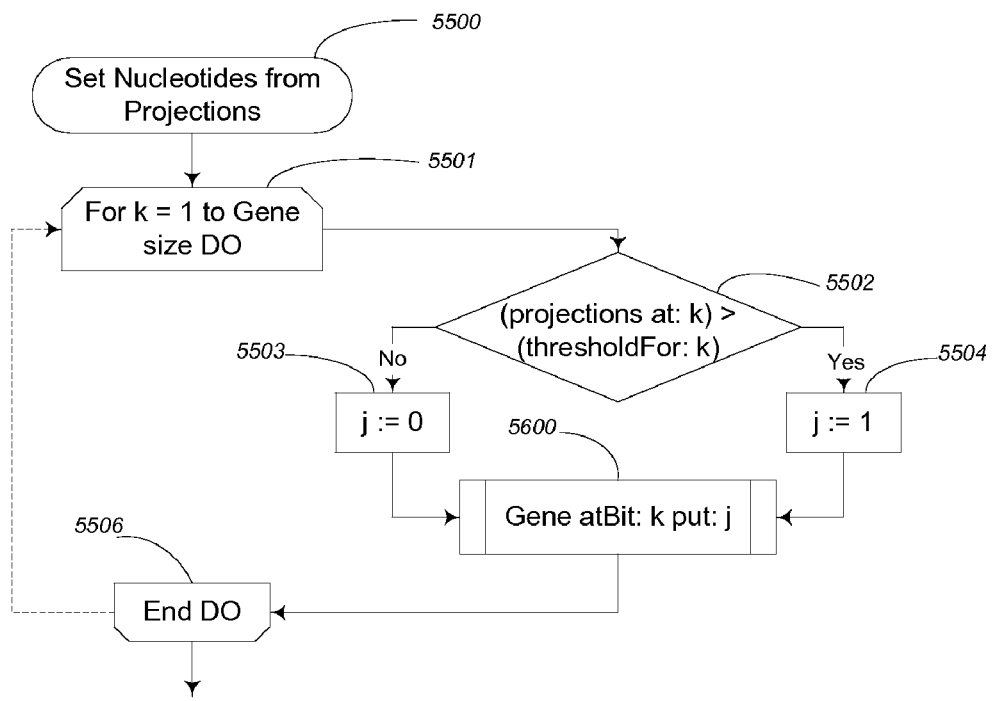
FIG. 55 shows the net nucleotides from projections.

In FIG. 55, each of the bits within a codon (referred to as nucleotides) is set from the projections 5500. To do so, a DO loop is established for k=1 to the size of the gene 5501. First we check to see if projections at k is greater than the predetermined threshold for k 5502. Normally, this threshold is 0 for all k, but in general, it may be set to any value. If the threshold is exceeded, the variable j is set to 1 5504; otherwise, it is set to 0 5503. Then the $k^{th}$ nucleotide of the indicated codon within the gene is set to j, using the function atBit:put: (described separately) 5600. When all nucleotides have been set, the DO loop is ended 5506.

The atBit:put Method

Figure 56:
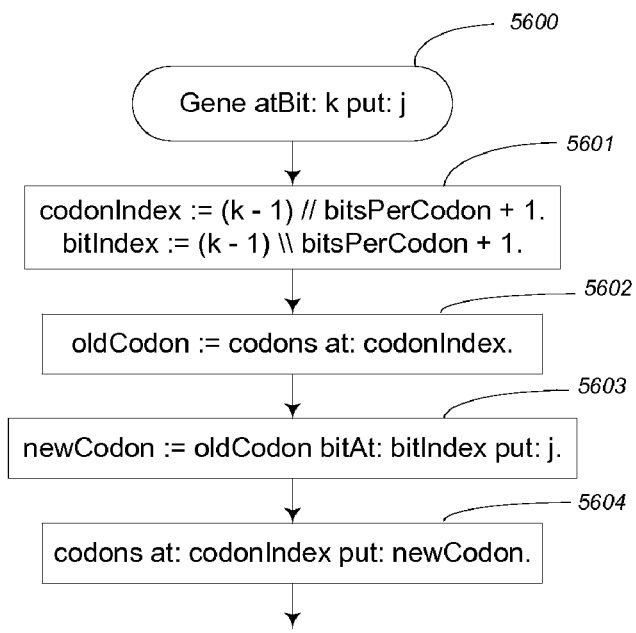
FIG. 56 helps to appreciated that once the value of a bit in the gene is determined, it must be determined which codon of the gene is affected, and which bit of that codon should be set to the determined value.

Once the value of a bit in the gene is determined, we have to determine which codon of the gene is affected, and which bit of that codon to set to the determined value. This is illustrated in FIG. 56, beginning at 5600. The variable codonIndex derived from the integer quotient (//) to locate the proper codon, and the variable bitIndex derived from the integer remainder (\\) to locate the proper bit within that codon 5601. The Variable oldCodon holds onto the existing codon 5602. It is then used to build newCodon by replacing the existing value at bitIndex with j 5603. Then newCodon is plugged into the gene in the proper position indicated by codonIndex 5604.

Add Gene (5700)

Figure 57:
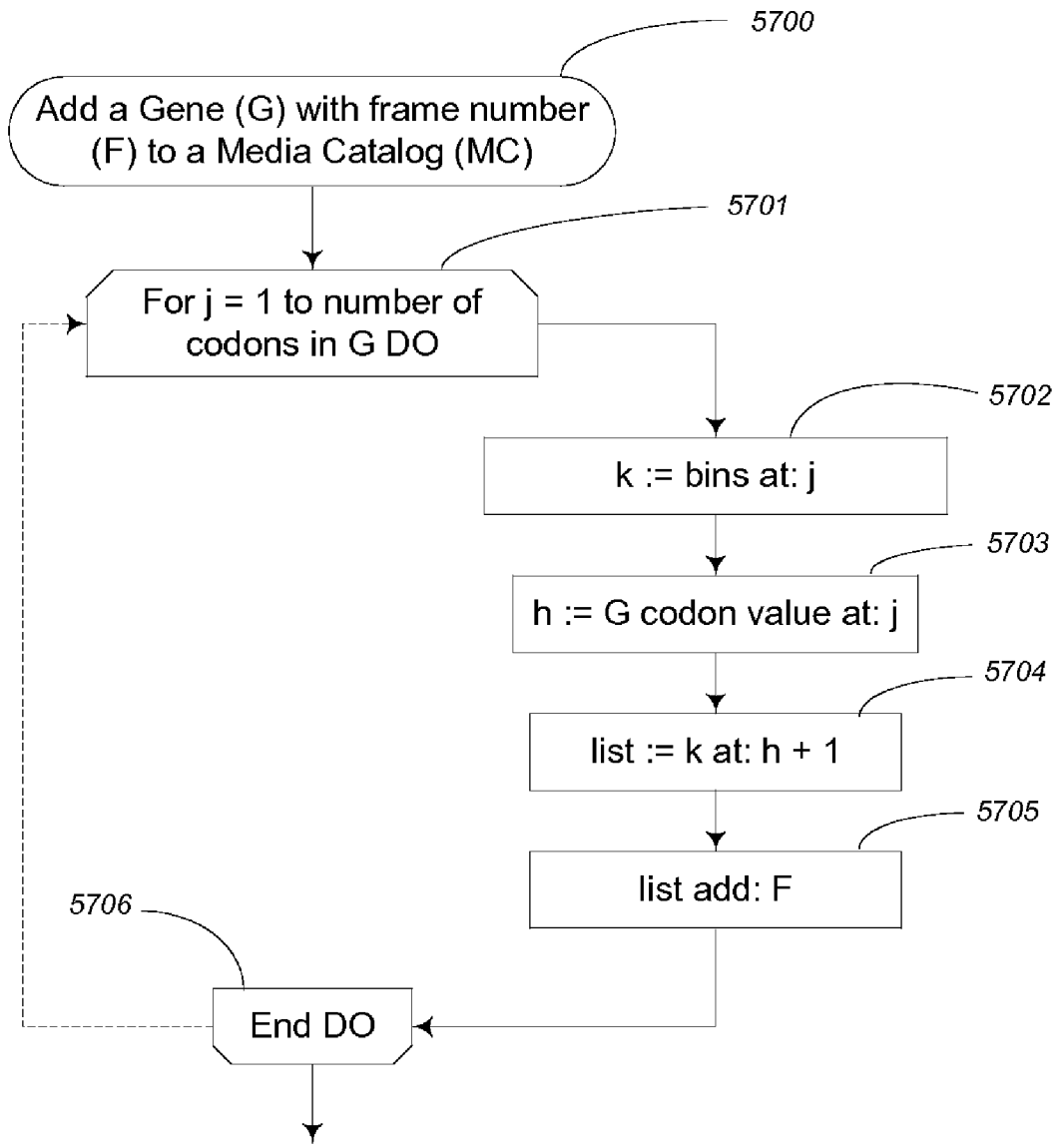
FIG. 57 is a diagram that shows when a frame of a media file is learned, a gene representing it is added to the Media Catalog.

When a frame of a media file is learned, a gene representing it is added to the Media Catalog, as illustrated in FIG. 57. A DO loop is established to go through the gene and add the frame number F to the list indicated by the value of each of its codons in the appropriate bin 5701. There is one bin for each of the codon positions in a gene. The variable k becomes the bin, corresponding to the codon position j 5702. The variable h becomes this codon's value at codon position j 5703.

Each of the lists in k corresponds to a particular codon value h, and each list in k contains frame numbers in the reference space that have this value in k's codon position j. The variable, list represents the list from the bin k with the value h 5704. To this list is added the frame number F 5705. In this way we have added this frame number to the appropriate bin for this codon position, and we continue on to the next codon position j. When all codon positions have been addressed, the DO loop is ended 5706.

Histogram for Catalog

Figure 58:
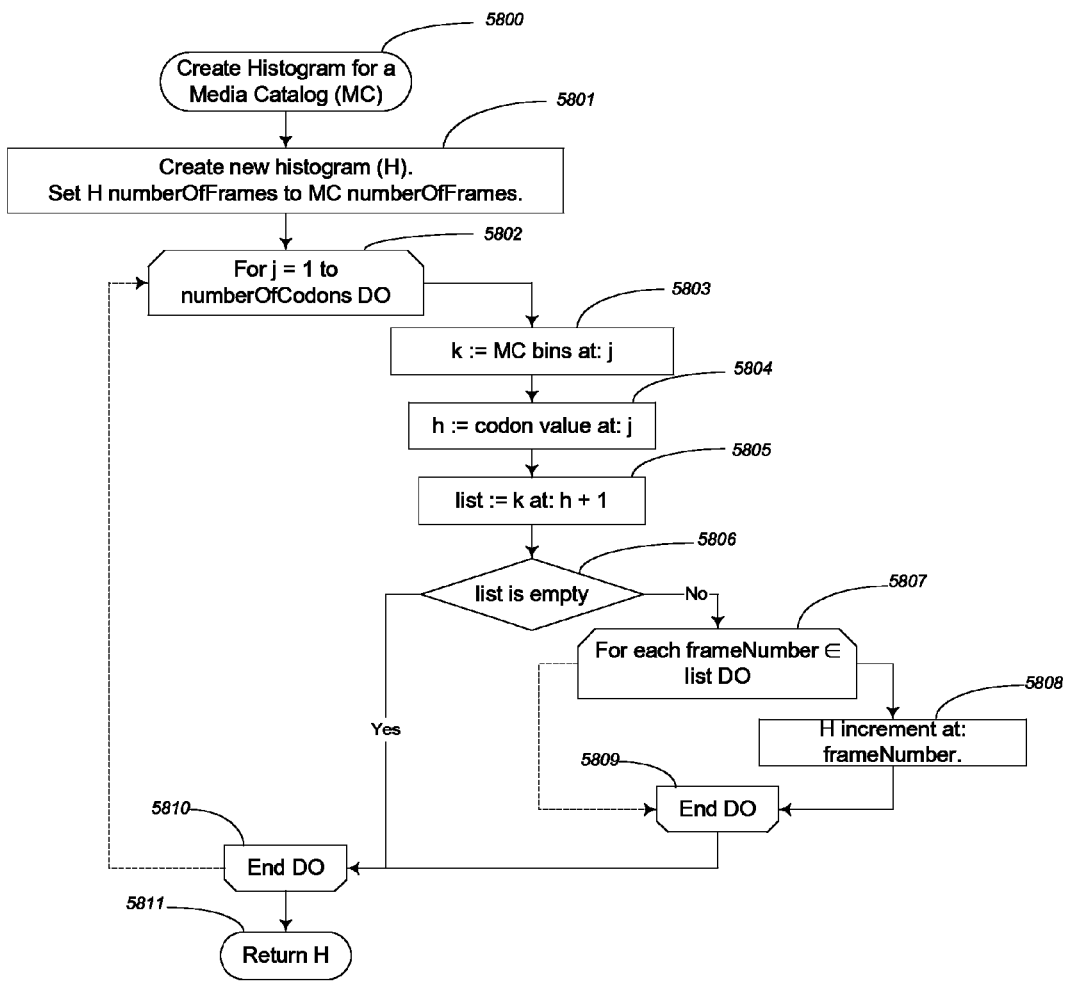
FIG. 58 shows that when a query frame is compared to the Media Catalog (MC), a histogram (H) is prepared.

When a query frame is compared to the Media Catalog (MC), a histogram (H) is prepared, as shown in FIG. 58. The new histogram (H) is initialized to have the same number of frames as the media catalog 5801. Then a DO loop is established to go through each of the codons in the query gene, looping for j=1 to the number of codons in the gene 5802. For each codon, there is a corresponding bin in MC, represented by the variable k 5803. The variable h is assigned the value of the codon at index j 5804. The variable list represents the particular list in the bin k that has index h the same as codon value h 5805. If that list is not empty 5806, a DO loop is established to go through all the frame Numbers in that list 5807 and increment that frame Number in the histogram (H) 5808. When all frame Numbers in that list have been so processed, the DO loop is ended 5809. When this has been accomplished for all codons (j); the outer DO loop is ended 5810, and the histogram (h) is returned 5811.

In conclusion, whereas the technology disclosed herein may be used to eliminate the need for the keyword tagging of media in order to make it searchable, the same inventive methodologies may ultimately enable conventional search engines to effectively locate media using keywords. Thus, Visual Key technology may directly empower alternative conventional media search methodologies.

Fields of Use

The core pieces of the Visual Key Database technology herein described, image recognition and large database searching, have innumerable applications, both separately and in concert with each other. The applications can be categorized in any number of ways, but they all fall into the following four basic functional categories:

1. Identification

Any application that is required to automatically identify an object by its visual appearance, including its size and shape and the appearance of the colors, shapes and textures composing its surface. Objects may be unique (one-of-a-kind), multiply copied or mass-produced. Objects may be two- or Three-dimensional. Objects may be cylindrical, round, multiply, sided, or irregular.

2. Information Retrieval

Any computer application that is required to obtain detailed information about this object, the in-hand object that the user presents to the camera attached to the computer. Information about a unique object might include its value, authenticity, ownership, condition, and history. Information about a multiply copied or mass produced object might include its manufacturer, distributors, availability, price, service, instructions-for-use and frequently-asked-questions.

3. Tracking

Any computer application requiring that an object be automatically identified and tracked, tracking involving a continuous visual monitoring of its position, distance and orientation. Tracking is essential to automated unfixtured material handling.

4. Analysis & Inspection

Any application requiring that quantitative information be obtained from the appearance of an object, or an application that requires that an object be compared to a standard and the differences determined both qualitatively and quantitatively. Manufactured objects include any commercially available product or product packaging that can be successfully imaged in the user's working environment. Representative manufactured objects include pharmaceuticals, toiletries, processed food, books/magazines, music CD's, toys, and mass market collectibles. Large manufactured objects like cars and appliances could be imaged at various positions along assembly lines for identification and inspection.

Products or product component in the process of being manufactured constitute an appreciable number of applicable objects. This list is very long, and includes electronic components, automotive components, printed media and processed food packages.

One-of-a-kind objects include custom made antiques, jewelry, heirlooms and photographs. One-of-a-kind objects in commercial venues might also include microscope specimens, manufacturing prototypes, tools and dies, moulds, and component parts. One-of-a-kind objects from nature might include biological and geological specimens, insects, seeds, leaves and microbes. Insects, seeds, and leaves might constitute multiply-copied objects, depending how tightly the object boundaries are drawn.

Identification
Copyright Protection

As broadband Internet connectivity becomes increasingly prevalent in the marketplace, distributing copyrighted items such as images, movies or music (audio content) via the Internet is going to increase dramatically. However, this mode of distribution will never reach its full market potential until companies can feel confident that their proprietary materials are protected from illegal copying and re-distribution. Visual Key's technology will enable companies to protect their materials, allowing them to create Visual Keys for all their proprietary materials (including individual images, video clips and audio clips) and to automatically crawl the Internet, identifying illegal users of their materials.

Audio Recognition

By analyzing the sonic waveform produced by an audio stream, Visual Key technology can be used to identify audio clips, including pieces of music, newscasts, commercial sound bytes, movie soundtracks, etc. The specific uses of this application of the technology include copyright protection and database searching and verification.

Content Verification for Streaming Media

Streaming media providers can use Visual Key to monitor the quality of its services. The Streaming Media Provider would maintain a Visual Key Database. Customers' computers receiving the streaming media can process the decoded streaming media into one or more Visual Key Database objects. These Visual Key Database objects can be returned to the media provider for verification that the correct content is being received in its entirety, along with other information about speed of reception, packet loss, etc.

Content Blocking

This is an application that would allow a consumer to block content as it is received, based upon the recognition of a video or audio stream in concert with an independent rating service. This service is currently being performed by blacklisting specific file names and web site locations (URL's), father than basing the blocking on the content itself. With Visual Key technology, the actual stream would be identified, rather than the somewhat arbitrary measure of the location of the server or the name of the file.

Aids for Blind Persons

The Visual Key technology can be used to provide assistance to blind persons. Portable handheld and/or non-portable devices incorporating imaging capability, voice synthesis and dedicated digital processing tailored to run the Visual Key algorithms could be built at low cost. Such devices could provide useful services to the visually-impaired.

Services which could be supplied include the recognition of common objects not easily identified be touch, such as medications, music CD's or cassettes, playing cards and postage stamps. The system would learn the desired objects and, via voice synthesis or recorded user voice, identify the unknown object to the user.

The system could be taught the pages of a personal telephone book, and recite the names/numbers on any page which it was shown. Consultation with blind persons could surely identify a multitude of additional applications within this context.

Information Retrieval
Personal Collections

This is an end user software application designed for cataloging inventories of personal collectibles; it can be used independently (stand-alone) or in connection with Internet-based resources. In this application, the user enters objects into the database by imaging each item, with a digital input device (still camera, video camera or scanner) and enters associated information into screen forms. When the user wishes to recall information about an item that has been catalogued, the user would image it again and the Visual Key system would recall the information about that particular item.

Possible uses of this application include jewelry, coins, commemorative plates, figurines, dolls, mineral specimens, comic books and other hobby collections, as well as the cataloging of household items for insurance purposes. A further extension of the concept would be to extend the database of items to some centralized repository, where police organizations could be aided in identification of recovered stolen items.

Linking

A consumer with an appropriate imaging device, such as a digital video camera or flatbed scanner connected to a Visual Key-enabled computer can use objects or pictures to provide links to specific locations within specific web sites. In the preferred embodiment, a Visual Key web site would exist as an intermediary between the consumer and desired web locations. The consumer would generate an image of an object or picture, use the Visual Key Algorithm to process the image and transmit its Visual Key to the Visual Key web site. The Visual Key web site would automatically provide the consumer with a number of linking options associated with the original image. The following illustrates a few examples of such linking.

Interactive Card Gaming and Contests

Currently, many games are played over the Internet interactively, in real-time, using screen facsimiles of playing boards and cards. For example, chess may be played over the Internet between two people in any two locations in the world, using either text-based descriptions of plays or on-screen representations of a chessboard and pieces. In some modern card games, a player's power and position in a game are partly a function of the particular cards they have actually collected (Magic Cards, for example). Visual Key technology would allow users to play using their actual deck of cards, rather than "virtual decks" constructed simply by choosing from an exhaustive list of available cards. The players put their hands down in view of digital video cameras which monitor their moves. There is no need to actually transmit two video streams, which would have prohibitively high bandwidth requirements. Instead, the identity of the cards is recognized and the application can display a representation of the cards based on that recognition. Similarly, other games and contests could be played over the Internet.

Interactive Magazine and Interactive Catalog

Visual Key technology can bridge the gap between print media and electronic media. Companies market to potential customers using a large amount of traditional print media. However, it is difficult for customers to find the correct information or purchase the marketed items from these companies on the Internet. Visual Key's technology addresses this issue by allowing a user to place a magazine or catalog page of interest under their Visual Key enabled camera. The page is treated as a physical object and the user is provided appropriate software, links to the objects pictured on the page. This allows users to find the electronic information they desire and to purchase items directly from the Internet using paper based publications This has application both in consumer and in business-to-business markets. Trade publications could use Visual Key to link directly from trade publication advertisements and articles to more related information on-line.

Collectibles

The commercialization of the Internet has reinvigorated the collectibles industry. However, many people own items for which they have little information and little idea of where to find any meaningful information. People are generally interested in the history, book value, market value and general collection information for items they own. By imaging items of interest and submitting these images to query the Visual Key system, users would be able to determine what they have, what its value might be and sources for buying and selling such items.

Text based searching can be difficult and time consuming, ultimately providing users with a large number of broad web links, often of little value. Alternatively, Visual Key-enabled digital video cameras can be used to provide users a small number of direct web links to items users have in their possession. For example, if a stamp collector imaged one of his stamps and directed the image into the Visual Key Database system, he could automatically be connected to Internet content specifically related to the stamp analyzed.

On-Line Shopping

On-line shopping services and auctions could use Visual Key to add value to their offerings. Visual Key-enabled auction sites could allow users to search for items based entirely upon a picture of the object. Shopping services could maximize their search efforts by including Visual Key searching to find picture references to desired items.

Online Product Information

This is an application that would quickly allow a consumer to locate information about a product by imaging the product itself and be automatically connected to pertinent information about that product. Currently, finding specific product information requires a great deal of hit and miss searching.

Interactive Books

Visual Key enables some very interesting concepts for making books in their physical form a navigational tool for digital multimedia resource linking. For example, the pages of a pre-school children's book could link to sound files on the publisher's web site that read the words. Pages in books for older children could link to sound effects, animation and music. The illustrations of picture and fantasy books could navigate the reader through worlds of multimedia related experiences. Textbooks, instruction manuals, and how-to books could contain pages with graphics and text inviting the reader to experience the page multi-dimensionally by visually linking it to its associated digital multimedia resources.

Interactive Greeting Cards

Imagine opening a greeting card and seeing the Visual Key logo on the back right next to the card company's logo, indicating that the card is Visual Key-enabled. Visual object linking the card would connect to a multimedia web site specifically designed to augment that particular card theme and design with sound effects, music, spoken words, graphics and animation. The web server could additionally record a spoken message from the sender and play back the personal greeting to the recipient if the recipient desires to reveal his or her identity.

Store Kiosks

Retail store locations could use Visual Key to provide devices (Kiosks) to help shoppers locate items within the store. For example, a Kiosk at the entrance to a store could allow a shopper to easily locate an item from a sales catalog or flyer, indicating exactly which aisle contains the item in this particular store location, whether the item is still in stock; etc. Some kinds of stores could further use the Kiosk concept to help their customers by allowing their customers to get further detailed information on items they already possess. For example, in a hobby store, a Kiosk could be used to help identify and evaluate a customer's collectible trading cards.

Physical Icons

Popular applications, games and web sites could employ physical props, like small figurines, cards or toys, as real desktop icons that could be presented to the camera for immediate linking to the associated program or web site. Physical icons would make great promotional giveaways and advertising materials for, the owners of the multimedia resources to which they link. Business cards could be designed to link unambiguously to the business web site. Computer users could associate physical items on their physical desktops with software objects like documents and folders on their virtual desktops.

Pictogram Recognition

This is an application that could be used to catalog and recall characters or symbols that are non-standard. Particularly useful to scholars, such an application could be quickly trained to recognize characters or symbols in any language or symbolic system.

Database Management

The Query portion of the Visual Key Database system description contains a section which associates a Visual Key with the Query Picture (Image Recognition) and a section in which the database is searched for this Visual Key (Large Database Searching). The database search method described (Squorging) constitutes a distinct invention that has stand-alone application.

The invention has application to the general problem of database searching. The statistical information required for this search process to be implemented (probability density functions associated with the query data that is to be matched in the database) can be known a priori or can be derived from the behavior of the data in the database itself.

Scientific Inquiry

In the areas of Biotechnology and Scientific Inquiry, there are many situations where very large databases must be searched not for an exact match but for similar items. For example, searching for likely variations of a chemical compound can involve millions of combinations. The Squorger technology could readily be adapted to these tasks.

Law Enforcement

Those in the area of Law Enforcement are frequently called upon to search large databases for close matches. For example, fingerprints, suspect profiles and DNA matching searches could all be expedited with Visual Key's Squorger technology.

Tracking

Quality Control

Industrial processes could be aided in control of process quality with Visual Key technology. By monitoring a video of a process and comparing it against a videotape of the "ideal" process, changes or alterations in the process of any visible kind could be detected and flagged.

Guidance

It is anticipated that guidance operations can be implemented through the use of Visual Key technology. For example, two parts that need to come together in a known way can be monitored and their positions altered to achieve a successful joining.

Textile Orientation

In the textile industry, before pieces are cut, the fabric must be oriented so that the patterns are properly aligned for the finished piece. Using Visual Key technology, the patterns can be automatically aligned as they are cut.

Analysis & Inspection

An important industrial applications of Visual Key technology lie in the area of machine vision, i.e. the use of information contained in optical imagery to augment industrial processes. Some areas in which the Visual Key technology obviously can be applied are inspection and sorting.

Inspection

The inspection of manufactured objects that are expected to be consistent from one to another can easily be accomplished through the use of Visual Key technology. The system first would learn the image of an ideal example of the object to be inspected. Examples of the object at the boundary of acceptability would then be used as query pictures, and the resulting match scores noted. The system would thereafter accept objects for which the match score was in the acceptance range, and would reject all others. Example objects are containers, labels, and labels applied to containers.

Sorting

Sorting is quite straightforward. As an example of sorting, let us postulate that bottles traveling upon a common conveyor are identical except for differing applied labels, and the objective is to separate bottles having N different label types into N streams each of which contains only bottles having identical labels. The system learns N bottle/label combinations, and supplies the correct data to a sorting mechanism.

OTHER INDUSTRIAL APPLICATIONS

The given examples of industrial/machine vision application are representative of a plethora of such niche applications which can be identified. Although many of these applications are currently being addressed by existing technology, the use of Visual Key technology offers substantial advantages over existing technology in terms both of speed and system cost. The Visual Key technology can process images very rapidly on almost any Contemporary computer, including simple single-board computers. In most applications, only a small amount of memory is required. The need for expensive frame buffers is avoided through the use of low-cost imaging cameras utilizing the Universal Serial Buss (USB), or equivalent interfaces. Finally, system installation of a Visual Key-based system should be comparatively low, since the learning function is so simple and straightforward.

The above descriptions of possible uses for the Visual Key technology are by no means exhaustive. Other applications include Retail trade, autonomous guidance systems, advertising, and other uses for this technology. Overall, it is the intention of this invention to permit an appropriately equipped and programmed computer to perform digital media identifications similar to those that would be performed by a trained human identifier, only with a substantially greater memory for different representations and significantly faster and more reliable performance.

We claim:

1. A method of identifying illegal uses of copyright material, comprising the steps of:
the following steps to be performed by a first computer:
receiving a primary digital media object;
associating a first auxiliary construct with the primary digital media object; and
transforming the first auxiliary construct using at least one of the attributes of the primary digital media object to generate a unique key representative of the primary digital media object;
the following steps to be performed by a second computer:
receiving a secondary digital media object;
associating a second auxiliary construct with the secondary digital media object; and
transforming the second auxiliary construct using at least one of the attributes of the secondary digital media object to generate a unique key representative of the secondary digital media object;
accessing the unique key representative of the primary digital media object from the first computer; and
comparing the keys of the secondary object with the key of the primary object to identify if the secondary object is substantially similar to the primary object.

* * * * *